(12) United States Patent
Poh et al.

(10) Patent No.: US 12,513,160 B1
(45) Date of Patent: Dec. 30, 2025

(54) SYSTEMS AND PROCESSES FOR MULTIFACTOR AUTHENTICATION AND IDENTIFICATION

(71) Applicant: T STAMP Inc., Atlanta, GA (US)

(72) Inventors: Norman Hoon Thian Poh, Atlanta, GA (US); Leanne Attard, Atlanta, GA (US)

(73) Assignee: T Stamp Inc., Atlanta, GA (US)

( * ) Notice: Subject to any disclaimer, the term of this patent is extended or adjusted under 35 U.S.C. 154(b) by 475 days.

(21) Appl. No.: 18/145,470

(22) Filed: Dec. 22, 2022

Related U.S. Application Data

(63) Continuation-in-part of application No. 17/230,684, filed on Apr. 14, 2021, now abandoned.

(60) Provisional application No. 63/011,447, filed on Apr. 17, 2020, provisional application No. 63/009,809, filed on Apr. 14, 2020.

(51) Int. Cl.
*H04L 9/40* (2022.01)

(52) U.S. Cl.
CPC ...... *H04L 63/1416* (2013.01); *H04L 63/1425* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 6,836,554 | B1 | 12/2004 | Bolle et al. |
| 7,120,607 | B2 | 10/2006 | Bolle et al. |
| 7,412,081 | B2 | 8/2008 | Doi |
| 7,773,784 | B2 | 8/2010 | Boult |
| 7,822,631 | B1 | 10/2010 | Vander Mey et al. |

(Continued)

FOREIGN PATENT DOCUMENTS

| | | |
|---|---|---|
| CN | 103930921 A | 7/2014 |
| EP | 3065366 A1 | 9/2016 |

(Continued)

OTHER PUBLICATIONS

Rathgeb et al., "Unlinkable Improved Multi-biometric Iris Fuzzy Vault", EURASIP Journal on Information Security, 2016, 2016:26.

(Continued)

*Primary Examiner* — Wassim Mahrouka
(74) *Attorney, Agent, or Firm* — Bradley Arant Boult Cummings LLP; Daniel E. Sineway, Esq.

(57) ABSTRACT

A system can include a server having a processor configured to receive, from a first computing device, first data associated with at least one historical data attack. The processor can encode the first data into at least one fixed-size representation. The processor can generate at least one anonymized vector representation based on the at least one fixed-size representation. The processor can receive, from a second computing device, second data associated with a potential attacker. The processor can encode the second data into at least one additional fixed-size representation. The processor can generate a second anonymized vector representation based on the at least one additional fixed-size representation. The processor can generate a confidence measure of the potential attacker as an attacker based on a comparison between the at least one anonymized vector representation and the second anonymized vector representation.

17 Claims, 33 Drawing Sheets

(56) References Cited

U.S. PATENT DOCUMENTS

| | | |
|---|---|---|
| 8,010,460 B2 | 8/2011 | Work et al. |
| 8,249,314 B2 | 8/2012 | Bolle et al. |
| 8,312,291 B2 | 11/2012 | Golic et al. |
| 8,316,086 B2 | 11/2012 | Ufford et al. |
| 8,457,367 B1 | 6/2013 | Sipe et al. |
| 8,510,797 B2 | 8/2013 | Kasturi |
| 8,542,879 B1 | 9/2013 | Nechyba et al. |
| 8,675,926 B2 | 3/2014 | Zhang et al. |
| 8,724,856 B1 | 5/2014 | King |
| 8,965,066 B1 | 2/2015 | Derakhshani et al. |
| 9,070,088 B1 | 6/2015 | Baveja et al. |
| 9,147,117 B1 | 9/2015 | Madhu et al. |
| 9,173,101 B1 | 10/2015 | Angelov et al. |
| 9,262,725 B2 | 2/2016 | Butte et al. |
| 9,300,676 B2 | 3/2016 | Madhu et al. |
| 9,412,004 B2 | 8/2016 | Bringer et al. |
| 9,477,828 B2 | 10/2016 | Irie |
| 9,495,588 B2 | 11/2016 | Derakhshani et al. |
| 9,521,606 B1 | 12/2016 | Costa et al. |
| 9,652,663 B2 | 5/2017 | Lau et al. |
| 9,679,212 B2 | 6/2017 | Kim et al. |
| 9,721,147 B1 | 8/2017 | Kapczynski |
| 9,838,388 B2 | 12/2017 | Mather et al. |
| 9,866,393 B1 | 1/2018 | Rush et al. |
| 10,019,561 B1 | 7/2018 | Shelton et al. |
| 10,049,287 B2 | 8/2018 | Holz et al. |
| 10,210,388 B2 | 2/2019 | Derakhshani et al. |
| 10,225,255 B1 | 3/2019 | Jampani et al. |
| 10,275,684 B2 | 4/2019 | Han et al. |
| 10,320,569 B1 | 6/2019 | Wentz et al. |
| 10,430,638 B2 | 10/2019 | Russo |
| 10,594,688 B2 | 3/2020 | Yang et al. |
| 10,628,700 B2 | 4/2020 | Puri et al. |
| 10,635,894 B1 | 4/2020 | Genner |
| 10,650,226 B2 | 5/2020 | Chu et al. |
| 10,733,424 B2 | 8/2020 | Son et al. |
| 10,735,205 B1 | 8/2020 | Wentz et al. |
| 10,796,178 B2 | 10/2020 | Fan et al. |
| 10,810,423 B2 | 10/2020 | Thavalengal |
| 11,080,516 B1 | 8/2021 | Joshi et al. |
| 11,080,517 B2 | 8/2021 | Wu et al. |
| 11,093,771 B1 | 8/2021 | Genner |
| 11,095,631 B1 | 8/2021 | Genner |
| 11,151,468 B1 | 10/2021 | Chen et al. |
| 2004/0019570 A1 | 1/2004 | Bolle et al. |
| 2004/0096085 A1 | 5/2004 | Matsumoto et al. |
| 2004/0186906 A1 | 9/2004 | Torrant et al. |
| 2005/0235148 A1 | 10/2005 | Scheidt et al. |
| 2006/0015358 A1 | 1/2006 | Chua |
| 2006/0042483 A1 | 3/2006 | Work et al. |
| 2006/0114520 A1 | 6/2006 | Enomoto et al. |
| 2006/0212931 A1 | 9/2006 | Shull et al. |
| 2007/0174633 A1 | 7/2007 | Draper et al. |
| 2008/0310727 A1 | 12/2008 | Wu et al. |
| 2008/0313714 A1 | 12/2008 | Fetterman et al. |
| 2009/0022374 A1 | 1/2009 | Boult |
| 2009/0080717 A1 | 3/2009 | Dias |
| 2009/0210722 A1 | 8/2009 | Russo |
| 2009/0271634 A1 | 10/2009 | Boult et al. |
| 2009/0310830 A1 | 12/2009 | Bolle et al. |
| 2009/0327054 A1 | 12/2009 | Yao et al. |
| 2010/0017618 A1 | 1/2010 | Golic et al. |
| 2010/0194919 A1 | 8/2010 | Ishii et al. |
| 2010/0250676 A1 | 9/2010 | Ufford et al. |
| 2011/0099277 A1 | 4/2011 | Yao et al. |
| 2011/0131643 A1 | 6/2011 | Lawrence et al. |
| 2011/0137789 A1 | 6/2011 | Kortina et al. |
| 2011/0246766 A1 | 10/2011 | Orsini et al. |
| 2011/0285748 A1 | 11/2011 | Slatter et al. |
| 2012/0011066 A1 | 1/2012 | Telle et al. |
| 2012/0014507 A1 | 1/2012 | Wu et al. |
| 2012/0072384 A1 | 3/2012 | Schreiner et al. |
| 2012/0102332 A1 | 4/2012 | Mullin |
| 2012/0124651 A1 | 5/2012 | Ganesan et al. |
| 2012/0130863 A1 | 5/2012 | Tedjamulia et al. |
| 2012/0284786 A1 | 11/2012 | Somani et al. |
| 2012/0331567 A1 | 12/2012 | Shelton |
| 2013/0004033 A1 | 1/2013 | Trugenberger |
| 2013/0086641 A1 | 4/2013 | Mehr et al. |
| 2013/0104202 A1 | 4/2013 | Yin et al. |
| 2013/0124644 A1 | 5/2013 | Hunt et al. |
| 2013/0191898 A1 | 7/2013 | Kraft |
| 2013/0219479 A1 | 8/2013 | DeSoto et al. |
| 2013/0259228 A1 | 10/2013 | Ren et al. |
| 2013/0262873 A1 | 10/2013 | Read et al. |
| 2014/0013422 A1 | 1/2014 | Janus et al. |
| 2014/0020073 A1 | 1/2014 | Ronda et al. |
| 2014/0037074 A1 | 2/2014 | Bravo et al. |
| 2014/0037156 A1 | 2/2014 | Cavallini |
| 2014/0059660 A1 | 2/2014 | Marra et al. |
| 2014/0071131 A1 | 3/2014 | Kitago |
| 2014/0075513 A1 | 3/2014 | Trammel et al. |
| 2014/0090039 A1 | 3/2014 | Bhow |
| 2014/0101434 A1 | 4/2014 | Senthurpandi et al. |
| 2014/0129493 A1 | 5/2014 | Leopold |
| 2014/0164218 A1 | 6/2014 | Stewart |
| 2014/0230023 A1 | 8/2014 | Parks |
| 2014/0247985 A1 | 9/2014 | Park |
| 2014/0253707 A1 | 9/2014 | Gangadhar |
| 2014/0258305 A1 | 9/2014 | Kapadia et al. |
| 2014/0270404 A1 | 9/2014 | Hanna et al. |
| 2014/0273978 A1 | 9/2014 | Van Snellenberg |
| 2014/0279556 A1 | 9/2014 | Priebatsch et al. |
| 2014/0289833 A1 | 9/2014 | Briceno et al. |
| 2014/0330732 A1 | 11/2014 | Grignon |
| 2014/0333415 A1 | 11/2014 | Kursun |
| 2014/0337948 A1 | 11/2014 | Hoyos |
| 2015/0046327 A1 | 2/2015 | Taupitz |
| 2015/0059003 A1 | 2/2015 | Bouse |
| 2015/0078630 A1 | 3/2015 | Derakhshani et al. |
| 2015/0121456 A1 | 4/2015 | Milman et al. |
| 2015/0154436 A1 | 6/2015 | Shi et al. |
| 2015/0156031 A1 | 6/2015 | Fadell et al. |
| 2015/0180857 A1 | 6/2015 | Schulman et al. |
| 2015/0186721 A1 | 7/2015 | Derakhshani et al. |
| 2015/0205800 A1 | 7/2015 | Work et al. |
| 2015/0227890 A1 | 8/2015 | Bednarek et al. |
| 2015/0261999 A1 | 9/2015 | Thiebot et al. |
| 2015/0269394 A1 | 9/2015 | Bringer et al. |
| 2015/0332169 A1 | 11/2015 | Bivens et al. |
| 2015/0363585 A1 | 12/2015 | Gooding et al. |
| 2016/0019614 A1 | 1/2016 | Dziuk |
| 2016/0034708 A1 | 2/2016 | Shim et al. |
| 2016/0037156 A1 | 2/2016 | Lee |
| 2016/0048837 A1 | 2/2016 | Jin et al. |
| 2016/0050199 A1 | 2/2016 | Ganesan |
| 2016/0070704 A1 | 3/2016 | Yu |
| 2016/0085958 A1 | 3/2016 | Kang |
| 2016/0088023 A1 | 3/2016 | Handa et al. |
| 2016/0132901 A1 | 5/2016 | Davar et al. |
| 2016/0173605 A1 | 6/2016 | Iasi et al. |
| 2016/0191513 A1 | 6/2016 | Tomlinson et al. |
| 2016/0224853 A1 | 8/2016 | Xiong |
| 2016/0269178 A1 | 9/2016 | Yang et al. |
| 2016/0277424 A1 | 9/2016 | Mawji et al. |
| 2016/0379182 A1 | 12/2016 | Sheng et al. |
| 2017/0006008 A1 | 1/2017 | Moran et al. |
| 2017/0019400 A1 | 1/2017 | Drolshagen et al. |
| 2017/0032485 A1 | 2/2017 | Vemury |
| 2017/0034183 A1 | 2/2017 | Enqvist et al. |
| 2017/0061138 A1 | 3/2017 | Lambert |
| 2017/0082740 A1 | 3/2017 | Kitchens, II et al. |
| 2017/0134366 A1 | 5/2017 | Genner et al. |
| 2017/0140204 A1 | 5/2017 | Derakhshani et al. |
| 2017/0210525 A1 | 7/2017 | Mayer et al. |
| 2017/0250796 A1 | 8/2017 | Samid |
| 2017/0256056 A1 | 9/2017 | Jain et al. |
| 2017/0264599 A1 | 9/2017 | O'Regan et al. |
| 2017/0279795 A1 | 9/2017 | Redberg |
| 2017/0286788 A1 | 10/2017 | Fan et al. |
| 2017/0331818 A1 | 11/2017 | Kader et al. |
| 2017/0346851 A1 | 11/2017 | Drake |
| 2017/0372055 A1 | 12/2017 | Robinson et al. |
| 2018/0005019 A1 | 1/2018 | Chattopadhyay et al. |

(56) References Cited

U.S. PATENT DOCUMENTS

| | | |
|---|---|---|
| 2018/0018651 A1 | 1/2018 | Nelson et al. |
| 2018/0034852 A1 | 2/2018 | Goldenberg |
| 2018/0048472 A1 | 2/2018 | Pirrwitz et al. |
| 2018/0060648 A1 | 3/2018 | Yoo et al. |
| 2018/0069703 A1 | 3/2018 | Chakraborty et al. |
| 2018/0077571 A1 | 3/2018 | Mannopantar et al. |
| 2018/0082455 A1 | 3/2018 | Yamaji et al. |
| 2018/0097806 A1 | 4/2018 | Blinn |
| 2018/0101742 A1 | 4/2018 | Burge et al. |
| 2018/0167388 A1 | 6/2018 | Farrell et al. |
| 2018/0191501 A1 | 7/2018 | Lindemann |
| 2018/0205557 A1 | 7/2018 | Sun |
| 2018/0211092 A9 | 7/2018 | Derakhshani et al. |
| 2018/0248699 A1 | 8/2018 | Andrade |
| 2018/0302406 A1 | 10/2018 | Burckhardt et al. |
| 2018/0307895 A1 | 10/2018 | Chu et al. |
| 2019/0043148 A1 | 2/2019 | Vemury |
| 2019/0311102 A1 | 10/2019 | Tussy |
| 2019/0312734 A1 | 10/2019 | Wentz et al. |
| 2019/0334884 A1 | 10/2019 | Ross et al. |
| 2019/0379541 A1 | 12/2019 | Schwach et al. |
| 2020/0036707 A1 | 1/2020 | Callahan et al. |
| 2020/0084191 A1 | 3/2020 | Nicholls |
| 2020/0145219 A1 | 5/2020 | Sebastian et al. |
| 2020/0153624 A1 | 5/2020 | Wentz et al. |
| 2020/0186350 A1 | 6/2020 | Wentz et al. |
| 2020/0201679 A1* | 6/2020 | Wentz .................... G06F 9/468 |
| 2020/0257889 A1 | 8/2020 | Merkel et al. |
| 2020/0293640 A1 | 9/2020 | Joshi et al. |
| 2020/0351089 A1 | 11/2020 | Wentz |
| 2020/0351098 A1 | 11/2020 | Wentz |
| 2020/0351657 A1 | 11/2020 | Wentz |
| 2020/0356085 A1 | 11/2020 | Wentz et al. |
| 2020/0364428 A1 | 11/2020 | Azanza Ladrón et al. |
| 2020/0404019 A1 | 12/2020 | Drake |
| 2021/0019519 A1 | 1/2021 | Martin et al. |
| 2021/0027080 A1 | 1/2021 | Storm et al. |
| 2021/0073518 A1 | 3/2021 | Kumar et al. |
| 2021/0365532 A1* | 11/2021 | Engelsma .......... G06V 40/1353 |
| 2022/0309186 A1* | 9/2022 | Kåberg Johard ..... H04L 9/3231 |

FOREIGN PATENT DOCUMENTS

| | | |
|---|---|---|
| WO | 2008010773 A1 | 1/2008 |
| WO | 2019034589 A1 | 2/2019 |
| WO | 2019216498 A1 | 11/2019 |

OTHER PUBLICATIONS

Engelsma J.J., et al., "Fingerprints: Fixed Length Representation via Deep Networks and Domain Knowledge," arXiv preprint arXiv: 1904.01099, Apr. 1, 2019, 10 Pages.

Oloyede M.O., et al., "Unimodal and Multimodal Biometric Sensing Systems: A Review," IEEE Access, Sep. 30, 2016, vol. 4, pp. 7532-7555.

Yu P., et al., "Decision Fusion for Hand Biometric Authentication," IEEE International Conference on Intelligent Computing and Intelligent Systems, Nov. 20, 2009, vol. 4, pp. 486-490.

Wonjun Kim, Face Liveness Detection From a Single Image via Diffusion Speed Model, IEEE Transactions on Image Processing, vol. 24, No. 8, Apr. 13, 2015, pp. 2456 to 2465.

Xinting Gao, Single-View Recaptured Image Detection Based on Physics-Based Features, 2010 IEEE International Conference on Multimedia and Expo, Jul. 19, 2010, pp. 1469 to 1474.

Di Wen, Face Spoof Detection with Image Distortion Analysis, IEEE Transactions on Information Forensics and Security, vol. 10, No. 4, Apr. 2015, pp. 746 to 761.

Rohit Kumar Pandey, Deep Secure Encoding for Face Template Protection, Conference on Computer Vision and Pattern Recognition Workshops, Jun. 26, 2016, pp. 77 to 83.

\* cited by examiner

SYSTEMS AND PROCESSES FOR MULTIFACTOR AUTHENTICATION AND IDENTIFICATION

CROSS-REFERENCE TO RELATED APPLICATIONS

This application is a continuation in part and claims the benefit of and priority to U.S. application Ser. No. 17/230,684, filed Apr. 14, 2021, entitled "SYSTEMS AND PROCESSES FOR MULTIMODAL BIOMETRICS," which claims the benefit of and priority to U.S. Patent Application No. 63/009,809, filed Apr. 14, 2020, entitled "SYSTEMS AND PROCESSES FOR TOUCHLESS BIOMODAL BIOMETRICS," and U.S. Patent Application No. 63/011,447, filed Apr. 17, 2020, entitled "SYSTEMS AND PROCESSES FOR TOUCHLESS BIOMODAL BIOMOETRICS," the disclosures of which are incorporated herein by reference in their entirety.

TECHNICAL FIELD

The present systems and processes relate generally to multimodal biometric representation and security.

BACKGROUND

Previous biometric systems may rely on a touch scanner to capture and process biometric data. However, such approaches require the subject to physically touch the scanner, which may be undesirable based on health concerns or infeasible due to physical separation between the subject and a remote biometric system. Furthermore, previous approaches may require multiple touches and/or multiple scans to obtain biometric data of varying modality. For example, a previous approach may collect a palm print scan and an underlying vasculature scan, and each scan mode may require a distinct set of components, thereby increasing a cost and complexity of the touch-based system.

Therefore, there exists a long-felt, but unmet need for a system or process that allows for touchless collection of multimodal biometric information from a single capture of the subject.

BRIEF SUMMARY OF THE DISCLOSURE

Briefly described, and according to one embodiment, aspects of the present disclosure generally relate to systems and processes for multimodal biometric generation and authentication.

In various embodiments, the present system generates multimodal, multi-factor representations and performs various processes for storing and securing data using the same. In at least one embodiment, the system performs various operations including embedding, blending, binding, unbinding, analyzing, and generating operations summarized in Table 1.

TABLE 1

Exemplary System Operations

| Operation | Function | Input Example | Output Example |
|---|---|---|---|
| Embed (enrollment or comparison) | To extract discriminative features of biometric data and/or non-biodata to produce a fixed size representation (FXR) | Cropped and aligned biometric image or signal | FXR |
| Blend (enrollment or comparison) | To combine two or more FXRs together to create a permanently blended FXR (without discretization) or privacy-secured token (e.g., after discretization) | Two or more FXRs (which can be enrollment or probe FXRs) | FXR |
| Bind (enrolment only) | To bind a FXR or privacy-secured token with secret data, producing a pseudonymous identifier (PI) and auxiliary data (AD) as outputs | Enrolment FXR, Secret or PIN (a stable key) | Pseudonymous Identifier (PI) that serves as a stable token, and Auxiliary Data (AD) |
| Unbind (comparison only) | To unbind the PI using an authentic FXR or privacy-secured token, releasing the injected secret (e.g., PIN) upon successful decoding | Probe FXR, AD | Secret or PIN (e.g., a stable key) |
| Analyze (enrollment only) | To produce AD containing an error correcting code given a FXR or privacy-secured token | Enrolment FXR | AD |
| Generate (comparison only) | To produce a PIN given an AD and a FXR or privacy-secured token | Probe FXR, AD | Secret or PIN (e.g., a stable key) |

In one or more embodiments, the exemplary operations of Table 1 provide a library of actions by which various biometric processes can be performed (e.g., such as the key binding and unbinding process 1300 show in FIG. 13 or the key generating process 1400 shown in FIG. 14). According to one embodiment, the system operations allow for versatility and flexibility in enabling the creation of infinite enumerations of biometric-based security architectures that can support multimodal and multi-factor biometric-based authentication.

In at least one embodiment, a PIN is a knowledge-based secret that can be used as a stable key or string in conventional cryptographic systems. In one or more embodiments, biometric data refers to outputs of a biometric capture software developer kit (SDK) or sensor. Non-limiting examples of the outputs include face images, palm print images, iris scans, hand images, vasculature scans, and biological signals (e.g., vitals, speech signals, etc.). In one or more embodiments, non-biodata refers to data that is not derived from a biometric capture, but is otherwise associated with a subject. Non-limiting examples of non-biodata include driver's license number, social security number, location provenance records, name, contact information, username, medical data, and other personally identifying information (PII). In at least one embodiment, non-biodata includes auxiliary data, error correcting codes, and/or pseudonymous identifiers.

In various embodiments, a fixed-size representation (FXR) is a vector derived from biometric data, non-biodata, and/or a PIN. In one or more embodiments, two FXRs can be compared using a similarity metric, such as a distance score. According to one embodiment, the present systems and processes generate FXRs such that two FXRs originating from the same information source (e.g., a subject, object, or computing device) demonstrate a close distance (e.g., a close similarity), and such that two FXRs originating from different information sources (e.g., different subjects, objects, or computing devices) demonstrate a large distance (e.g., significant dissimilarity).

In one or more embodiments, a multimodal FXR refers to a FXR generated by directly or sequentially blending two or more FXRs (e.g., and/or embedded vectors, such as an embedded PII, PIN, or device vector). In at least one embodiment, the multimodal FXR improves biometric security by increasing the difficulty of producing or reconstructing an unauthorized representation, because multiple information sources are required to generate the multimodal FXR. In one example, a multimodal FXR blends a face image FXR and a palm print image FXR. In another example, a multimodal privacy-secured token (e.g., an irreversibly transformed FXR) blends a fingerprint privacy-secured token, a non-biodata privacy-secured token, and a palm print privacy-secured token. In various embodiments, a multimodal FXR can be generated such that authentication between the multimodal FXR and a unimodal, probe FXR (e.g., of a modality corresponding to at least one modality of the multimodal FXR) releases a PIN or other secret that is secured via the multimodal FXR. In some embodiments, a multimodal FXR can be generated such that only authentication between the multimodal FXR and multimodal probe FXR releases the PIN or other secret. In at least one embodiment, during generation of the multimodal FXR via blending, the present biometric system can assign different weights to each input modality and, thereby, control a contribution of each input modality to the output multimodal FXR. For example, the biometric system can assign a greater weight value to a facial image FXR and a lower value to an embedded username vector.

In one or more embodiments, a pseudonymous identifier (PI) is public data derived from a FXR. In one example, the PI is an output of binding a FXR and a PIN (e.g., according to the binding process 1100 shown in FIG. 11). According to one embodiment, the PI can be public information because the PI does not provide information about the input from which it was derived (e.g., the FXR or the PIN). In various embodiments, auxiliary data (AD) includes data that is used in combination with quantization processes and/or error correcting code (ECC) to derive a stable or deterministic key (e.g., a PIN or other secret) from a FXR. In one or more embodiments, the AD defines parameters by which quantization and/or error correction are performed. According to one embodiment, AD is defined by ISO 24745. In at least one embodiment, error correcting code (ECC) includes any parameters required to transform noisy data to a stable version. For example, ECC includes parameters for applying error correction to a probe FXR and, thereby, generating a stable FXR for purposes of biometric authentication.

According to a first aspect, a method for multimodal biometric verification, comprising: A) receiving a capture associated with a first subject, wherein the capture includes at least a first modality and a second modality associated with the subject; B) generating, from the capture, a first fixed-size representation (FXR) of the first modality and a second FXR of the second modality; and C) based on the first FXR and the second FXR, verifying that the first subject and a second subject are the same subject.

According to a further aspect, the method of the first aspect or any other aspect, further comprising: A) blending the first FXR and the second FXR to generate a multimodal FXR; B) generating a multimodal similarity score by comparing the multimodal FXR to a template multimodal FXR derived from a first modality and a second modality associated with the second subject; C) determining that the multimodal similarity score satisfies a predetermined multimodal similarity threshold; and D) based on the determination, verifying that the first subject and the second subject are the same subject.

According to a further aspect, the method of the first aspect or any other aspect, further comprising: A) generating: 1) a first modality similarity score by comparing the first FXR to one or more template FXRs derived from a first modality associated with the second subject; 2) a second modality similarity score by comparing the second FXR to one or more template FXRs derived from a second modality associated with the second subject; B) determining that: 1) the first modality similarity score satisfies a predetermined first modality similarity threshold and; 2) the second modality similarity score satisfies one or more predetermined second modality similarity thresholds; and C) based on the determination, verifying that the first subject and the second subject are the same subject.

According to a further aspect, the method of the first aspect or any other aspect, further comprising: A) fusing the first modality similarity score and the second modality similarity score to generate a multimodal similarity score; B) determining that the multimodal similarity score satisfies a predetermined multimodal similarity threshold; and C) based on the determination that the predetermined multimodal similarity threshold is satisfied, verifying that the first subject and the second subject are the same subject.

According to a further aspect, the method of the first aspect or any other aspect, wherein: A) the first modality associated with the first subject and the first modality associated with second subject each comprise finger anatomy; and B) the second modality associated with the first subject and the second modality associated with the second subject each comprise fingerprint minutiae.

According to a further aspect, the method of the first aspect or any other aspect, further comprising: A) generating, from the capture, a third FXR of a third modality associated with the first subject; and B) generating a third modality similarity score by comparing the third FXR to one or more template FXRs associated with a third modality of the second subject, wherein verifying that the first subject and the second subject are the same subject is further based on a determination that the third modality similarity score satisfies a predetermined third modality similarity threshold.

According to a further aspect, the method of the first aspect or any other aspect, wherein the third modality associated with the first subject and the third modality associated with the second subject comprise inner finger texture.

According to a further aspect, the method of the first aspect or any other aspect, further comprising: A) performing a quality analysis of the capture to generate a quality score; and B) comparing the quality score to a predetermined threshold, wherein the step of generating the first FXR and the second FXR is performed in response to the quality score meeting the predetermined threshold.

According to a further aspect, the method of the first aspect or any other aspect, wherein the first modality associated with the first subject comprises palm print anatomy and the second modality associated with the first subject comprises palm print minutiae.

According to a further aspect, the method of the first aspect or any other aspect, wherein: A) the capture comprises a synthetic hand image; B) the first modality associated with the first subject comprises a synthetic inner finger texture; and C) the second modality associated with the first subject comprises a synthetic fingerprint.

According to a second aspect, a system for multimodal biometric representation, comprising a server having a processor configured to: A) receive, from an image capture device, a capture associated with a first subject, wherein the capture includes at least a first modality and a second modality associated with the subject; B) generate, from the capture, a first fixed-size representation (FXR) of the first modality and a second FXR of the second modality; and C) based at least on the first FXR and the second FXR, verify that the first subject and the second subject are the same subject.

According to a further aspect, the system of the second aspect or any other aspect, wherein the processor is configured to process the capture using a segmentation neural network, wherein the segmentation neural network outputs a cropped image, and generating the first FXR and the second FXR is based at least in part on the cropped image.

According to a further aspect, the system of the second aspect or any other aspect, wherein: A) the processor is configured to compare: 1) the first FXR to a first template FXR derived from a first modality associated with a second subject; and 2) the second FXR to a second template FXR derived from a second modality associated with the second subject, wherein the processor is configured to verify that the first subject and the second subject are the same subject based on the comparison between the first FXR and the second template FXR, and the comparison between the second FXR and the second template FXR.

According to a further aspect, the system of the second aspect or any other aspect, wherein: A) the cropped image comprises at least one palm; B) the first modality associated with the first subject and the first modality associated with the second subject each comprise palm anatomy; and C) the second modality associated with the first subject and the second modality associated with the second subject each comprise palm print minutiae.

According to a further aspect, the system of the second aspect or any other aspect, wherein: A) the cropped image comprises at least one finger; B) the first modality associated with the first subject and the first modality associated with the second subject each comprise finger anatomy; and C) the second modality associated with the first subject and the second modality associated with the second subject each comprise fingerprint minutiae.

According to a further aspect, the system of the second aspect or any other aspect, wherein: A) the processor is configured to: 1) generate, from the cropped image, a third FXR of a third modality associated with the subject; 2) blend the first FXR, the second FXR, and the third FXR to generate a multimodal FXR; 3) generate a multimodal similarity score by comparing the multimodal FXR to a template multimodal FXR derived from the first modality, the second modality, and a third modality associated with the second subject, wherein i) the third modality associated with the first subject and the third modality associated with the second subject each comprise a fingerprint image; and ii) the processor is configured to verify that the first subject and the second subject are the same subject based on a determination that the multimodal similarity score satisfies a predetermined multimodal similarity threshold; and B) the system comprises at least one database configured to store the template multimodal FXR.

According to a further aspect, the system of the second aspect or any other aspect, wherein the processor is configured to blend the first FXR, the second FXR, and the third FXR sequentially.

According to a further aspect, the system of the second aspect or any other aspect, wherein the processor is configured to blend the first FXR, the second FXR, and the third FXR directly.

According to a third aspect, a method for multimodal biometric representation, comprising: A) receiving a digital image of a subject, wherein the digital image of the subject comprises at least one index finger of the subject; B) segmenting the digital image into at least one index fingerprint image; C) extracting, from the at least one index fingerprint image, index fingerprint minutiae, and an index inner finger texture; D) generating: 1) a first FXR based on the at least one index fingerprint image; 2) a second FXR based on the index fingerprint minutiae; and 3) a third FXR based on the index inner finger texture; and E) storing the first FXR, second FXR, and third FXR in one or more registries.

According to a further aspect, the method of the third aspect or any other aspect, further comprising: A) segmenting the digital image into the at least one index fingerprint image and at least one middle fingerprint image, wherein the digital image further comprises at least one middle finger of the subject; B) extracting, from the at least one middle fingerprint image, middle fingerprint minutiae and an middle inner finger texture; C) generating: 1) a fourth FXR based on the at least one middle fingerprint image; 2) a fifth FXR based on the middle fingerprint minutiae; and 3) a sixth FXR based on the middle inner finger texture; and D) storing the fourth FXR, second FXR, and third FXR in the one or more registries.

According to a fourth aspect, a process comprising: A) obtaining first data associated with at least one historical data attack; B) encoding the first data into at least one fixed-size representation; C) generating at least one anonymized vector representation based on the at least one fixed-size representation; D) obtaining second data associated with a potential attacker; E) encoding the second data into at least one additional fixed-size representation; F) generating a second anonymized vector representation based on the at least one additional fixed-size representation; and G) generating a confidence measure of the potential attacker as an attacker based on a comparison between the at least one anonymized vector representation and the second anonymized vector representation.

According to a further aspect, the process of the fourth aspect or any other aspect, wherein: A) the first data comprises a plurality of entries individually associated with a different historical data attack; and B) the process further comprises: 1) generating a plurality of fixed-size representations based on each of the plurality of entries; 2) generating the at least one anonymized vector representation and a plurality of additional anonymized vector representations based on the plurality of fixed-size representations; 3) generating, via a clustering algorithm, at least one cluster based on the at least one anonymized vector representation and the plurality of additional anonymized vector representations; and 4) generating a confidence measure of the potential attacker as the attacker based on a comparison between the second anonymized vector representation and the at least one cluster.

According to a further aspect, the process of the fourth aspect or any other aspect, wherein: A) the first data comprises: 1) a first entry associated with a first data type; and 2) a second entry associated with a second data type; B) the second data comprises at least one entry of the first data type and at least one entry of the second data type.

According to a further aspect, the process of the fourth aspect or any other aspect, wherein: A) generating the at least one anonymized vector representation comprises: 1) encoding the first entry into the at least one fixed-size representation; 2) encoding the second entry into a second fixed-size representation; 3) generating a second fixed-size representation based on the second entry; and 4) generating the anonymized vector representation based on the at least one fixed-size representation and the second additional fixed-size representation; and B) generating the second anonymized vector representation comprises: 1) encoding the at least one entry of the first data type into the at least one additional fixed-size representation; 2) encoding the at least one entry of the second data type into a third fixed-size representation; and 3) generating the second anonymized vector representation based on the at least one additional fixed-size representation and the third fixed-size representation.

According to a further aspect, the process of the fourth aspect or any other aspect, wherein the first data type comprises a media access control (MAC) address and the second data type comprises an internet protocol (IP) address.

According to a further aspect, the process of the fourth aspect or any other aspect, wherein the first data type comprises a Subscriber Identity Module (SIM) number and the second data type comprises a device location.

According to a further aspect, the process of the fourth aspect or any other aspect, wherein the first data type comprises a device operating system (OS) and the second data type comprises at least one of a MAC address, IP address, and Bluetooth address.

According to a further aspect, the process of the fourth aspect or any other aspect, wherein the first data type comprises a device class and the second data type comprises a domain name system (DNS) request.

According to a further aspect, the process of the fourth aspect or any other aspect, wherein: A) the first data further comprises a third entry associated with a third data type; and B) the second data further comprises at least one entry associated with the third data type.

According to a fifth aspect, a system, comprising: A) a server having a processor configured to: 1) receive, from a first computing device, first data associated with at least one historical data attack; 2) encode the first data into at least one fixed-size representation; 3) generate at least one anonymized vector representation based on the at least one fixed-size representation; 4) receive, from a second computing device, second data associated with a potential attacker; 5) encode the second data into at least one additional fixed-size representation; 6) generate a second anonymized vector representation based on the at least one additional fixed-size representation; and 7) generate a confidence measure of the potential attacker as an attacker based on a comparison between the at least one anonymized vector representation and the second anonymized vector representation.

According to a further aspect, the system of the fifth aspect or any other aspect, wherein the processor is configured to: A) receive a request associated with the potential attacker; B) process the request to identify a target user account; and C) transmit an alert to a service associated with the target user account.

According to a further aspect, the system of the fifth aspect or any other aspect, wherein the alert causes the service to deny the request.

According to a further aspect, the system of the fifth aspect or any other aspect, wherein the processor is configured to transmit an alert to a computing device associated with the target user account.

According to a further aspect, the system of the fifth aspect or any other aspect, wherein the processor is configured to transition the target user account to a locked state.

According to a further aspect, the system of the fifth aspect or any other aspect, wherein the processor is configured to enable a dual-authentication setting associated with the target user account.

According to a further aspect, the system of the fifth aspect or any other aspect, further comprising at least one data store configured to store the first data, wherein the processor is configured to: A) store the at least one anonymized vector representation at the at least one data store; and B) based on the confidence measure of the potential attacker as the attacker: 1) store the second anonymized vector representation at the at least one data store; and 2) record, at the at least one data store, an association between the first data and the second data.

According to a further aspect, the system of the fifth aspect or any other aspect, wherein, the at least one processor is configured to, based on the confidence measure of the potential attacker as the attacker: A) generate a cluster based on the at least one anonymized vector representation and the second anonymized vector representation; and B) store the cluster at the at least one data store.

According to a sixth aspect, a non-transitory, computer-readable medium comprising instructions that, when executed by a computer, cause the computer to: A) obtain a plurality of data entries, wherein each of the plurality of data entries is associated with a different historical data attack; B) encode the plurality of data entries into a plurality of fixed-size representations based on the plurality of data entries, wherein each of the plurality of fixed-size representations corresponds to one of the plurality of data entries; C) receive, from a computing device, a second plurality of data entries, wherein each of the second plurality of data entries is associated with a different suspected data attack; D) generate a second plurality of fixed-size representations based on the second plurality of data entries, wherein each of the second plurality of fixed-size representations corresponds to one of the plurality of second data entries; E) perform a one-to-many comparison process between the plurality of fixed-size representations and the second plurality of fixed-size representations to determine a subset of the second plurality of fixed-size representations that demonstrate a threshold-satisfying similarity to one of the plurality of fixed-size representations; F) based on the subset of the second plurality of fixed-size representations, positively identify a corresponding subset of the second plurality of data entries as being associated with a data attack; and G) transmit, to the computing device, the subset of the second plurality of data entries.

According to a further aspect, the non-transitory, computer-readable medium of the sixth aspect or any other aspect, wherein the instructions, when executed by the computer, further cause the computer to: A) generate a dataset comprising the plurality of fixed-size representations and the subset of the second plurality of fixed-size representations; and B) store the dataset at a data store.

According to a further aspect, the non-transitory, computer-readable medium of the sixth aspect or any other aspect, wherein the instructions, when executed by the computer, further cause the computer to: A) generate one or more device profiles based on the plurality of data entries and the subset of the second plurality of data entries; and B) transmit the one or more device profiles to the computing device.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
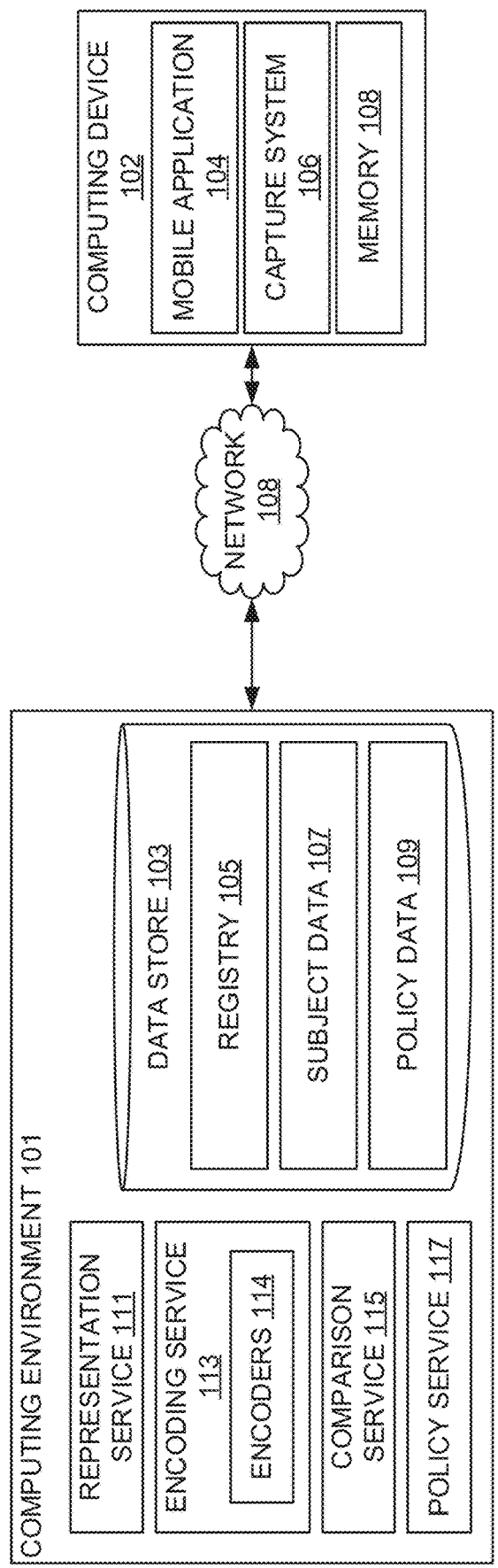
FIG. 1 shows a multimodal biometric system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As used herein, "biometric representation" generally refers to an electronic representation (e.g., data object(s)) of biometric signatures sourced from biometric sources including, but not limited to, facial scans, palm scans, fingerprints, retinal scans, sounds, and signals, among others. Thus, the present biometric sources are not limited to physical or behavioral sources, but may include any source that produces data suitable for representation via a set of unrelated data objects. In some embodiments, the biometric representation is a hash that is generated by hashing biometric data according to one or more transformation parameters, techniques, and/or algorithms. As used herein, biometric representation can be synonymous and used interchangeably with "biometric template."

As used herein, "privacy-secured token" generally refers to a transformed biometric template (e.g., or embedded vector) that is generated by applying one or more transformation to an original template to create a transformed biometric template that obfuscates the original data of the original template. In at least one embodiment, a privacy-secured token may be a biohash or an irreversibly transformed identity token ((IT) 2 token), that can be used in place of a source biometric template in biometrics matching processes for verifying or uniquely identifying individuals. In the present disclosure, the terms privacy-secured token, privacy-secured template, biohash, and (IT) 2 token may be used interchangeably.

As used herein, "irreversible transform" generally refers to one or more algorithms or other techniques that are applied to a first data object to generate a second data object that contains less information than the first data object such that the second data object cannot be reverse-transformed to recover the first data object. An irreversible transform may be performed according to one or more embodiments as described in:

U.S. patent application Ser. No. 16/841,269, filed Apr. 6, 2020, entitled "SYSTEMS AND PROCESSES FOR LOSSY BIOMETRIC REPRESENTATIONS," which claims the benefit of and priority under U.S. Patent Application No. 62/829,625, filed Apr. 5, 2019, entitled "EVERGREEN HASH"; and U.S. patent application Ser. No. 16/406,978, filed May 8, 2019, entitled "SYSTEMS AND METHODS FOR ENHANCED HASH TRANSFORMATIONS," which claims the benefit of and priority under: U.S. Application No. 62/829,825, filed Apr. 5, 2019, entitled "EVERGREEN HASH"; and U.S. Application No. 62/668,576, filed May 5, 2018, entitled "THE EVERGREEN HASH"; the disclosures of which are incorporated herein by reference as if fully set forth herein in their entireties.

As used herein, a "capture" generally refers to data derived from an original source (for example, a living subject) and that was received at or generated by a computing environment of the present biometric systems (e.g., or generated by a computing device in communication therewith). In at least one embodiment, a capture refers to any data from which biometric representations and/or non-biodata representations are derived or extracted. In one example, a capture includes an image of a subject including the subject's face. In another example, a capture includes an image of a subject's hand (e.g., including a palm and one or more fingers). In another example, a capture includes an image or other data representation of a subject's iris. A capture can refer to data derived from a synthetically generated original source or can refer to the original source itself. For example, a capture can refer to an artificial hand that was synthetically generated based on a pseudorandom seed value. In another example, a capture can refer to synthetic fingerprint minutiae derived from a synthetically generated finger. As used herein, data defining a synthetic source is generally referred to as "synthetic data."

As used herein, a "similarity score" generally refers to a distance score, such as, for example, a Euclidean distance or $L^2$ norm metric, or a probability score (e.g., a measure of the likelihood that two representations are derived from the same source). The similarity score may be referenced as a "confidence measure." For example, the similarity score can be a confidence measure for a potential attacker being the same entity as a historical attacker." The similarity score can refer to a measure of distance or difference between vector-based representations. For example, the similarity score can refer to a value of cosine similarity or Pearson coefficient. In various embodiments, the above referenced distance formulae result in substantially identical matching performance due to the use of normalized cohort vectors. According to one embodiment, in cases where privacy-secured tokens are used, the matching performance may be substantially similar. In either case, it will be understood and appreciated that one or more embodiments of the present system may use one or more algorithms or optimization techniques to support computational efficiency and improve matching speed.

In at least one embodiment, the process of transforming an original biometric scan into a derived biometric template is referred to as "embedding." In the present system, embedding may be achieved by performing one or more comparisons. According to various embodiments, the present system may utilize one-to-many comparison techniques, which involve comparing a probe sample to a set of cohort templates to produce a set of similarity scores. The one-to-many technique may quantify comparisons by calculating, between the probe sample and each (stored or other reference) template, a Euclidean distance or an $L^2$ norm metric. While the exact computation for each metric varies, each metric may result in identical biometric matching performance because normalized cohort vectors can be generated from metrics produced in either approach. In one example, the set of similarity scores are used as a representation of the probe template and are further transformed into a privacy-secured token (e.g., by a lossy transformation technique) to further increase security and privacy. In another example, the set of similarity scores are used to identify the subject associated with the probe template (e.g., a highest-scoring cohort template being identified as representing the subject). In various embodiments, the present system may implement one or more algorithmic techniques, such as cohort selection algorithms, to increase computational efficiency of one-to-many comparison processes, which may be desirable, for example, in instances where large databases (e.g., in excess of one million subjects) are processed.

In the present disclosure, the descriptor "probe" can be used to refer to a representation (e.g., or source associated therewith) that may or may not be derived from the same source as another representation. For example, a probe fixed size representation (FXR) generally refers to a FXR that may or may not be derived from the same source as a second FXR (e.g., referred to as an enrollment FXR or a template FXR). In another example, a probe subject generally refers to a subject that may or may not be the same as a previous subject for which an enrollment FXR was previously generated.

Overview

Aspects of the present disclosure generally relate to multimodal biometric systems and processes.

In various embodiments, the present system generates multimodal, multi-factor representations and performs various processes for storing and securing data using the same. In at least one embodiment, the system performs various operations including embedding, blending, binding, unbinding, analyzing, and generating operations summarized in Table 1.

TABLE 1

Exemplary System Operations

| Operation | Function | Input Example | Output Example |
|---|---|---|---|
| Embed (enrollment or comparison) | To extract discriminative features of biometric data and/or non-biodata to produce a fixed size representation (FXR) | Cropped and aligned biometric image or signal | FXR |
| Blend (enrollment or comparison) | To combine two or more FXRs together to create a permanently blended FXR (without discretization) or privacy-secured token (e.g., after discretization) | Two or more FXRs (which can be enrollment FXRs, probe FXRs, or nonce FXRs) | FXR |
| Bind (enrolment only) | To bind a FXR or privacy-secured token with secret data, producing a pseudonymous identifier (PI) and auxiliary data (AD) as outputs | Enrolment FXR, Secret or PIN (a stable key) | Pseudonymous Identifier (PI) that serves as a stable token, and Auxiliary Data (AD) |
| Unbind (comparison only) | To unbind the PI using an authentic FXR or privacy-secured token, releasing the injected secret (e.g., PIN) upon successful decoding | Probe FXR, AD | Secret or PIN (e.g., a stable key) |
| Analyze (enrollment only) | To produce AD containing an error correcting code given a FXR or privacy-secured token | Enrolment FXR | AD |
| Generate (comparison only) | To produce a PIN given an AD and a FXR or privacy-secured token | Probe FXR, AD | Secret or PIN (e.g., a stable key) |

Figure 13:
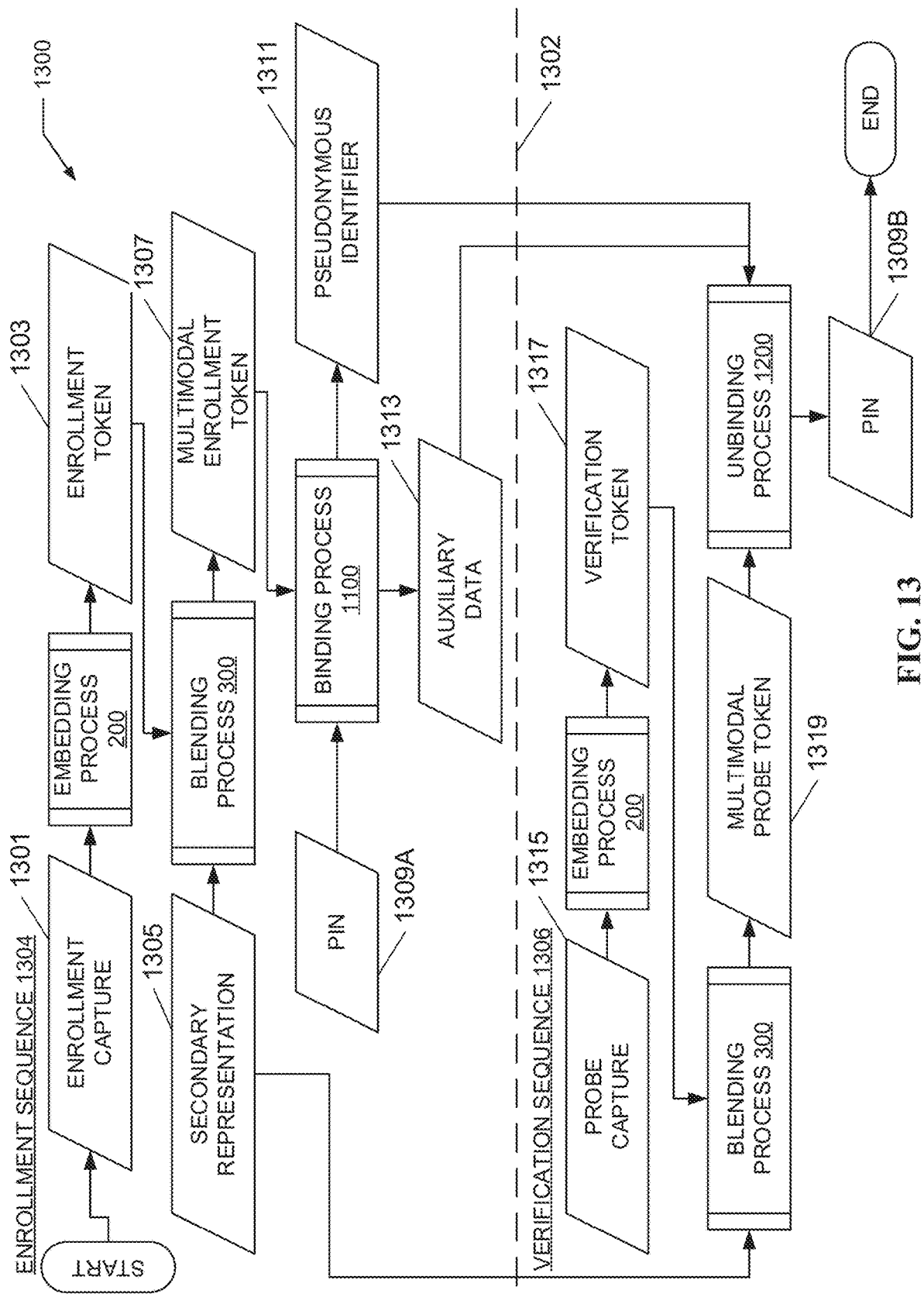
FIG. 13 shows a key binding and unbinding process, according to one embodiment of the present disclosure.
Figure 14:
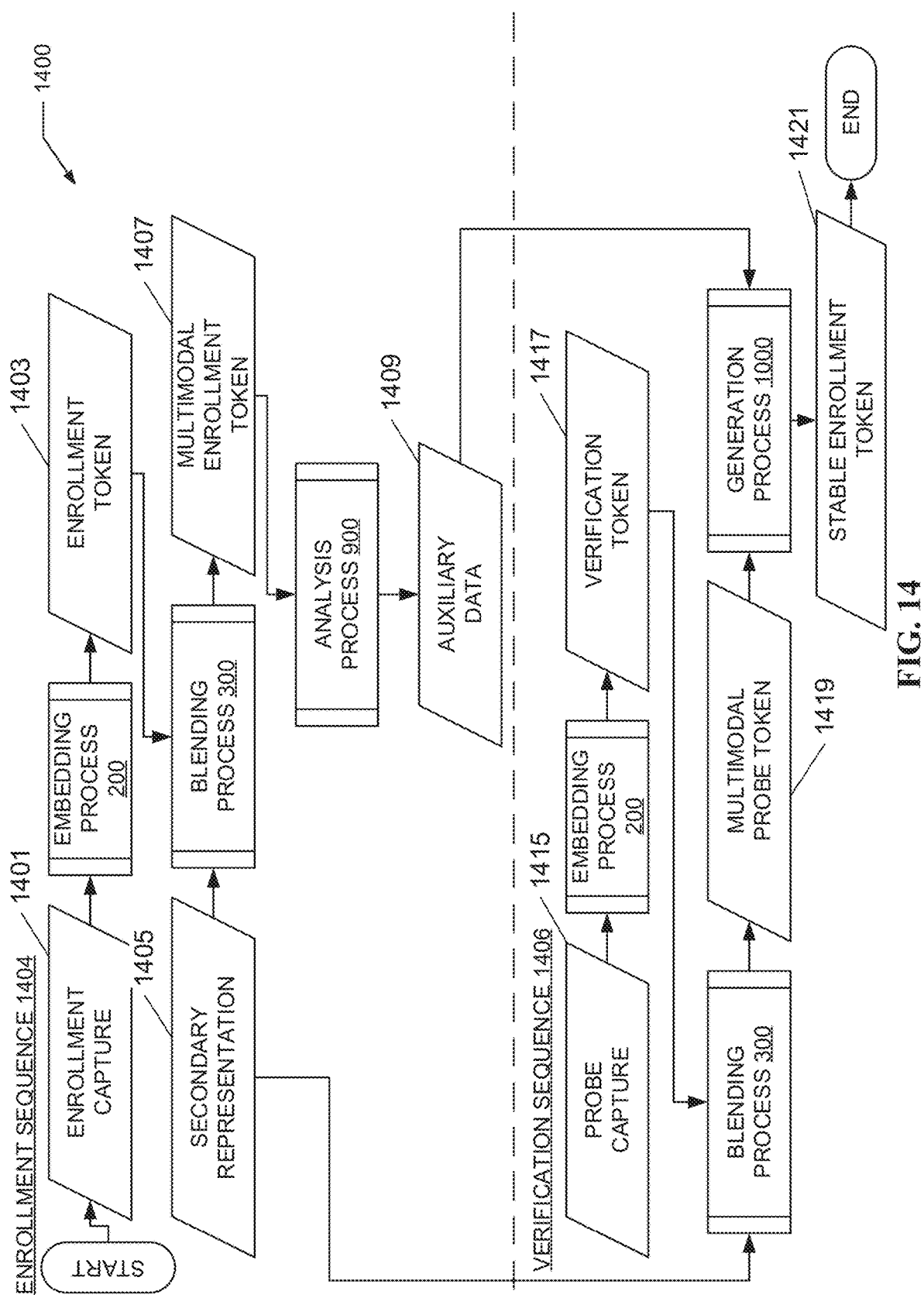
FIG. 14 shows a key generation process, according to one embodiment of the present disclosure.

In one or more embodiments, the exemplary operations of Table 1 provide a library of actions by which various biometric processes can be performed (e.g., such as the key binding process 1300 show in FIG. 13 or the key generating processes 1400 shown in FIG. 14). According to one embodiment, the system operations allow for versatility and flexibility in enabling the creation of infinite enumerations of biometric-based security architectures that can support multimodal and multi-factor biometric-based authentication.

In at least one embodiment, a PIN is a knowledge-based secret that can be used as stable key or string in conventional cryptographic systems. In one or more embodiments, biometric data refers to outputs of a biometric capture software developer kit (SDK) or sensor. Non-limiting examples of the outputs include face images, palm print images, iris scans, hand images, vasculature scans, and biological signals (e.g., vitals, speech signals, etc.). In one or more embodiments, non-biodata refers to data that is not derived from a biometric capture, but is otherwise associated with a subject. Non-limiting examples of non-biodata include driver's license number, social security number, location provenance records, name, contact information, username, medical data, and other personally identifying information (PII). In at least one embodiment, non-biodata includes auxiliary data, error correcting codes, and/or pseudonymous identifiers.

In various embodiments, a fixed-size representation (FXR) is a vector derived from biometric data, non-biodata, and/or a PIN. In one or more embodiments, two FXRs can be compared using a similarity metric, such as a distance score. According to one embodiment, the present systems and processes generate FXRs such that two FXRs originating from the same information source (e.g., a subject, object, or computing device) demonstrate a close distance (e.g., a close similarity), and such that two FXRs originating from different information sources (e.g., different subjects, objects, or computing devices) demonstrate a large distance (e.g., significant dissimilarity).

In one or more embodiments, a multimodal FXR refers to a FXR generated by directly or sequentially blending two or more FXRs (e.g., and/or embedded vectors, such as an embedded PII, PIN, or device vector). In at least one embodiment, the multimodal FXR improves biometric security by increasing the difficulty of producing or reconstructing an unauthorized representation, because multiple information sources are required to generate the multimodal FXR. In one example, a multimodal FXR blends a face image FXR and a palm print image FXR. In another example, a multimodal privacy-secured token (e.g., an irreversibly transformed FXR) blends a finger print privacy-secured token, a non-biodata privacy-secured token, and a palm print privacy-secured token. In various embodiments, a multimodal FXR can be generated such that authentication between the multimodal FXR and a unimodal, probe FXR (e.g., of a modality corresponding to at least one modality of the multimodal FXR) releases a PIN or other secret that is secured via the multimodal FXR. In some embodiments, a multimodal FXR can be generated such that only authentication between the multimodal FXR and multimodal probe FXR releases the PIN or other secret. In at least one embodiment, during generation of the multimodal FXR via blending, the present biometric system can assign different weights to each input modality and, thereby, control a contribution of each input modality to the output multimodal FXR. For example, the biometric system can assign a greater weight value to a facial image FXR and a lower value to an embedded username vector.

In one or more embodiments, a pseudonymous identifier (PI) is public data derived from a FXR. In one example, the PI is an output of binding a FXR and a PIN (e.g., according to the binding process 1100 shown in FIG. 11). According to one embodiment, the PI can be public information because the PI does not provide information about the input from which it was derived (e.g., the FXR or the PIN). In various embodiments, auxiliary data (AD) includes data that is used in combination with quantization processes and/or error correcting code (ECC) to derive a stable or deterministic key (e.g., a PIN or other secret) from a FXR. In one or more embodiments, the AD defines parameters by which quantization and/or error correction are performed. According to one embodiment, AD is defined by ISO 24745. In at least one embodiment, error correcting code (ECC) includes any parameters required to transform noisy data to a stable version. For example, ECC includes parameters for applying error correction to a probe FXR and, thereby, generating a stable FXR for purposes of biometric authentication.

Exemplary System Architecture

Referring now to the figures, for the purposes of example and explanation of the fundamental processes and components of the disclosed systems and processes, reference is made to FIG. 1, which illustrates an exemplary biometric system 100. As will be understood and appreciated, the biometric system 100 shown in FIG. 1 represents merely one approach or embodiment of the present system, and other aspects are used according to various embodiments of the present system.

In various embodiments, the biometric system 100 includes a computing environment 101 that communicates, via a network 108, with at least one computing device 102. The computing environment 101 can include a server computer, or any other system providing computing capability. Alternatively, the computing environment may employ a plurality of computing devices that may be arranged, for example, in one or more server banks or computer banks or other arrangements. Such computing devices can be located in a single installation or may be distributed among many different geographical locations. For example, the computing environment can include a plurality of computing devices that together may include a hosted computing resource, a grid computing resource, and/or any other distributed computing arrangement. In some cases, the computing environment can correspond to an elastic computing resource where the allotted capacity of processing, network, storage, or other computing-related resources may vary over time.

According to one embodiment, the computing device 102 generally refers to electronic systems and devices that capture, process, store, and/or perform actions based at least in part on biometric data. In at least one embodiment, the computing device 102 includes any capture device or system in communication with a capture device (e.g., such as a surveillance system connected to one or more security cameras). Non-limiting examples of the computing device 102 include mobile devices (e.g., such as smartphones, tablets, smart accessories, etc.), network-enabled camera systems, and Internet of Things (IoT) devices. In various embodiments, the computing device 102 includes a mobile application 104 for accessing services and functions of the computing environment 101, and for transmitting data therebetween. In some embodiments, embedding a biometric scan (e.g., and/or non-biodata) includes installing and/or registering the mobile application 104 to the computing device 102.

In at least one embodiment, the computing device 102 includes a capture system 106, such as a scanner, camera, microphone, touch screen, and other input recording devices. In various embodiments, the capture system 106 captures biometric data, such as facial scans or fingerprint images, and transmits the biometric data to the computing environment 101. In at least one embodiment, the mobile application 104 receives biometric data, such as images or other files, and processes the biometric data through a biometric matcher (e.g., according to a particular capture software development kit (SDK) and a particular matcher SDK).

In one or more embodiments, the computing device 102 includes memory 108 for storing various data, such as, for example, multimodal representations, multimodal tokens, pseudonymous identifiers, and encrypted data. In one example, the memory 108 stores scannable media (e.g., a QR code, barcode, etc.) that includes a pseudonymous identifier and encrypted data. In one or more embodiments, the mobile application 104 generates and causes the computing device 102 to render user interfaces for accessing services and functions of the computing environment 101, for rendering instructions and other information from the computing environment 101, and for receiving input from the user (e.g., selections to fields, typed input, etc.). In one example, the mobile application 104 generates a user interface including alignment and lighting instructions for capturing a biometric image. In another example, the mobile application 104 receives and causes the computing device 102 to render a user interface including decrypted data from a successful biometric authentication (e.g., such as a key binding and unbinding process 1300 shown in FIG. 13 or a key generation process 1400 shown in FIG. 14).

The network 108 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks. The biometric system 100 can communicate with a first computing device 102 over a first network 108 and communicate with a second computing device 102 over a second network. The computing device 102 can refer to a device controlled by a subject to-be-represented and/or -evaluated by the present systems and processes. In at least one embodiment, the computing environment 101 accesses one or more application programming interfaces (API) to facilitate communication and interaction between the computing environment 101 and one or more external systems 102.

The computing environment 101 can execute various applications and functionalities described herein. Various data can be stored at the computing environment 101 in a data store 103. The data stored in the data store 103, for example, may be associated with the operation of the various applications and/or functional entities described below. The data store 103 can be representative of a plurality of databases as can be appreciated. In various embodiments, the data store 103 includes, but is not limited to, one or more registries 105, subject data 107, and policy data 109. In various embodiments, the registry 105 stores biometric representations (e.g., fixed-size representations, privacy-secured tokens, etc.) and identifiers for associating the biometric representations with one or more subjects or groupings. In one or more embodiments, the data store 103 includes historical attack data associated with one or more digital attacks. In at least one embodiment, the historical attack data includes data associated with attacker devices and activities associated therewith, such as requests received from the attacker devices. In at least one embodiment, as further defined herein in the description of FIGS. 22A-B, the historical attack data includes particular data associated with the historical attack or attacker device, such as, for example, an IP address, a MAC address, a device identifier, or an attack target. In one or more embodiments, the data store 103 includes fixed-size representations (FXRs) and/or anonymized vector representations derived from historical attack data. In some embodiments, the data store 103 includes one or more clusters derived from the FXRs or the anonymized vector representations. The present systems and processes can perform clustering of FXRs or privacy secured tokens for purposes including, but not limited to, database deduplication, identification, verification, and combinations thereof. In at least one embodiment, the data store 103 includes one or more device profiles associated with the historical attack data (e.g., or associated with particular data having positively identified as being associated with an attack).

The registry 105 can store multiple biometric representations of the same subject. The computing environment 101 can delete biometric representations from the registry 105 and, thereby, "cancel" the link between the biometric representations and subjects represented thereby. According to one embodiment, the unlinkability and cancellability of the present biometric representations advantageously improves security and reduces a likelihood that biometric data or other PII can be accessed, viewed, or generated by an attacker. In at least one embodiment, the registry 105 can store fixed-size representations or anonymized vector representations of historical attack data or particular data that has been positively identified as being associated with an attack.

In one or more embodiments, the subject data 107 includes information associated with a subject (e.g., an individual whose biometric information is recorded and represented by the biometric system 100). The subject data 107 can include, for example, enrollment representations, biometric transformation parameters (e.g., for generating, transforming, and reverse-transforming biometric representations of a subject or subject data), encrypted data, pseudonymous identifiers, error correcting codes, and auxiliary data with which the subject is associated. In one example, the subject data 107 includes biometric templates, enrollment biometric representations (e.g., also referred to as "template" representations), and encrypted PII associated with a subject. In some embodiments, the data store 103 stores the subject data 107 at a remote computing environment that is only accessible to the computing environment 101. In at least one embodiment, the data store 103 is a remote database. For example, the data store 103 is remote from the computing environment 101 and the computing environment 101 accesses the data store 103 via the network 108 (e.g., or another secured network connection). The data store 103 can be server- or blockchain-based. The data store 103 can secure access to the subject data 107 based on pins or other cryptographic keys. In one example, the data store 103 secures subject data 107 of each subject using a pin or other security measure that uniquely corresponds to the subject (e.g., or the subject's computing device).

In some embodiments, subject data 107, such as, for example, encrypted PII, is not stored at the data store 103. In one example, subject data 107 is never stored on a permanent basis at the computing environment 101 and, instead, the computing environment 101 encrypts and packages subject data in a biometric-protected data object. In this example, the biometric-protected data object is a QR code that includes a pseudonymous identifier and allows for release of the encrypted subject data 103 in response to presentation of a live, subject matching biometric probe.

In at least one embodiment, the policy data 109 includes information defining policies by which a policy service 117 analyzes and evaluates biometric representations, biometric comparisons, and biometric data. In one example, the policy data 109 includes one or more predetermined similarity thresholds for determining biometric identification and verification decisions. In another example, the policy data 109 includes a liveness threshold for determining liveness verification decisions. In another example, the policy data 109 includes predetermined thresholds for image quality, brightness, contrast, anatomical geometry, and other factors for which biometric scans, or representations thereof, are evaluated.

In one or more embodiments, because the data store 103 may only store biometric representations derived using proprietary processes and pseudorandom seeds, the data stores 103 does not include any original biometric scans, thereby reducing a risk of exposing subjects' biometric data, for example, if the database were compromised or breached. Furthermore, in the event of a breach at the data store 103, stolen subject data 107 may be unusable to an attacker, because the breached information is not directly linked to a subject's actual likeness.

In various embodiments, the computing environment 101 includes a representation service 111, an encoding service 113, a comparison service 115, and a policy service 117. The representation service 111 can receive biometric data (e.g., and non-biodata, such as PII) and generate fixed-size biometric representations of the biometric data. In some embodiments, biometric representation generation is referred to as biometric "embedding" (e.g., for example, as shown in the biometric embedding process 200 of FIG. 2). For example, the representation service 111 can receive a facial image and generate a fixed-size, vector-based representation of the facial image. In the same example, the representation service 111 can generate a privacy-secured token of the fixed-size representation of the facial image by applying a lossy transformation to the fixed-size, vector-based representation. The representation service 111 can perform hashing processes for translating biometric data from a variable-size representation to a fixed-size representation. The representation service 111 can generate biometric representations based on one or more transformation parameters, and can define the one or more transformation parameters based on a pseudo-randomly generated value (e.g., referred to as a pin or a seed value). The representation service 111 can perform functions including, but not limited to, embedding, blending, analysis, generation, binding, unbinding, key binding, and key generation (e.g., for example, as described in FIGS. 2-14).

The representation service 111 can perform biometric capture processes, such as, for example, image realignment, masking, and feature extraction. For example, the representation service 111 may include a biometric capture software developer kit (SDK). The representation service 111 can generate a biometric representation by encoding a biometric scan into a vector-based representation, normalizing the vector-based representation, performing a one-to-many comparison between the normalized vector-based representation and a set of unrelated biometric representations (e.g., referred to as a "gallery"), and defining the biometric representation based on the comparison. The representation service 111 can generate a privacy-secured token by applying a lossy, irreversible transform that tokenizes the biometric representation such that the output token contains less information as compared to the biometric representation. In one or more embodiments, the representation service 111 applies a whitening transformation (e.g., such as an iterative spherical whitening transformation) to embedded vectors or fixed size biometric representations prior to converting the embedded vectors or fixed size biometric representations to irreversibly transformed, privacy-secured tokens. According to one embodiment, the whitening transformation improves token security by increasing a difficulty of reversing an irreversible transformation or reconstructing a biometric sample or representation with which a privacy-secured token is associated.

In at least one embodiment, the representation service 111 generates a biometric representation based on a pseudorandom seed value that defines one or more transformation parameters by which a probe biometric scan is translated into a template biometric representation and/or a privacy-secured token. In some embodiments, the encoding service 113 combines the biometric representation and pseudorandom seed value via an encoder 114. The encoder 114 can generate a combined biometric representation such that the pseudorandom seed value can be re-generated or otherwise obtained by comparing the combined biometric representation (e.g., a template biometric representation) to a probe biometric representation associated with the same subject. In one or more embodiments, the representation service 111 applies one or more hashing functions, rules, or algorithms to biometric representations (e.g., or other embedded vectors) to generate hashed versions thereof. In at least one embodiment, the representation service 111 generates data objects for storing biometric representations and/or other data, such as, for example, pseudonymous identifiers, auxiliary data, encrypted data, and biometric hashes. In one example, the representation service 111 generates a QR code (e.g., or other scannable media) including a pseudonymous identifier and encrypted data. In at least one embodiment, the representation service 111 can generate a data object including encrypted data that can be released in response to a positive biometric match (e.g., between an enrollment, or "template," representation of a subject and a probe representation that may represent the same subject).

In one or more embodiments, the representation service 111 performs quantization processes to discretize a FXR (e.g., a vector) with floating point numbers to an 8-bit signed integer. For example, the representation service 111 applies a quantization function to a FXR input of [0.34, 0.53, −0.3] to generate a discretized output [21, 50, −20]. In at least one embodiment, the representation service 111 performs error analysis processes to generate an ECC based on a quantized FXR (e.g., referred to as a qFXR). In one example, the error analysis process is invoked when processing an enrollment biometric sample. In this example, the qFXR of the enrollment biometric sample becomes a stable key that may be constructed during subsequent comparison processes (e.g., such as biometric verification) using the ECC. In some embodiments, the error analysis process uses two or more non-quantized FXRs (e.g., instead of a single qFXR instance). In various embodiments, the representation service 111 performs error correction processes to recreate a stable key (e.g., such as an enrollment qFXR) given a probe qFXR and ECC (e.g., ECC with which the qFXR is associated). In one or more embodiments, the representation service 111 performs hashing processes to generate a hash of a stable key. In some embodiments, the representation service 1111 adds salt data to diversify the hash.

In some embodiments, the representation service 111 includes a synthetic data generator that generates artificial representations of anatomy or other data (e.g., for example, text strings) to be represented via the present processes. In various embodiments, synthetic data demonstrates one or more advantages over real data, such as, for example infinite variation, cost effectiveness, lack of data privacy concerns, full and precise control over ambient environment, simulatability, and accuracy (e.g., due to use of metadata for labelling synthetic images). In one or more embodiments, the representation service 111 generates a synthetic image by generating a synthetic anatomy texture (e.g., such as a synthetic fingerprint patch) and a synthetic anatomy shape (e.g., such as a three-dimensional synthetic fingertip). In various embodiments, the representation service 111 renders the synthetic image by mapping the synthetic anatomy texture to the synthetic anatomy shape and rendering the synthetic mapping in three dimensions. In at least one embodiment, parameters of the synthetic anatomy texture and the synthetic anatomy shape can be define based on a pseudorandom seed value. In one or more embodiments, the synthetic anatomy shape includes configurable settings for thickness, base skin color, and other suitable properties. In at least one embodiment, the synthetic anatomy texture includes configurable settings for minutiae type and other suitable properties. In one or more embodiments, the three-dimensional rendering includes configurable settings for ambient light source, anatomy orientation, synthetic texture quality (e.g., for generating oily textures, dry textures, etc.), distance from a virtual camera, and other suitable properties.

In one or more embodiments, the representation service 111 generates fixed-size representations (FXRs) of historical attack data or particular data that has been positively identified as being associated with an attack. In at least one embodiment, the representation service 111 generates anonymized vector representations of the FXRs. In some embodiments, the representation service 111 generates clusters based on the FXRs or the anonymized vector representations.

In various embodiments, the encoding service 113 generates representations of data via one or more encoders 114 that encode various data types into embedded vectors or other fixed size representations. For example, the encoding service 113 includes a string encoder that encodes non-biodata into embedded vectors, which serve as fixed size representations of the non-biodata. In some embodiments, the encoding service 113 generates fixed size representations on behalf of the representation service 111. In another example, the encoding service 113 includes a neural network encoder (e.g., such as arcface or dlib) that generates a fixed size representation of a facial image. In at least one embodiment, the encoding service 113 includes encoders 114 for encoding various data types into embedded vectors. In one or more embodiments, the encoders 114 include neural network or other machine learning-based encoders. Non-limiting examples of encoders 114 include palm print encoders, facial encoders, iris encoders, anatomical geometry encoders (e.g., such as hand geometry encoders), image encoders, and anatomical minutiae encoders (e.g., such as an anatomical texture encoder for inner finger texture). In at least one embodiment, the encoders 114 include one or more encoders for translating a biometric representation (e.g., or biometric scan) from a native vendor format to an open or common format, thereby providing for representation interoperability across multiple vendors utilizing disparate biometric embedding processes. In various embodiments, the encoding service 113 encodes into one or more FXRs historical attack data or particular data that may be associated with an attack. For example, the encoding service 113 encodes an IP address into an FXR. As another example, historical attack data includes a MAC address, an IP address, and an operating system identifier of an attacker computing device. In this example, the encoding service 113 may encode each of the MAC address, the IP address, and the operating system identifier into a respective FXR (e.g., which may be further blended into a multimodal and/or multifactor FXR as shown and described herein).

In one or more embodiments, the comparison service 115 performs biometric representation and embedded vector matching processes, such as, for example, one-to-one comparisons for biometric validation and one-to-many comparisons for biometric identification and/or database deduplication. In at least one embodiment, the comparison service 115 performs one-to-one and one-to many comparisons of biometric representations or privacy-secured tokens for the purposes of biometric validation and identification. According to one embodiment, the comparison service 115 performs a biometric representation comparison by calculating a distance metric (e.g., a squared Euclidean distance, $L^2$ norm, cosine similarity value, etc.) between a probe biometric representation and one or more template representations. In at least one embodiment, the policy service 117 applies a policy to the comparison by determining whether the distance metric (e.g., referred to as a similarity score) satisfies a predetermined accuracy threshold. In some embodiments, the comparison service 115 compares a probe biometric representation to two or more template representations that are associated with the same subject, and the comparison service 115 averages the output similarity scores to generate a multi-template, fusion-based score.

In one example, to perform biometric validation, the comparison service 115 receives an identifier and a probe biometric representation. In this example, based on the identifier, the comparison service 115 retrieves a template biometric representation from the registry 109 and computes a similarity score between the probe biometric representation and the template biometric representation. Continuing the example, policy service 117 determines that the similarity score meets a minimum matching threshold, and the comparison service 115 positively verifies the identity of the subject with the probe biometric template is associated. In one example, to perform biometric identification, the comparison service 115 generates a similarity score between a probe biometric representation and each of a set of biometric template representations. In this example, the comparison service 115 ranks the biometric template representations by similarity score and the policy service 117 determines that a top-ranked score satisfies a minimum matching threshold. Continuing the example, the comparison service 115 determines the identity of the subject with which the probe biometric representation is associated to be that of the top-ranked template biometric representation.

In various embodiments, the policy service 117 evaluates inputs, outputs, and intermediaries of the biometric system 100 based on policy data 109. For example, the policy service 117 compares a liveness verification score to a predetermined liveness verification threshold stored in policy data 109. In another example, the policy service 117 compares an image quality score to a predetermined image quality threshold. In another example, the policy service 117 compares a similarity score to a predetermined similarity threshold.

In at least one embodiment, the policy service 117 transmits affirmative and negative responses to the representation service 111 and comparison service 115. For example, the policy service 117 transmits an affirmative response to the representation service 111 based on a determination that a biometric scan satisfies liveness verification and image quality thresholds. In another example, the policy service 117 transits a negative response to the comparison service 117 based on a determination that a similarity score fails to satisfy a predetermined similarity threshold. In one or more embodiments, the policy service 117 receives policy data 109 (e.g., or inputs for controlling application of the same) from the computing device 102, thereby providing for policy generation and adjustment according to user preferences and requirements.

In one or more embodiments, the policy service 117 performs segmentation, alignment, and cropping processes to generate additional images from an initial capture image (e.g., or another image obtained therefrom). In one example, the policy service 117 aligns a hand image according to a hand alignment template defined in policy data 109. In another example, the policy service 117 segments and crops a hand image to generate additional images of particular hand anatomy including a cropped palm image, a cropped fingers image, and a cropped image of each finger. In another example, the policy service 117 crops a capture image to generate a facial image and aligns the facial image according to a facial template defined in policy data 109.

In one or more embodiments, the policy service 117 includes various algorithms, machine learning models, functions for performing analyses described herein. The various algorithms, machine learning models, and functions can be referred to collectively as "modules." In various embodiments, the policy service 117 includes one or more modules for detecting and segmenting anatomy in an image. For example, the policy service 117 includes a fingertip detection module for identifying fingertips in an image. In another example, the policy service 117 includes an anchor point detection module for detecting points of interface between anatomy, such as, for example, points of interface between fingers and a palm. In another example, the policy service 117 includes a facial detection module for detecting facial features in an image. In another example, the policy service 117 includes a segmentation module that detects regions of an image that correspond to anatomy and non-anatomy (e.g., skin and other tissue vs. background). In another example, the policy service 117 includes a geometry module for detecting and mapping anatomical geometry.

In another example, the policy service 117 includes a pose estimation module (e.g., an overall posture estimation module, face pose or expression estimation module, hand pose estimation module, etc.) for detecting orientation and position relationships within anatomy or between two or more particular anatomical features (e.g., such as a first finger and a second finger, or a plurality of fingers and a palm). The pose estimation model can generate geometry data and mapping data for defining anatomy within an image (e.g., a hand, face, etc.) and for defining anatomical elements thereof (e.g., fingers, eyes, mouth, etc.). In another example, the policy service 117 includes a hand classifier model that can determine whether an image includes a right hand or a left hand and/or whether the image includes a hand oriented to a predetermined gesture (e.g., two fingers extended, open palm, etc.). In this example, the hand classifier can be a machine learning model (e.g., a perceptron, decision tree, etc.) that is trained using a corpus of anatomical images of varying quality (e.g., hand images, finger images, etc.). In one or more embodiments, the policy service 117 uses outputs of one or more modules as inputs to additional modules or other processes, such as, for example, segmentation, cropping, and alignment processes. For example, the policy service 117 uses mapping and geometry outputs to generate cropped images of particular anatomy.

Exemplary Processes and Sequences

Figure 2:
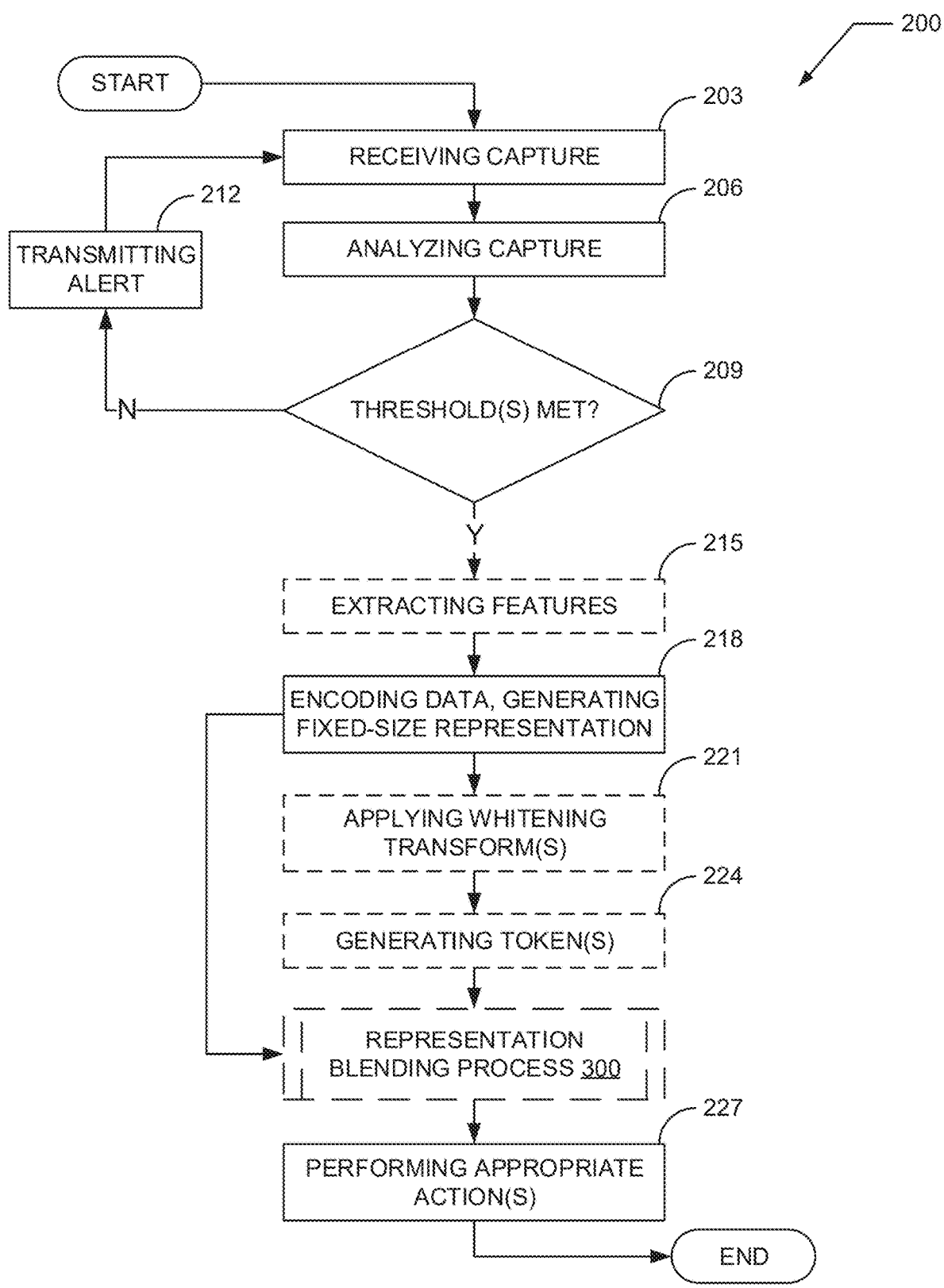
FIG. 2 shows a biometric embedding process, according to one embodiment of the present disclosure.

As will be understood by one having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown.

FIG. 2 shows an exemplary biometric embedding process 200. In various embodiments, the process 200 includes a machine learning algorithm or model that transforms any form of input (e.g., image, signal, string, etc.) in a fixed size representation (FXR). In one example, the process 200 generates an FXR of an image containing a face. In another example, the process 200 generates an FXR of a string containing a subject's full name. In another example, the process 200 generates an FXR of a driver's license number. In another example, the process 200 generates a fingerprint minutiae FXR of minutiae points extracted from a fingerprint minutiae template (e.g., the fingerprint minutiae template being generated from a fingerprint image or scan). In some embodiments, the mobile application 104 performs the process 200.

At step 203, the process 200 includes receiving a capture, such as, for example, a biometric capture, a non-biodata input (e.g., driver's license number, username, or other PII), or secret key. In one example, the computing environment 101 receives a fingerprint image from the mobile application 104 on a subject's computing device 102. In one or more embodiments, the computing environment 101 receives a plurality of captures, such as, for example, multiple images of the same anatomy or images of various anatomy (e.g., a facial image, a hand image, etc.). In at least one embodiment, the computing environment 101 receives a hand image and PII, such as a legal name.

At step 206, the process 200 includes analyzing the capture. In one or more embodiments, analyzing the capture includes performing one or more analysis processes according to policy data 109. Non-limiting examples of the analysis processes include, but are not limited to, anatomical geometry detection (e.g., hand geometry detection, facial geometry detection, etc.), image quality analysis, and liveness verification analysis. Liveness verification analysis can be performed according to one or more embodiments described in U.S. Pat. No. 10,635,894, filed Oct. 13, 2017, entitled "SYSTEMS AND METHODS FOR PASSIVE-SUBJECT LIVENESS VERIFICATION IN DIGITAL MEDIA," which is incorporated herein by reference as if set forth in its entirety. In various embodiments, the capture analysis generates subject data 107 by which the capture is evaluated at step 209. Non-limiting examples of the subject data 107 include data defining anatomical geometry, image quality scores (e.g., such as values of resolution, brightness, contrast, etc.), and liveness verification scores.

In at least one embodiment, analyzing the capture includes segmenting and/or cropping the capture into one or more cropped captures. In one example, the biometric system 100 crops a hand image into a palm image and a multi-finger image. In another example, the biometric system 100 crops a multi-finger image into a plurality of individual finger images. In another example, the biometric system 100 segments a hand capture into a hand image by applying an anatomy detection and background removal technique.

At step 209, the process 200 includes determining that the capture (e.g., or data obtained therefrom) meets one or more predetermined thresholds. In various embodiments, the policy service 117 compares analysis results to predetermined thresholds for image quality and/or liveness. In at least one embodiment, in response to determining the capture fails to meet one or more predetermined thresholds, the process 200 proceeds to step 212. In one or more embodiments, in response to determining the capture meets the one or more predetermined thresholds, the process 200 proceeds to step 215 or step 218.

At step 212, the process 200 includes transmitting an alert or performing other appropriate actions based on the failure of the capture to meet one or more thresholds. In one example, the computing environment 101 transmits an alert (e.g., text message, electronic mail, push notification, or any other suitable communication) to the computing device 102. In this example, the mobile application 104 process the alert, determine one or more thresholds that were violated, and generate a user interface for describing and correcting one or more deficiencies of the capture. In one or more embodiments, the computing environment 101 requests additional captures from the computing device 102 and the mobile application 104 generates a user interface for facilitating the capture process. In one example, the mobile application 104 causes the computing device 102 to render alignment indicia for properly aligning anatomy within a camera frame prior to capture. In one or more embodiments, the mobile application 104 causes the computing device 102 to render instructions for image properties such as lighting, contrast, and anatomy to-be-captured. In one example, the computing environment 101 determines that a capture does not include a full facial image or includes incorrect anatomy or orientation (e.g., the capture shows a side view of a face, the capture includes a hand and lacks a face, etc.). In this example, the computing environment 101 transmits an alert to the computing device 102, and the mobile application 104 generates a user interface describing the deficiency and providing instructions for obtaining a proper capture.

At step 215, the process 200 includes extracting features from the capture. In some embodiments, feature extraction includes applying one or more feature extraction algorithms or techniques to the capture (e.g., or data generated therefrom, such as cropped images or anatomical geometries). In one example, the biometric system 100 extracts facial features from a facial image in the form of floating point integers that uniquely define the facial features.

In at least one embodiment, the mobile application 104 or the computing environment 101 includes a capture SDK for extracting features from the capture. In one or more embodiments, the capture SDK includes a feature extraction module that extracts one or more biometric images or templates from the capture. In one example, from a captured hand image, the feature extraction module extracts a fingerprint minutiae template (e.g., that can conform to standards, such as the ISO/IEC 19794-2:2011 standard), a whole fingerprint image (e.g., excluding background imagery and other anatomy), a fingerprint texture template, a palm print minutiae template, a whole palm print image, and a palm print texture template. Thus, in various embodiments, a variable number of biometric features (e.g., 2, 3, 5, or greater) can be generated simultaneously from a single capture because, from each portion of anatomy in the image, a plurality of features can be extracted and encoded into a fixed size representation.

In one or more embodiments, the feature extraction module can be bi-directionally interoperable such that any legacy template (e.g., fingerprint ISO template) produced by a third-party vendor can be processed by the feature extraction module, such that the output of the feature extraction module can be consumed by a third-party matcher. In at least one embodiment, interoperability with legacy systems and processes is possible because the output of the feature extraction module may be a numerical vector (e.g., a transformed biometric representation) that can be compared with a second vector (e.g., a stored biometric representation) using simple distance metrics such as $L^2$ or Euclidean distance for purposes such as subject identification or verification.

At step 218, the process 200 includes encoding data that defines the capture (e.g., or a transformed version thereof, such as a cropped version of the capture) and generating a fixed size representation (FXR) based on the encoded data (e.g., or raw capture, in some embodiments). In one or more embodiments, encoding the data includes passing the capture (e.g., or data obtained therefrom) through one or more encoders 114. In one example, the biometric system 100 includes a string encoder that encodes string-formatted PII into an embedded vector. In another example, the biometric system 100 includes a minutiae encoder that encodes fingerprint, palm print, or other minutiae data into a FXR. The biometric system 100 can include an encoder for translating any biometric capture or non-biodata to a FXR.

The biometric system 100 can generate fixed size representations according to one or more embodiments described in:

U.S. application Ser. No. 17/109,693, filed Dec. 2, 2020, titled "SYSTEMS AND METHODS FOR PRIVACY-SECURED BIOMETRIC IDENTIFICATION AND VERIFICATION," which claims priority to and the benefit of U.S. Patent Application No. 62/942,311, filed Dec. 2, 2019, titled "SYSTEMS AND METHODS FOR PRIVACY-SECURED BIOMETRIC IDENTIFICATION AND VERIFICATION,"; and U.S. patent application Ser. No. 16/841,269, filed Apr. 6, 2020, titled SYSTEMS AND METHODS FOR LOSSY BIOMETRIC REPRESENTATIONS, which claims priority to and the benefit of U.S. Patent Application No. 62/829,825, filed Apr. 5, 2019, titled "THE EVERGREEN HASH," the disclosures of which are incorporated herein by reference in their entireties.

At step 221, the process 200 includes applying a whitening transform to the fixed size representation (FXR). According to one embodiment, the whitening transform is a non-linear transform that flattens eigenvalues of the FXR towards a common variance (e.g., a variance of one). In at least one embodiment, the flattening of the FXR eigenvalues results in a common variance amongst the eigen values, thereby providing a whitened FXR in which the dimensions thereof are uncorrelated and demonstrate a common variance. In one or more embodiments, the biometric system 100 performs an iterative spherical whitening technique to iteratively whiten features of the FXR prior to conversion to a privacy-secured token. In one example, the biometric system 100 iteratively whitens a FXR and, following each whitening iteration, performs a unit normalization of the whitened FXR (e.g., until flattening of the FXR eigenvalues is achieved).

At step 224, the process 200 includes generating a privacy-secured token, such as, for example, an irreversibly transformed representation of the FXR (e.g., or whitened FXR).

The biometric system 100 can generate the privacy-secured token according to one or more embodiments described in the incorporated references, such as, for example, U.S. patent application Ser. No. 16/841,269, filed Apr. 6, 2020, titled SYSTEMS AND METHODS FOR LOSSY BIOMETRIC REPRESENTATIONS, which claims priority to and the benefit of U.S. Patent Application No. 62/829,825, filed Apr. 5, 2019, titled "THE EVERGREEN HASH."

In one or more embodiments, generating the privacy-secured token includes normalizing the FXR, discretizing the FXR to an 8-bit signed integer (e.g., via quantization), and permuting the FXR based on a pseudorandom key and non-biodata (e.g., which may be a PIN). In at least one embodiment, generating the privacy-secured token includes multiplying the permuted FXR by a pseudorandom projection matrix (e.g., generated based on the pseudorandom key), permuting the projected FXR based on the pseudorandom key, normalizing the permuted, projected FXR, and quantizing the normalized FXR to discretize the FXR to generate the privacy-secured token as an 8-bit signed integer. In some embodiments, generating the privacy-secured token includes encrypting non-biodata using the pseudorandom key, normalizing and/or rescaling the encrypted non-biodata, discretizing the normalized non-biodata to an 8-bit signed integer, and performing the first permutation of the FXR using the discretized non-biodata as an additional input.

In one or more embodiments, the process 200 includes performing a representation blending process 600 (FIG. 6) to generate a multimodal representation based on two or more fixed-size representations (e.g., or irreversibly transformed representations thereof, such as tokens). In one example, the biometric system 100 performs the process 600 following step 218 to generate a bimodal representation of a fixed-size facial representation and a fixed-size fingerprint representation. In another example, the biometric system performs the process 600 following step 224 to generate a multimodal token of a facial token, a fingerprint token, and a palm print token.

According to one embodiment, the privacy-secured token is cancellable (e.g., the token can be revoked and the subject can be re-enrolled) and satisfies various security standard such as irreversibility and unlinkability, as well as biometric processing requirements (e.g., the token preserves biometric matching performance at scale and speed without significant impact to matching accuracy).

At step 227, the process 200 includes performing one or more appropriate actions. In various embodiments, the one or more appropriate actions include storing the FXR representation or privacy-secured token in a registry 109 or other database (e.g., in instances of biometric enrollment), hashing the FXR to generate an FXR hash, packing the FXR (e.g., or FXR hash) and encrypted non-biodata into a pseudonymous identifier, and generating scannable media including the pseudonymous identifier. In at least one embodiment, the process 200 generates the FXR such that a threshold satisfying comparison between the FXR and a probe FXR releases the pseudorandom key (e.g., PIN) used to encrypt the non-biodata. In various embodiments, the one or more actions include performing one or more comparisons between the FXR and one or more enrollment FXRs (e.g., in instances of biometric authentication or identification). In one or more embodiments, the biometric system 100 transmits the FXR to the computing device 102 or another external system.

Figure 3:
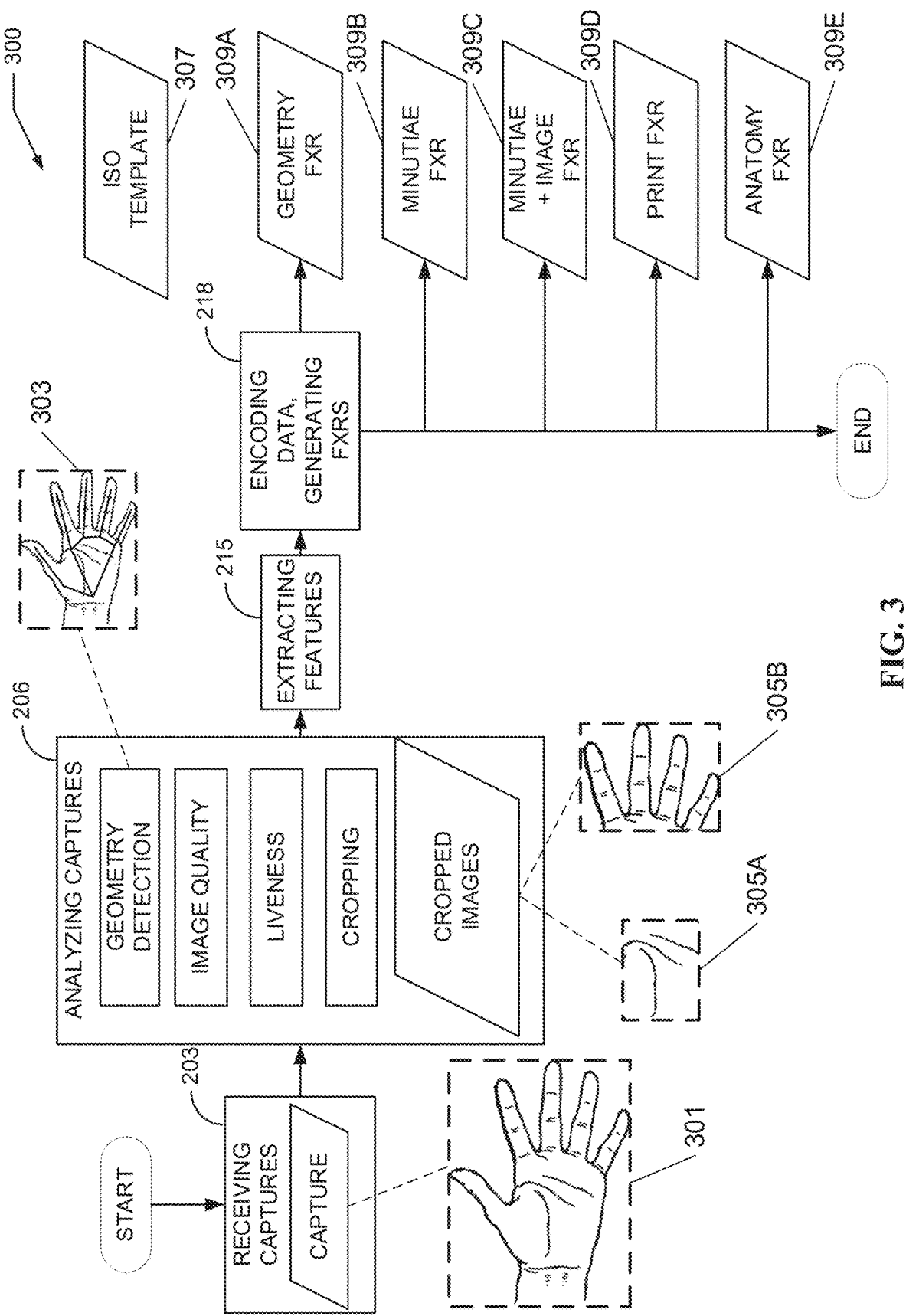
FIG. 3 shows a biometric encoding sequence, according to one embodiment of the present disclosure.
Figure 4:
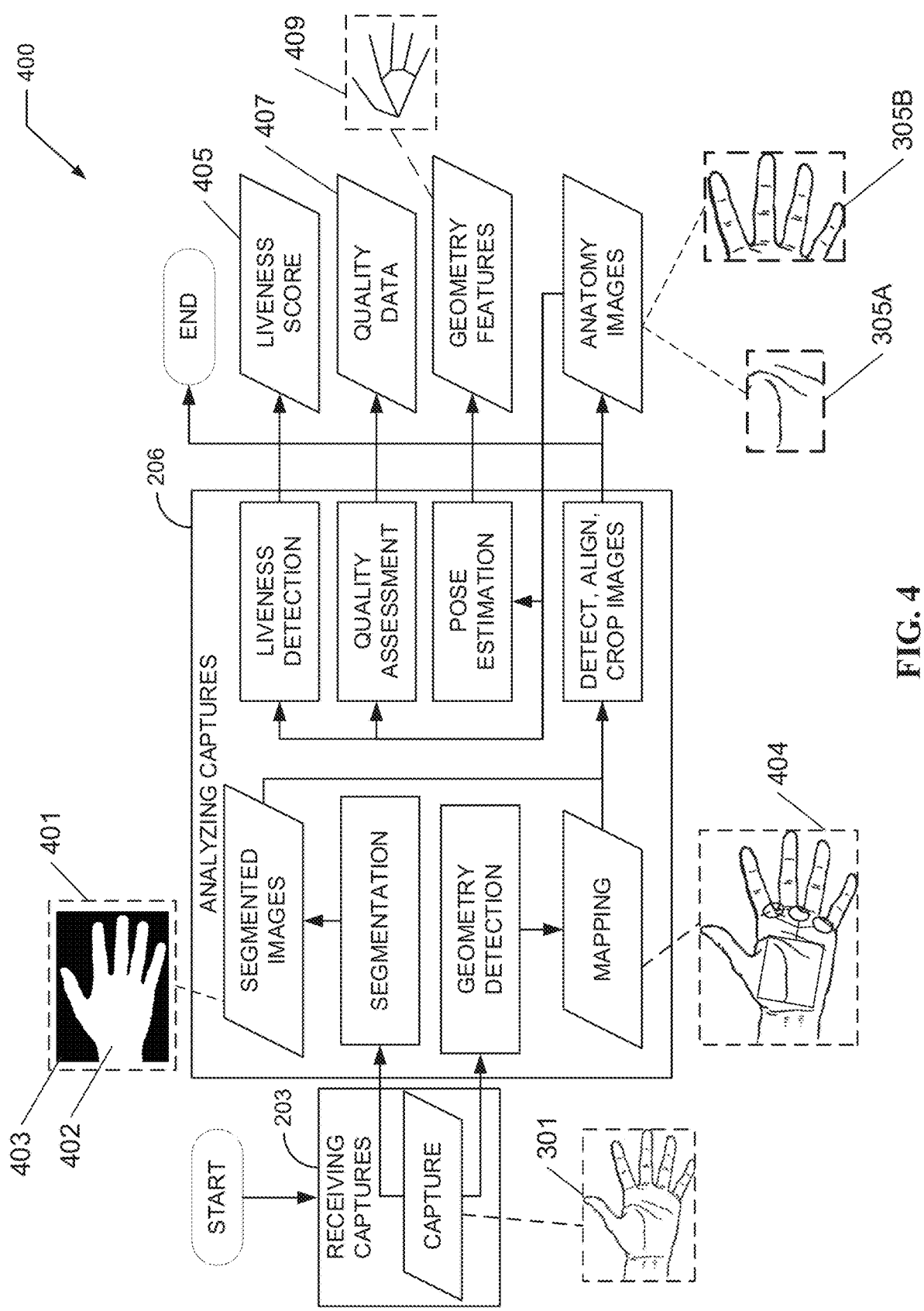
FIG. 4 shows a capture analysis sequence, according to one embodiment of the present disclosure.

FIGS. 3-4 show exemplary scenarios of various steps in the biometric embedding process 200.

FIG. 3 shows an exemplary biometric encoding sequence 300 including the steps 203, 206, 215, and 218 of the embedding process 200 (FIG. 2). For purposes of describing exemplary features of the present systems and processes, the biometric capture sequence 300 is described in the context of generating FXRs from a hand image. The biometric capture sequence 300 can be performed using any suitable biometric data and/or non-biodata as can be appreciated.

At step 203 of the sequence 300, the computing environment 100 receives a capture that includes that a hand image 301.

At step 206 of the sequence 300, the policy service 117 analyses the hand image according to various techniques and criteria. In at least one embodiment, the biometric system 100 performs geometry detection to detect and generate a mapping 303 of hand anatomy included in the hand image 301. In at least one embodiment, the policy service 117 performs geometry detection to identify a plurality of minutiae points in the hand image 301 (e.g., or images generated therefrom). In one or more embodiments, the policy service 117 performs an image quality analysis and a liveness analysis of the hand image 301. In various embodiments, the policy service 117 crops the hand image 301 to generate a cropped palm image 305A and a cropped finger image 305B. In some embodiments, the policy service 117 performs cropping based on the mapping 303 of hand geometry. In one or more embodiments, the policy service 117 crops the cropped finger image 305B into a plurality of individual cropped finger images (not shown). For example, policy service 117 generates four cropped finger images corresponding to the index, middle, ring, and little fingers.

In one example, a cropped image includes two fingers and further includes, for each finger, an inner finger texture and a fingerprint. An inner finger texture can include contours and curvature of the finger surface, among other features. A fingerprint (e.g., or other biometric print, such as a palm print) can include various structures forming a fingerprint including, but not limited to, arches, tented arches, left loops, right loops, double loops, and whorls. Continuing the example, the policy service 117 processes the cropped image and generates additional biometric images including, but not limited to, images of each finger, each finger texture, and each fingerprint. The biometric images can demonstrate predetermined resolution (e.g., such as 500 points per inch (ppi).

In various embodiments, the sequence 300 proceeds to step 215 of the sequence 300 following confirmation that the hand image 301 (e.g., and/or images generated therefrom) do not violate any predetermined thresholds for criteria such as liveness and quality.

At step 215 of the sequence 300, the representation service 111 extracts one or more features from the hand image 301 (e.g., and/or images generated therefrom) by translating the hand image 301 to a vector-based representation. In one or more embodiments, feature extraction includes extracting palm print and finger print textures from corresponding cropped images 305A, 305B and translating the texture to vector-based representations.

At step 218 of the sequence 300, the encoding service 113 encodes various data from the hand image 301 and images derived therefrom, and the biometric system 100 generate one or more templates 307 and FXRs 309A-E to represent the encoded data.

In at least one embodiment, for each anatomical feature (e.g., palm, finger) in the hand image 301, the representation service 111 produces one ISO template 307 and FXRs 309A-E of each anatomical feature. In various embodiments, the biometric system 100 generates a geometry FXR 309A based on the mapping 303. In one or more embodiments, the biometric system generates a minutiae FXR 309B that directly translates the ISO template 307 such that they contain substantially identical information. In various embodiments, a minutiae+image FXR 309C includes the minutiae information (e.g., as contained in the ISO template) and image patches surrounding each minutiae. In one example, if there are 40 minutiae in the cropped image 305A, the biometric system 100 generates and encodes 40 image patches. In some embodiments, the number of images patches is greater or less than the number of minutiae (e.g., the biometric system 100 can generate any suitable number of image patches).

In one or more embodiments, the representation service 111 generates the print FXR 309D by directly encoding the cropped 305A or cropped image 305B using a deep neural network encoder 114 that bypasses the minutia detection and extraction process. In at least one embodiment, the representation service 111 generates a FXR 309E as a compact representation of a whole-feature image (e.g., hand image 301 and/or cropped images 305A. 305B) produced by a deep neural network encoder 114. In various embodiments, the biometric system 100 stores one or more of the ISO template 307 and FXRs 309A-E at the data store 103 (e.g., as subject data 112 or in a registry 109).

In various embodiments, the representation service 111 and/or policy service 117 extracts one or more features from a cropped image (e.g., such as cropped images 305A, 305B).

In an exemplary scenario, from a single cropped fingerprint image, a minutiae extraction module extracts a plurality of minutiae points consisting of triplets (x, y, and theta). The representation service 111 saves the cropped fingerprint image as an ISO template 307 and, in combination with the encoding service 113, encodes the minutiae points and generates a minutiae FXR 309B. The policy service 117 extracts a small image patch around each minutiae point. The representation service 117, in combination with the encoding service 113, encodes the minutiae points and the image patches, and generates a minutiae+image FXR 309C. The representation service 117, in combination with the encoding service 113, encodes and generates a print FXR 309D of the cropped fingerprint image. The policy service 117 extracts an inner finger texture and a finger geometry from the cropped fingerprint image, and the representation service 113 and the encoding service 111 generate an anatomy FXR 309E and a geometry FXR 307A from the extracted data. Thus, in the exemplary scenario, the computing environment 307 generates at least six FXRs from a single fingerprint capture that individually and in one or more combinations uniquely represent the subject associated with the cropped fingerprint image. The computing environment 101 can generate one or more of the FXRs 309A-E for any anatomical feature of the capture, as can be appreciated. For example, the computing environment 101 can generate geometry FXRs 309A, minutiae FXRs 309B, minutac+image FXRs 309C, print FXRs 309D, and anatomy FXRs 309E for an index, middle, ring, and little finger included in the initial capture. In this example, the anatomy FXRs 309E can represent an inner texture of each finger.

FIG. 4 shows an exemplary capture analysis sequence 400 including steps 203 and 206 of the embedding process 200 (FIG. 2). For purposes of describing exemplary features of the present systems and processes, the biometric capture sequence 400 is described in the context of generating FXRs from a hand image. The biometric analysis sequence 400 can be performed using any suitable biometric data and/or non-biodata as can be appreciated.

At step 203 of the sequence 400, the biometric system 100 receives a capture, such as, for example, the hand image 301.

At step 206 of the sequence 400, the policy service 117 performs one or more analyses of the hand image 301 (e.g., and data extracted or generated therefrom). In various embodiments, the policy service 117 performs one or more segmentation processes to detect and isolate anatomy in the hand image 301 and, thereby, generate one or more segmented images 401. In at least one embodiment, the policy service 117 processes the hand image 301 through a skin-tone segmentation module that classifies each pixel of the hand image 301 as either belonging to skin 402 or background 403. In various embodiments, the skin-tone segmentation module is a machine learning-based computer vision model that is trained to differentiate between skin and non-skin data in an input image and generate an output image that indicates the same. In one or more embodiments, the skin-tone segmentation model generates the segmented image 207 that includes a mask of the hand image 301 containing pixel values of 1 or 0, with 1 indicating the skin 402 and 0 indicating the background 403.

In at least one embodiment, the policy service 117 performs one or more geometry detection processes to detect geometry of anatomy (e.g., or a portion thereof) in an image and generate a mapping 404 (e.g., or mapping 303) based thereon. In at least one embodiment, the biometric system 100 includes one or more modules for detecting particular anatomy. According to one embodiment, the biometric system 100 includes a fingertip detection module for detecting fingertips in the hand image 301. In one or more embodiments, the biometric system 100 includes an anchor point detection module for detecting points of interface between fingers and a palm in the hand image 301. In various embodiments, the biometric system 100 generates the mapping 404 by combining geometric data generated by the one or more anatomy detection modules.

In one or more embodiments, the policy service 117 performs anatomy detection, alignment, and cropping processes to generate anatomical images, such as, for example, cropped images 305A, 305B. In various embodiments, the anatomy detection, alignment, and cropping processes use one or more segmented images 401 and one or more mappings 404 (e.g., and/or mapping 403) to generate the anatomical images. In at least one embodiment, the policy service 117 performs liveness detection, quality assessment, and liveness detection on the cropped images 305A, 305B (e.g., or other anatomical images). In one or more embodiments, the policy service 117 generates one or more liveness scores 405 and quality data 407. The quality data 407 can include scores or other metrics for a plurality of quality assessments. For example, the quality data 407 includes one or more of a resolution score, a sharpness score, a magnification score, a brightness score, a contrast score, and a blurriness score. In some embodiments, quality assessment processes are performed prior to alignment and cropping processes such that the policy service 117 only generates cropped images of capture regions that meet predetermined quality thresholds (e.g., such as maximum sharpness score while demonstrating a balanced contrast score). In at least one embodiment, the policy service 117 performs a pose estimation process to detect and extract one or more geometry features 409 of the cropped images 305A-B (e.g., or another suitable image). In one example, the policy service 117 detects and extracts a hand geometry for translation to a hand FXR 309A (FIG. 3).

Figure 5:
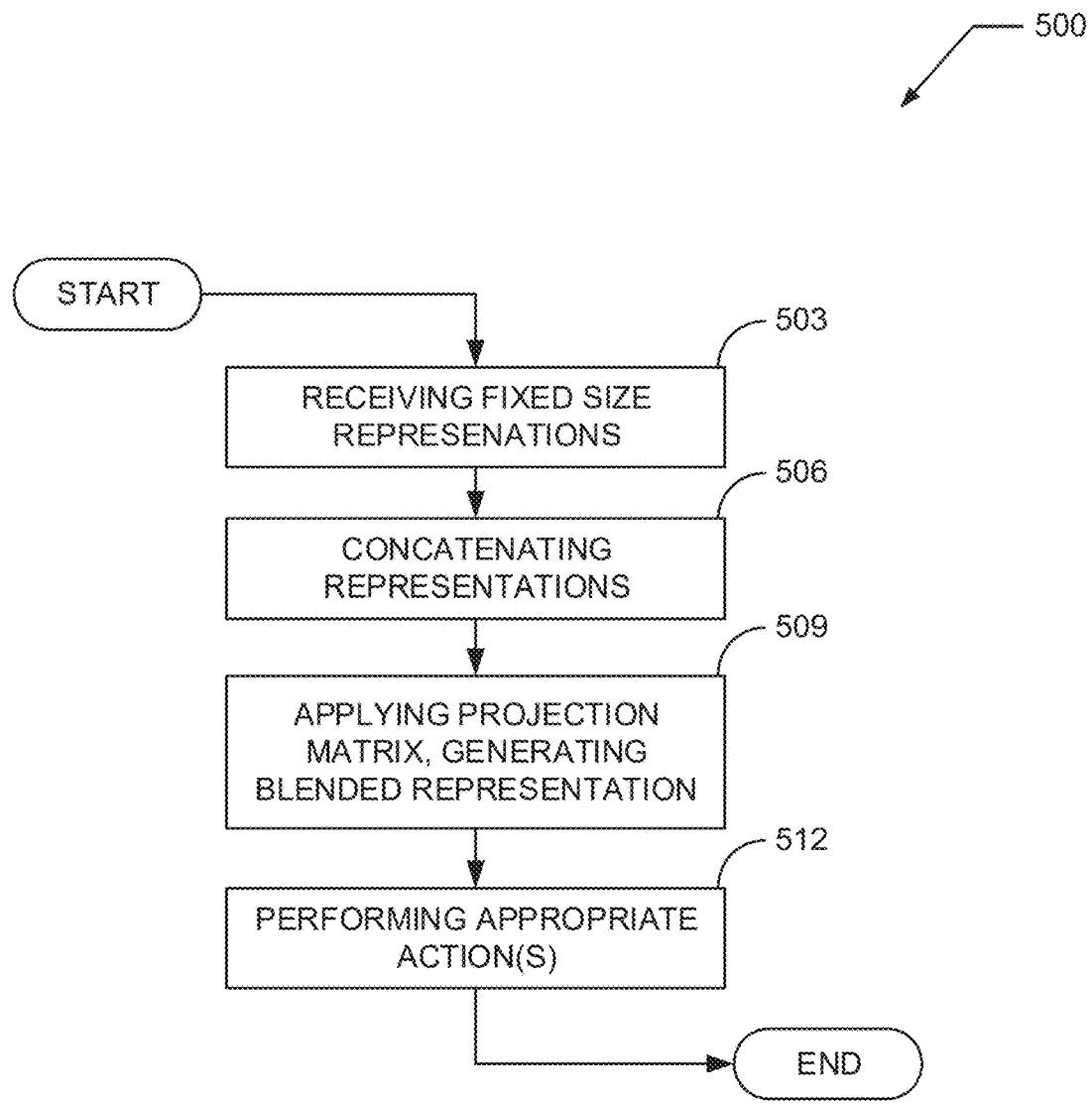
FIG. 5 shows a biometric blending process, according to one embodiment of the present disclosure.

FIG. 5 shows an exemplary biometric blending process 500. According to one embodiment, the biometric system 100 performs the blending process 500 to generate multimodal representations (e.g., FXRs and privacy-secured tokens that irreversibly transform the FXRs). In at least one embodiment, the biometric system 100 also performs multi-representation fusion processes (e.g., also referred to as multi-template fusion processes) to generate multiple representations of the multimodal information, thereby generating multimodal, multi-template representations. Multi-template fusion can be performed according to one or more embodiments described in the incorporated references, such as, for example U.S. application Ser. No. 17/109,693, filed Dec. 2, 2020, titled "SYSTEMS AND METHODS FOR PRIVACY-SECURED BIOMETRIC IDENTIFICATION AND VERIFICATION," which claims priority to and the benefit of U.S. Patent Application No. 62/942,311, filed Dec. 2, 2019, titled "SYSTEMS AND METHODS FOR PRIVACY-SECURED BIOMETRIC IDENTIFICATION AND VERIFICATION."

In one or more embodiments, the process 500 is performed according to Equation 1, in which "Blend (FXR1, FXR2, FXR3, . . . )" represents a blended representation generated from blending the input FXRs and "pMx" represents a pseudorandom projection matrix.

$$\text{Blend}(FXR_1, FXR_2, FXR_3 \ldots) = \text{Multip}(\text{Concat}(FXR_1, FXR_2, FXR_3 \ldots), pMx) \quad \text{(Equation 1)}$$

In some embodiments, the process 500 includes applying a weight value to one or more input FXRs to ensure equal or weighted contribution to the output blended FXR. In at least one embodiment, applying weight parameters to one or more FXRs allows for explicit control of each FXR's (e.g., each biometric modality's) contribution to the blended FXR, as opposed to defining FXR contribution based on FXR dimension length (e.g., the length of the FXR vector). In other words, without weighting, the input FXR with the longest dimension may dominate the output FXR due to greater contribution, and such dominant contribution by one of a plurality of input modalities can be undesirable. In one example, a greater weight value can be applied to an input facial FXR as compared to an input fingerprint FXR and an input palm print FXR such that the, when blended, a contribution of each input FXR to the output blended FXR is substantially equal (e.g., or weighted toward the facial modality). In one or more embodiments, the biometric system 100 generates a multimodal FXR that can be compared against unimodal or bimodal FXRs of one or more anatomical features or non-biodata represented in the multimodal FXR, or that can be compared against a particular modality to release input FXRs that were blended to generate the multimodal FXR. For example, the biometric system 100 can generate a PII-protected multimodal FXR from a PII FXR, a facial FXR, a fingerprint FXR, and a palm print FXR such that the PII-protected multimodal FXR can be used to subsequently authenticate a probe PII FXR and, thereby, release the facial FXR, fingerprint FXR, and palm print FXR.

Figure 6:
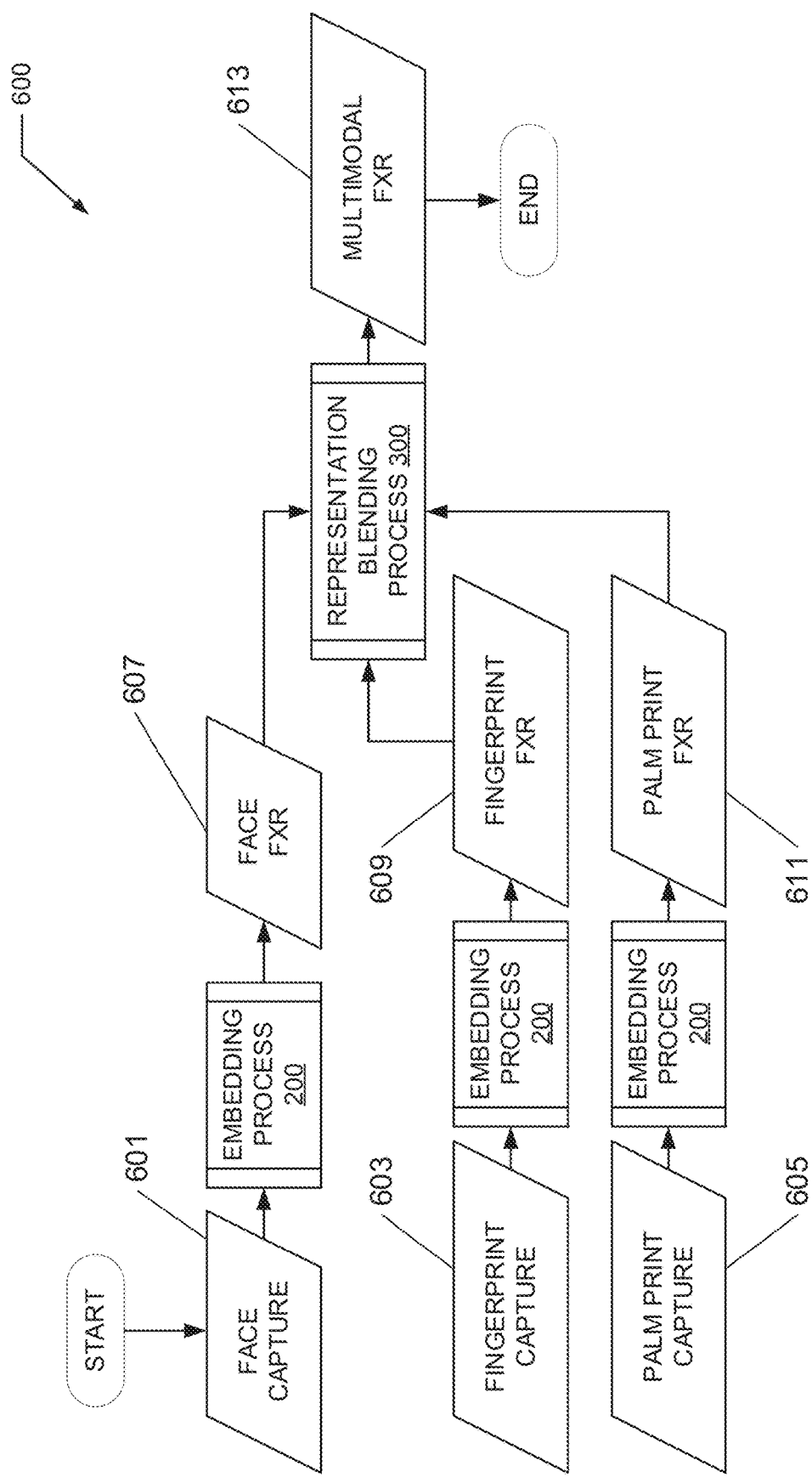
FIG. 6 shows a direct blending sequence, according to one embodiment of the present disclosure.

In one or more embodiments, the biometric system 100 performs direct blending (e.g., as shown in the direct blending sequence 600 of FIG. 6). According to one embodiment, direct blending includes simultaneous blending of all representation modalities to be included in the output representation (e.g., the blended representation). In other words, direct blending performs simultaneous blending of all inputs. In at least one embodiment, the biometric system performs sequential blending (e.g., as shown in the sequential blending sequence 700 of FIG. 7). In various embodiments, sequential blending includes blending a first modal representation with a secret (e.g., a PIN, or another fixed size representation or privacy-secured token thereof) to generate a first blended representation and blending the first blended representation with one or more representation modalities. In other words, sequential blending performs step-wise blending of inputs in which a first input is blended with a secret and the output thereof is blended with a second input (e.g., the output thereof then being blended with a third input and so on for any suitable number of inputs).

At step 503, the process 500 includes receiving two or more fixed size representations (FXRs). Receiving the two or more FXRs can include generating the two or more FXRs (e.g., via embedding processes described herein). In at least one embodiment, at least one of the two or more FXRs includes (e.g., or is derived from) a nonce vector. In at least one embodiment, a nonce vector is a pseudorandomly generated vector (e.g., also referred to as a "noise" vector). The two or more FXRs can be any combination of embedded vectors (e.g., for representing string-formatted inputs) and FXR outputs of the embedding process 200 (FIG. 2), or any combination of privacy-secured tokens that represent embedded vectors or other FXRs. In at least one embodiment, the computing environment 101 receives the two or more FXRs from a computing device 102 (e.g., for example, in instances in which the mobile application 104 or another system performs the embedding process 200 of FIG. 2). In one example, the representation service 111 receives (e.g., or generates) a face FXR, a fingerprint FXR, and a palm print FXR. In another example, the representation service 111 receives two or more of the FXRs 309A-E (FIG. 3). In another example, the representation service 111 receives an embedded name vector and a facial FXR. In another example, the representation service 111 receives a privacy-secured face token, a privacy-secured voice signal token, and a privacy secured username token. Any combination of biometric or non-biodata representations (or tokens) is contemplated.

At step 506, the process 500 includes concatenating the two or more fixed size representations to generate a concatenated representation.

At step 509, the process 500 includes applying a projection matrix to the concatenated representation and, thereby, generating a blended representation. In one or more embodiments, the projection matrix is generated based on a pseudorandom seed value (e.g., which may be a PIN or other secret for encrypting non-biodata secured via the blended representation or a pseudonymous identifier of the same). According to one embodiment, applying the projection matrix includes multiplying the blended representation by the projection matrix. In various embodiments, the blended representation is a multimodal fixed size representation (FXR) or a privacy-secured multimodal token.

At step 512, the process 500 includes performing one or more appropriate actions. In at least one embodiment, the representation service 111 transforms the blended representation from a multimodal FXR to a privacy-secured FXR (e.g., including discretizing the blended representation to an 8-bit signed integer). In some embodiments, the computing environment 500 repeats the process 500 (e.g., which may take or exclude the blended representation as input) to generate a multi-template, multimodal representation or token.

FIG. 6 shows an exemplary direct blending sequence 600. For purposes of describing exemplary features of the present systems and processes, the direct blending sequence 600 is described in the context of generating a multimodal token from a face capture and a hand capture. The direct blending sequence 600 can be performed using any suitable combination of biometric and/or non-biodata representations or tokens as can be appreciated. The direct blending sequence 600 can be performed by the computing environment 101 (e.g., via the representation service 111) or the computing device 102 (e.g., via the mobile application 104).

In various embodiments, the computing environment 101 receives a face capture 601, a fingerprint capture 603, and a palm print capture 605. The fingerprint capture 603 and palm print capture 605 can be cropped images extracted from a hand capture, for example, as shown in the sequences 300, 400 (FIGS. 3-4). In at least one embodiment, the face capture 601, fingerprint capture 603, and palm print capture 605 are extracted from a single capture image. For example, the computing device 102 capture an image of a subject holding their hand palm-forward near their face, and the policy service 117 extracts facial, finger, and palm features to generate the face capture 601, fingerprint capture 603, and palm print capture 605.

In one or more embodiments, the representation service 111 (e.g., in coordination with the encoding service 115) performs embedding processes 200 (FIG. 2) to generate a face fixed size representation (FXR) 607, a fingerprint FXR 609, and a palm print FXR 611 based on the face capture 601, fingerprint capture 603, and palm print capture 605. In some embodiments, the representation service 111 irreversible transforms the FXRs 607, 609, 611 into privacy-secured tokens.

In at least one embodiment, the representation service 111 simultaneously blends the face FXR 607, fingerprint FXR 609, and palm print FXR 611 to generate a multimodal FXR 613 (e.g., or a multimodal token when the input representations are privacy-secured tokens). In one or more embodiments, the simultaneous blending of the face FXR 607, fingerprint FXR 609, and palm print FXR 611 is performed according to the representation blending process 500 (FIG. 5) and can be expressed as Equation 2.

$$\text{Multimodal FXR 607} = \text{Multi}(\text{Concat}(\text{FXR 607}, \text{FXR 609}, \text{FXR 611}, pMx)) \quad \text{(Equation 2)}$$

In one or more embodiments, an authentication of a multimodal representation requires a live capture of each modality represented thereby. For example, following generation, the multimodal FXR 607 can be an enrollment representation (e.g., a template against which probe multimodal FXRs are subsequently compared to for purposes of biometric verification). In this example, an authentic the probe multimodal FXR must blend representations of the same subject's face, palm print, and fingerprint.

Figure 7:
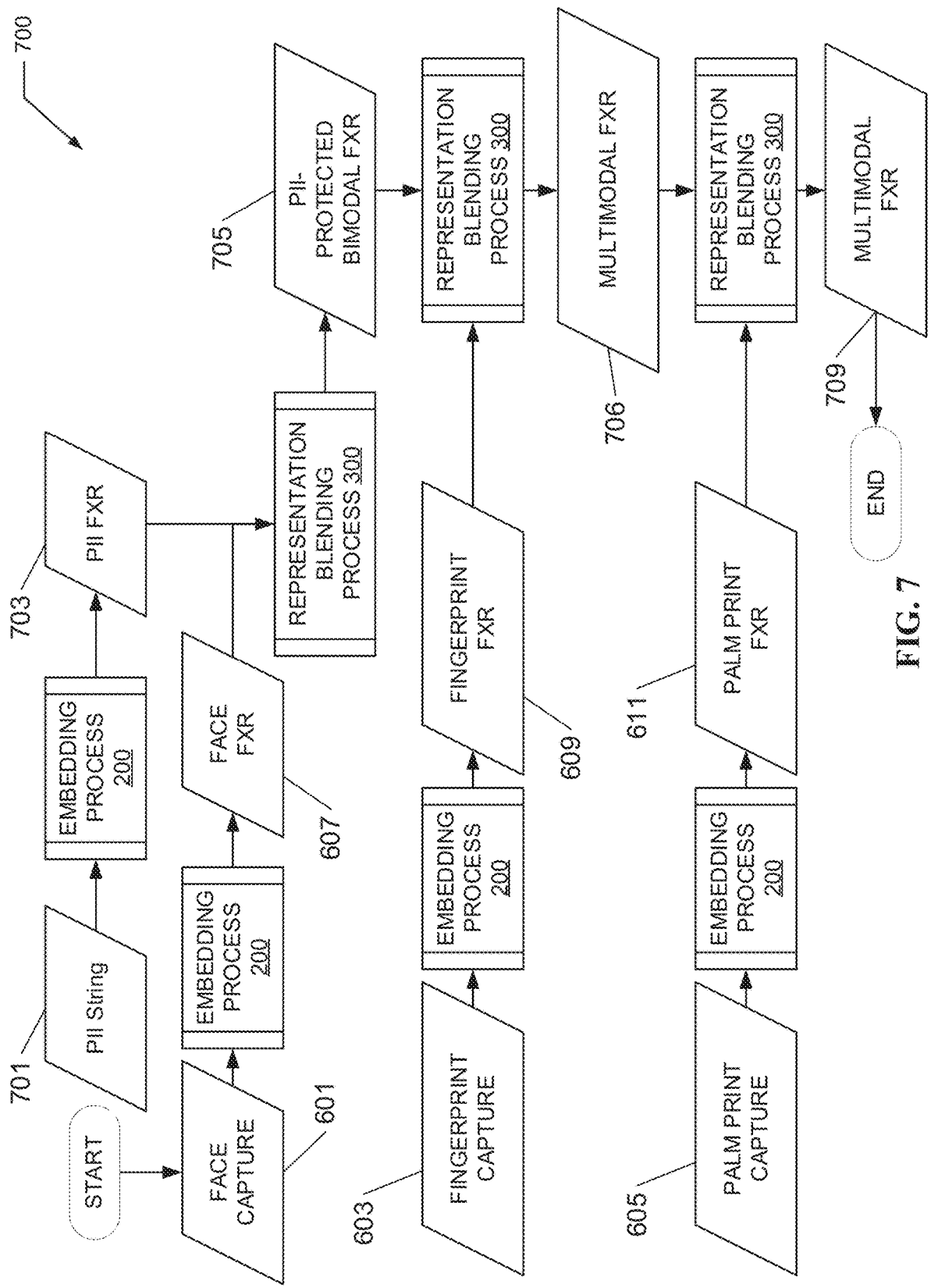
FIG. 7 shows a sequential blending sequence, according to one embodiment of the present disclosure.

FIG. 7 shows an exemplary sequential blending sequence 700. For purposes of describing exemplary features of the present systems and processes, the sequential blending sequence 700 is described in the context of generating a multimodal token from a PII string, a face capture and a hand capture. The sequential blending sequence 700 can be performed using any suitable combination of biometric and/or non-biodata representations or tokens as can be appreciated. The sequential blending sequence 700 can be performed by the computing environment 101 (e.g., via the representation service 111) or the computing device 102 (e.g., via the mobile application 104).

In various embodiments, the computing environment 101 receives a PII string 701, a face capture 601, a fingerprint capture 603, and a palm print capture 605. In one or more embodiments, the computing environment 101 receives the PII string 701 from the mobile application 104. For example, the mobile application 104 prompts a user to enter PII (e.g., username, legal name, contact information, etc.) and the mobile application 104 transmits the PII string 701 to the computing environment 100. In this example, the mobile application 104 (e.g., or the computing environment 101) can encode the PII string 701 into an embedded vector without storing the original PII data such that PII is never stored in a non-obfuscated format on an extended or permanent basis.

In one or more embodiments, the representation service 111 (e.g., in coordination with the encoding service 115) performs embedding processes 200 (FIG. 2) to generate a PII FXR 703, a face FXR 607, a fingerprint FXR 609, and a palm print FXR 611 based on the PII string 701, face capture 601, fingerprint capture 603, and palm print capture 605. In some embodiments, the representation service 111 irreversible transforms the FXRs 607, 609, 611, and 701 into privacy-secured tokens.

In at least one embodiment, the representation service 111 performs a first representation blending process 300 (FIG. 3) to blend the PII FXR 703 and face FXR 607 and, thereby, generate a PII-protected bimodal FXR 705. In some embodiments, the representation service 111 generates a privacy-secured multimodal token. In at least one embodiment, the representation service 111 performs a second representation blending process 300 to blend the PII-protected bimodal FXR 705 and the fingerprint FXR 609, and, thereby, generate a multimodal FXR 706 (e.g., or privacy-secured multimodal token). In various embodiments, the representation service 111 performs a third representation blending process 300 to blend the multimodal FXR 706 and the palm print FXR 611, and, thereby, generate a multimodal FXR 709.

In one or more embodiments, an authentication of a multimodal representation requires a live capture of each modality represented thereby. For example, following generation, the multimodal FXR 709 can be an enrollment representation. In this example, an authentic the probe multimodal FXR must blend representations of the same PII string and the same subject's face, palm print, and fingerprint. In some embodiments, the biometric system 100 generates a device-controlled multimodal representation that encodes a unique identifier, thereby requiring that authentic probe multimodal representations be sourced from the same computing device from which the initial unique identifier was obtained.

Figure 8:
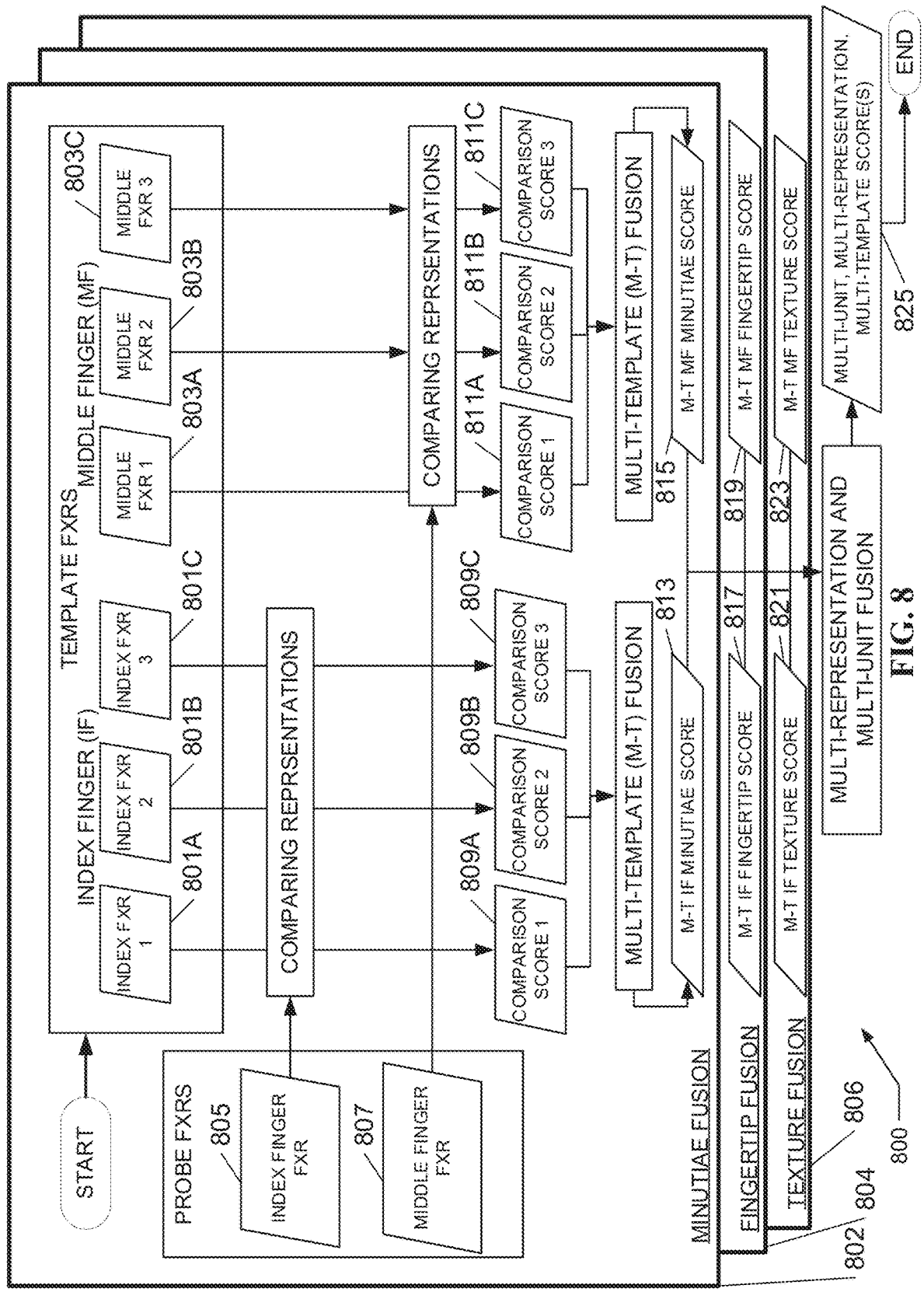
FIG. 8 shows a fusion sequence, according to one embodiment of the present disclosure.

FIG. 8 shows an exemplary fusion sequence 800. According to one embodiment, the biometric system 100 performs a fusion operation (e.g., such as the fusion sequence 800) to generate a fused similarity metric based on two or more similarity metrics. Non-limiting examples of similarity metrics include probability scores and distance scores. In one or more embodiments, score fusion includes averaging two or more similarity metrics. For example, score fusion includes computing an average of two or more probability scores. In another example, score fusion includes converting a plurality of distance scores to a plurality of probability scores and computing an average of logit metrics derived from the plurality of probability scores. In at least one embodiment, two or more similarity metrics are calibrated prior to averaging. In one example, the biometric system 100 calibrates probability scores based on a predetermined distribution derived from training data (e.g., such as, for example, a set of labeled mated and non-mated biometric samples of the same modality(ies) as those to which the predetermined distribution will be applied).

In various embodiments, the biometric system 100 performs the sequence 800 to generate a combined (e.g., "fused") similarity score based on two or more input similarity scores. In one example, the biometric system 100 performs the sequence 800 (e.g., or a similar sequence) to generate a fused similarity score derived from comparison processes performed between enrollment FXRs (e.g., also referred to as "templates") and probe FXRs generated from a probe index finger image (e.g., a first unit) and a middle finger image (e.g., a second unit). In this example, the fusion scheme can be referred to as "multi-unit" fusion and can include averaging one or more index finger-derived similarity scores and one or more middle finger-derived similarity scores (e.g., and/or similarity scores derived from combinations thereof, such as a comparison between a probe multi-finger FXR and a template multi-finger FXR). In another example, the biometric system 100 performs the sequence 800 to generate a fused similarity score from comparisons between one or more sets of template FXRs and one or more probe FXRs of the same modality and unit with which the enrollment FXRs are associated. In this example, the fusion scheme can be referred to as "multi-template" fusion. In another example, the biometric system 100 performs the sequence 800 to generate a fused similarity score based on comparisons between various template FXRs and a plurality of probe FXRs (e.g., 2, 3, 4, 5, or any suitable number) that are generated from a single capture (e.g., similar to the sequence 300 shown in FIG. 3). In this example, the fusion scheme can be referred to as "multi-representation" fusion.

In one or more embodiments, the biometric system 100 can combine the above fusion schemes in any suitable combination, including, for example, multi-probe fusion. In various embodiments, the biometric system 100 can perform fusion according to a multi-unit, multi-template fusion scheme. In at least one embodiment, the multi-unit, multi-template fusion scheme includes generating a first unit, multi-template similarity score (e.g., for example, by comparing an index finger probe FXR to corresponding enrollment FXRs) and generating a second unit similarity score (e.g., for example, by comparing a middle finger probe FXR to corresponding enrollment FXRs) to generate a second unit, multi-template FXR. In various embodiments, the multi-unit, multi-template fusion scheme includes fusing the first unit, multi-template similarity score and the second unit, multi-template similarity score to generate a multi-unit, multi-template similarity score.

In at least one embodiment, the biometric system 100 can perform fusion according to a multi-representation, multi-template fusion scheme. In at least one embodiment, the multi-representation, multi-template fusion scheme includes generating two or more sets of enrollment FXRs from an enrollment capture, each of the two or more sets corresponding to a different modality (e.g., also referred to as a "representation"). For example, from a finger capture, the biometric system 100 generates a plurality of minutiae template FXRs (e.g., a set of first representation FXRs) and generates a plurality of fingertip template FXRs (e.g., a set of second representation FXRs). In various embodiments, the multi-representation, multi-template fusion scheme includes comparing a first representation probe FXR and a set of first representation enrollment FXRs (e.g., followed by template score fusion) to generate a first representation, multi-template similarity score. In one example, the biometric system 100 compares a probe minutiae FXR with a set of minutiae template FXRs to generate a first representation, multi-template similarity score. In at least one embodiment, the multi-representation, multi-template fusion scheme includes comparing a second representation probe FXR and a set of second representation enrollment FXRs to generate a second representation, multi-template similarity score. For example, the biometric system 100 compares a probe fingertip FXR to a set of fingertip template FXRs to generate a second representation, multi-template similarity score. In various embodiments, the multi-representation, multi-template fusion scheme includes fusing a first representation, multi-template similarity score and a second representation, multi-template similarity score (e.g., or any suitable number of additional representation scores) to generate a multi-representation, multi-template similarity score. In one example, the biometric system 100 fuses a multi-template index finger minutiae similarity score and a multi-template index fingertip similarity score to generate a multi-template index finger minutiae+fingertip similarity score. In the same example, the biometric system 100 repeats the process with a middle finger to generate a multi-template middle finger minutiae+fingertip similarity score, and the biometric system 100 fuses the multi-template index finger minutiae+fingertip similarity score and the multi-template middle finger minutiae+fingertip similarity score to generate a multi-unit, multi-representation, multi-template similarity score.

In at least one embodiment, the biometric system performs fusion according to a multi-representation, multi-unit, multi-template scheme that combines the multi-unit, multi-template fusion scheme and the multi-representation, multi-template fusion scheme (e.g., as described in the above example). According to one embodiment, the sequence 800 shown in FIG. 8 illustrates an exemplary multi-representation, multi-unit, multi-template fusion scheme. For purposes of describing exemplary features of the present systems and processes, the fusion sequence 800 is described in the context of generating a multi-representation, multi-unit, multi-template similarity score from a set of index finger minutiae template FXRs, a set of middle finger minutiae template FXRs, one or more index finger minutiae probe FXRs, one or more middle finger minutiae probe FXRs, a set of index fingertip template FXRs, one or more index fingertip probe FXRs, a set of middle fingertip template FXRs, one or more middle fingertip probe FXRs, a set of index finger texture template FXRs, one or more index finger texture probe FXRs, a set of middle finger texture template FXRs, and one or more middle finger texture probe FXRs. The fusion sequence 800 can be performed using any suitable combination of biometric data and/or non-biodata as can be appreciated. The fusion sequence 800 can be performed using FXRs or irreversibly transformed, privacy-secured tokens.

In various embodiments, the sequence 800 includes generating or retrieving index finger minutiae template FXRs 801A-C and middle finger minutiae template FXRs 803A-C. The generation and/or retrieval of the template FXRs can occur substantially simultaneously or asynchronously. In one example, the representation service 111 retrieves the finger minutiae template FXRs 801A-C and/or middle finger minutiae template FXRs 803A-C from one or more registries 109.

In at least one embodiment, the sequence 800 includes generating an index finger minutiae probe FXR 805 and a middle finger probe minutiae probe FXR 807. In one example, the computing environment 101 receives a hand capture that includes an index finger and a middle finger. In this example, the computing environment 101 performs an embedding process 200 (FIG. 2) to detect, crop, and generate FXRs of the index finger minutiae and the middle finger minutiae. In one or more embodiments, the sequence 800 includes comparing each of the finger minutiae template FXRs 801A-C to the index finger minutiae probe FXR 805 and generating similarity scores 809A-C based on the comparisons. In at least one embodiment, the sequence 800 includes comparing each of the middle finger minutiae template FXRs 803A-C to the middle finger minutiae probe FXR 807 and generating similarity scores 811A-C based on the comparisons. In one or more embodiments, the sequence 800 includes fusing the similarity scores 809A-C to generate a multi-template index finger minutiae score 813 and fusing the similarity scores 811A-C to generate a multi-template middle finger minutiae score 815.

In at least one embodiment, the above-described operations of the sequence 800 correspond to a minutiae fusing sub-sequence 802. According to one embodiment, the sequence 800 includes performing a similar set of operations to FXRs of a fingertip modality and a texture modality. In various embodiments, the sequence 800 includes performing similar operations in a fingertip fusing sub-sequence 804 to generate a multi-template index fingertip similarity score 817 and a multi-template middle fingertip similarity score 819. In at least one embodiment, the sequence 800 including performing similar operations in a texture fusing sub-sequence 806 to generate a multi-template index finger texture similarity score 821 and a multi-template middle finger texture similarity score 823. In one or more embodiments, the biometric system 100 obtains all minutiae, fingertip, and finger texture probe FXRs from a single hand capture (e.g., similar to the sequence 300 shown in FIG. 3).

In various embodiments, generating a multimodal, multi-template, multi-representation similarity score includes fusing (e.g., via averaging) the outputs of two or more sub-sequences 802, 804, 806. In one or more embodiments, the sequence 800 includes fusing the multi-template index finger minutiae score 813, the multi-template middle finger minutiae score 815, the multi-template index fingertip similarity score 817, the multi-template middle fingertip similarity score 819, multi-template index finger texture similarity score 821, and the multi-template middle finger texture similarity score 823 to generate one or more multi-representation, multi-unit, multi-template similarity scores 825. In at least one embodiment, the representation service 111 generates one or more multi-unit, multi-template similarity scores, for example, by fusing the multi-template index finger minutiae score 813 and the multi-template middle finger minutiae score 815, by fusing the multi-template index fingertip similarity score 817 and the multi-template middle fingertip similarity score 819, or by fusing the multi-template index finger texture similarity score 821 and the multi-template middle finger texture similarity score 823. In various embodiments, the representation services generates one or more multi-representation, multi-template similarity scores by fusing two or more index finger-derived similarity scores (e.g., similarity scores 813, 817, 821) or two or more middle finger-derived similarity scores (e.g., FXRs 815, 819, 823).

Figure 9:
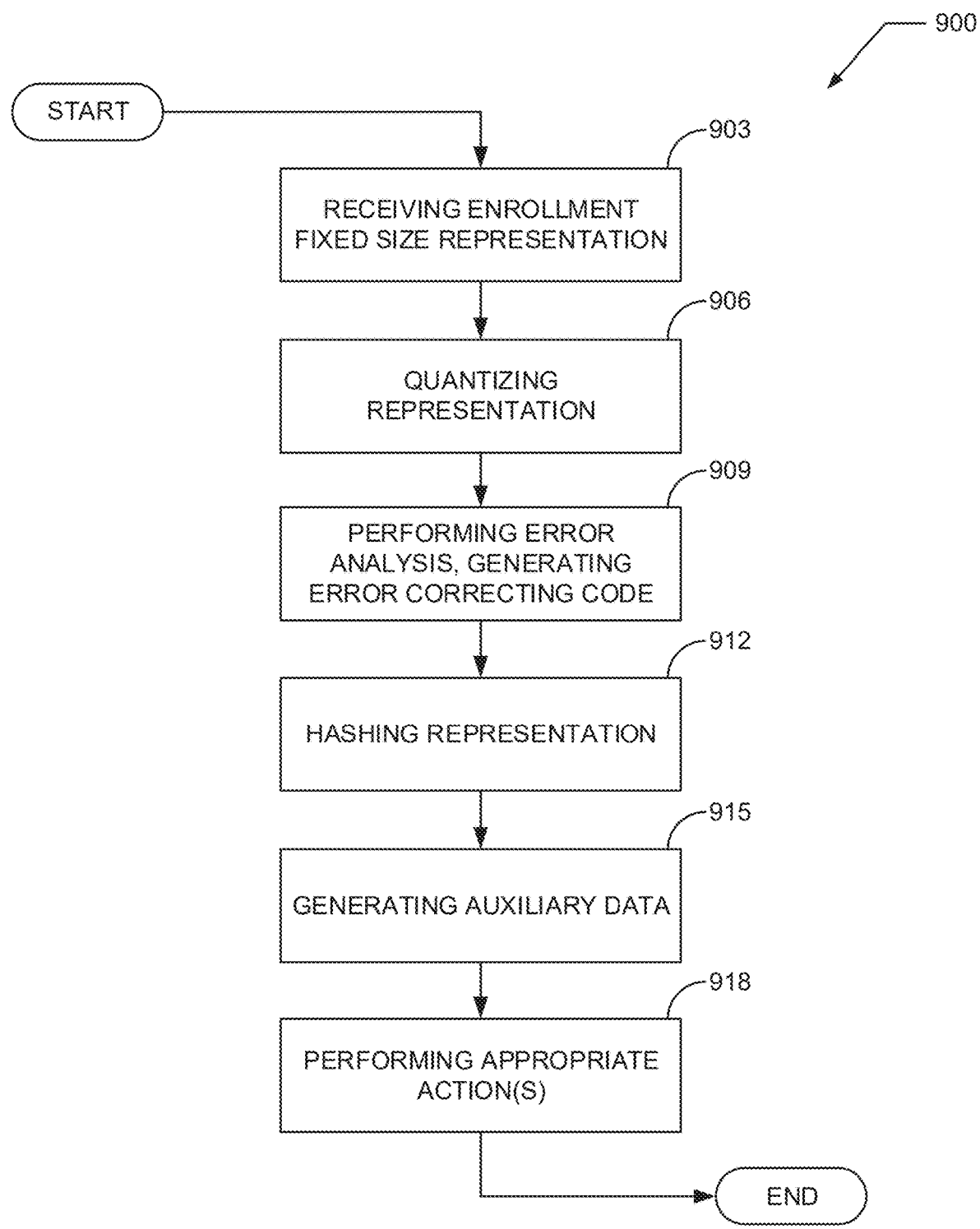
FIG. 9 shows a biometric analysis process, according to one embodiment of the present disclosure.

FIG. 9 shows an exemplary biometric analysis process 900. According to one embodiment, the computing environment 101 and/or the mobile application 104 can perform the process 900 to generate auxiliary data from an enrollment fixed size representation (FXR). In various embodiments, the auxiliary data includes an error correcting code and a hash of the enrollment FXR.

At step 903, the process 900 includes receiving an enrollment FXR. Non-limiting examples of the enrollment representation include unimodal or multimodal representations (e.g., FXRs or privacy-secured tokenizations thereof). In one embodiment, the receiving the enrollment representation includes receiving a capture and/or non-biodata and performing an embedding process (e.g., such as the embedding process 200 show in FIG. 2) to generate the enrollment FXR. In some embodiments, a plurality of enrollment FXRs are received and subjected to the subsequent steps of the process 900. In at least one embodiment, the computing environment 101 receives the enrollment FXR from the computing device 102. In some embodiments, the computing environment 101 retrieves the enrollment FXR from a registry 109.

At step 906, the process 900 includes quantizing the enrollment FXR. In some embodiments, quantizing the enrollment FXR includes performing a biometric embedding process 200 to generate an 8-bit signed integer of the enrollment representation (e.g., or of one or more samples included in the enrollment representation, such as, for example, biometric samples, non-biodata, etc.). In one example, the representation service 111 quantizes the enrollment FXR according to one or more quantization algorithms.

At step 909, the process 900 includes performing one or more error analyses of the quantized enrollment FXR to generate an error correcting code. In at least one embodiment, the representation service 111 applies an error analysis algorithm that generates the error correcting code based on the quantized representation (e.g., or a set thereof). In one or more embodiments, the representation service 111 maps the quantized enrollment FXR to a code based on one or more error correcting algorithms and/or techniques, thereby generating an error correcting code as an output.

At step 912, the process 900 includes hashing the quantized enrollment FXR. In one or more embodiments, the representation service 111 applies a hashing function to the quantized enrollment FXR and generates an enrollment FXR hash as output.

At step 915, the process 900 includes generating auxiliary data. In various embodiments, the representation service 111 generates the auxiliary data by generating a data object that includes the quantized enrollment FXR hash and the error correcting code. In at least one embodiment, the auxiliary data includes quantization parameters that were used to quantize the enrollment FXR at step 906.

At step 918, the process 900 includes performing one or more appropriate actions. In one or more embodiments, the computing environment 101 transmits the auxiliary data to the computing device 102 for storage in memory 108 (e.g., from which it may be retrieved for use as an input to biometric generation processes or biometric unbinding processes). In at least one embodiment, the computing environment 101 stores the auxiliary data in the data store 103. In some embodiments, the computing environment 101 generates scannable media (e.g., a QR code, barcode, etc.) that stores the auxiliary data. In at least one embodiment, the biometric system 100 uses the quantized enrollment FXR hash as an input for encrypting data and/or for securing access to a physical or digital environment (for example, by using the hash as an input to private-public key generation).

Figure 10:
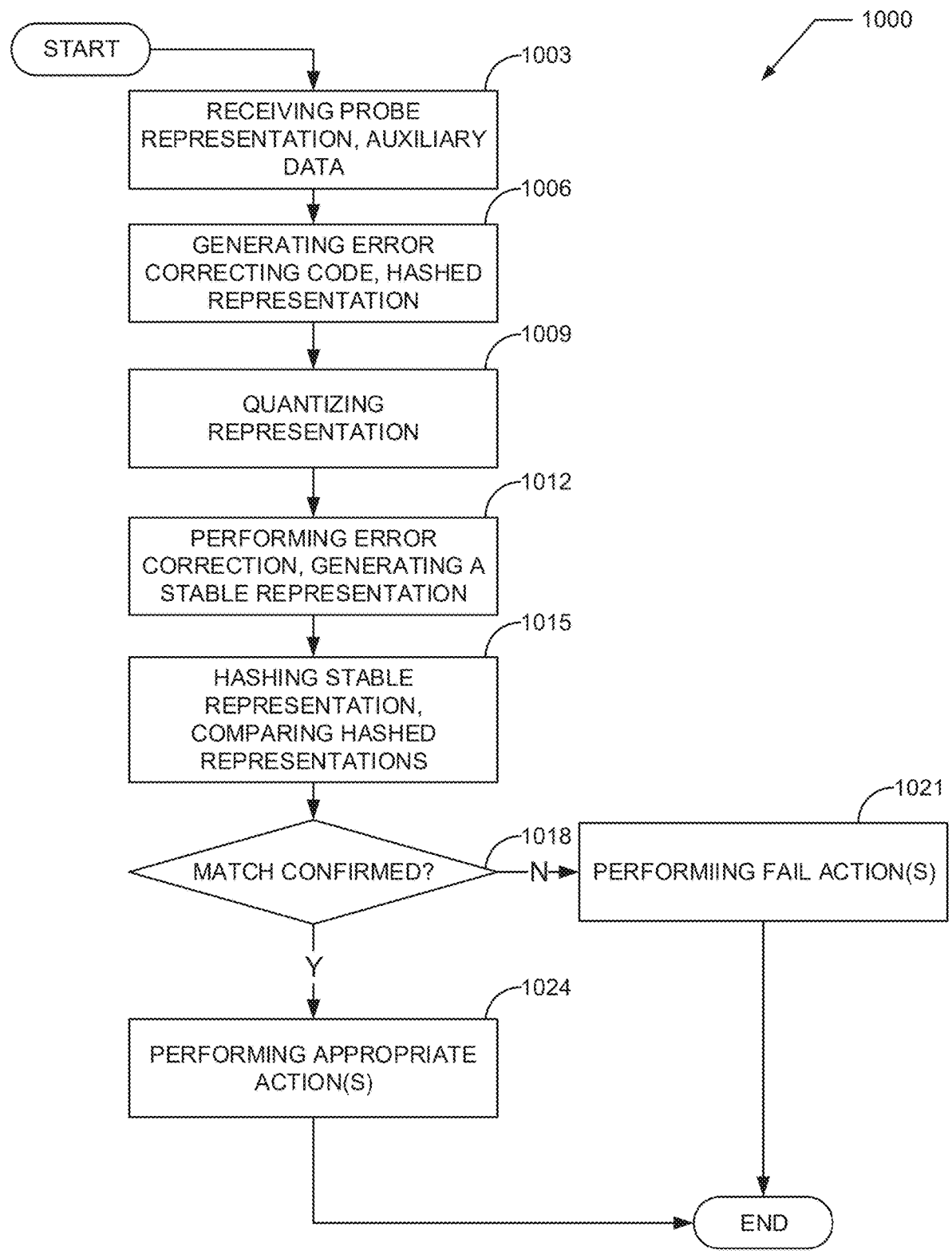
FIG. 10 shows a biometric generation process, according to one embodiment of the present disclosure.

FIG. 10 shows an exemplary biometric generation process 1000. According to one embodiment, the computing environment 101 and/or the mobile application 104 can perform the process 1000 to generate a stable FXR from one or more probe FXRs and auxiliary data, and to compare a hash of the stable FXR to a hash of a quantized enrollment FXR for purposes of verification. In one or more embodiments, in response to positively verifying the stable FXR hash based on a quantized enrollment FXR hash (e.g., by determining a threshold-satisfying similarity therebetween), the biometric system 100 generates a cryptographic key or other secret for decrypting data and/or securing access to a physical or digital environment. In at least one embodiment, the cryptographic key or other secret includes or is derived from the quantized enrollment FXR hash or the stable FXR hash.

At step 1003, the process 1000 includes receiving a probe FXR and auxiliary data associated therewith. In one example, the computing environment 101 receives the probe FXR and auxiliary data from the computing device 102. In another example, the computing environment 101 receives a capture from the computing device 102 and generates the probe FXR by performing an embedding process 200 (FIG. 2). In another example, the mobile application 104 generates the probe FXR and auxiliary data, or retrieves the probe representation and auxiliary data from memory 108.

At step 1006, the process 1000 includes generating an error correcting code and a hashed enrollment FXR based on the auxiliary data. In one example, the computing environment 101 or mobile application 104 applies an unpack function to the auxiliary data and, thereby, extracts the error correcting code and the enrollment FXR hash.

At step 1009, the process 1000 includes quantizing the probe FXR. Step 1009 can be performed similar to step 906 of the process 900 (FIG. 9). In at least one embodiment, the computing environment 101 generates a quantized probe FXR by applying one or more quantization algorithms or techniques to the probe FXR.

At step 1012, the process 1000 includes applying an error correction to the quantized probe FXR based on the error correcting code and, thereby, generating a stable FXR.

At step 1015, the process 1000 includes hashing the stable FXR to generate a stable FXR hash, and includes comparing the stable FXR hash to the enrollment FXR hash obtained from auxiliary data at step 1006 (e.g., or another hashed representation). In at least one embodiment, comparing the hashes includes computing a similarity score, such as, for example, a squared Euclidean distance, $L^2$ norm metric, cosine similarity score, or match probability metric. In various embodiments, the comparison service 115 compares the hashed stable representation and the hashed representation of step 1006. The comparison service 115 can perform the comparison according to one more embodiments described in the incorporated reference, such as, for example, U.S. application Ser. No. 17/109,693, filed Dec. 2, 2020, entitled "SYSTEMS AND METHODS FOR PRIVACY-SECURED BIOMETRIC IDENTIFICATION AND VERIFICATION," which claims priority to and the benefit under U.S. Patent Application No. 62/942,311, filed Dec. 2, 2019, entitled "SYSTEMS AND METHODS FOR PRIVACY-SECURED BIOMETRIC IDENTIFICATION AND VERIFICATION."

At step 1018, the process 1000 includes determining if the stable FXR hash matches the enrollment FXR hash of step 1006. In at least one embodiment, determining the match includes comparing a similarity score to a predetermined threshold and confirming the match based on a determination that the similarity score meets or exceeds the predetermined threshold. According to one embodiment, in response to determining the stable FXR hash does not match the enrollment FXR hash, the process 1000 proceeds to step 1021. In various embodiments, in response to determining the stable FXR hash matches the enrollment FXR hash, the process 1000 proceeds to step 1024.

At step 1021, the process 1000 includes performing one or more failure actions, such as, for example, transmitting alerts, suspending access to services and functions of the computing environment 101 for the computing device 102 (e.g., or the subject), and performing an embedding process 200 (FIG. 2) to enroll the subject into the biometric system 100 by storing the non-matching probe representation as an enrollment representation of the subject. In one example, the computing environment 101 transmits an alert to the computing device 102 from which the auxiliary data and/or probe representation (e.g., or capture used to create the probe representation) was received. In this example, the alert can cause the mobile application 104 to display a message, such as "Decoding Error." In another example, the computing environment 101 transmits a command to the mobile application 104 that causes display of instructions for capturing an additional probe representation.

At step 1024, the process 1000 includes performing one or more predetermined actions. In one or more embodiments, the computing environment 101 transmits the stable FXR (e.g., or scannable media including the same) to the computing device 102 from which the probe FXR and auxiliary data were received, or to another computing device 102. In some embodiments, the representation service 111 generates a secret (e.g., a PIN) by positively matching the stable FXR hash and the enrollment FXR hash. In at least one embodiment, the computing environment 101 transmits the PIN to the computing device 102. In one or more embodiments, the computing environment 101 or the mobile application 104 uses the PIN to decrypt information that was secured via the enrollment FXR hash. In at least one embodiment, the PIN includes the stable FXR hash.

Figure 11:
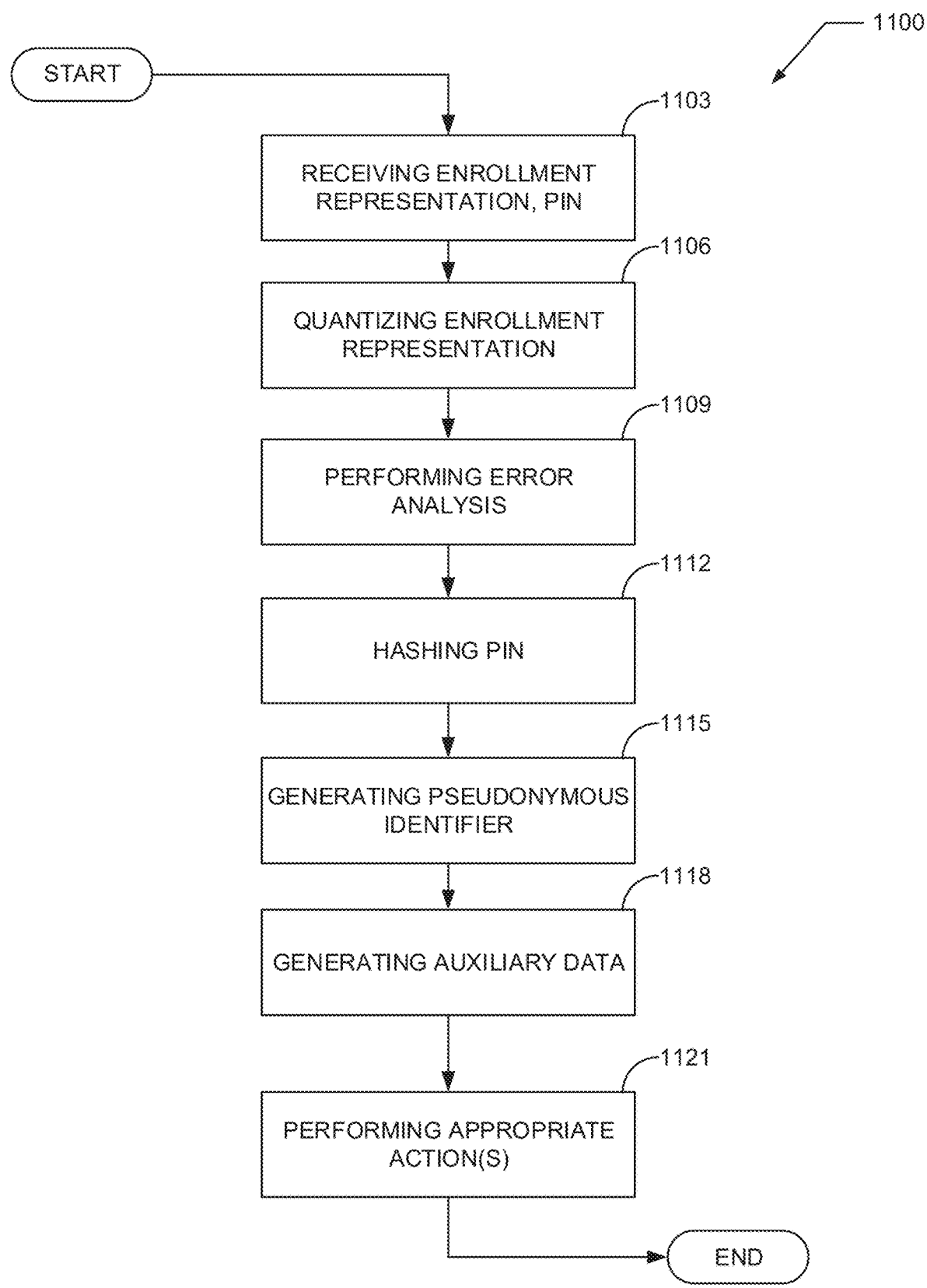
FIG. 11 shows a biometric binding process, according to one embodiment of the present disclosure.

FIG. 11 shows an exemplary biometric binding process 1100. According to one embodiment, the computing environment 101 and/or the mobile application 104 can perform the process 1100 to generate a pseudonymous identifier and auxiliary data from an enrollment FXR (e.g., or a set of FXRs) and a secret (e.g., a PIN). In at least one embodiment, the biometric system performs the biometric binding process 1100 to generate a biometric-secured data object including the pseudonymous identifier and encrypted data.

At step 1103, the process 1100 includes receiving an enrollment FXR and a PIN (e.g., or other secret). In at least one embodiment, the computing environment 101 or mobile application 104 receives a capture and performs an embedding process 200 (FIG. 2) to generate the enrollment FXR. In one or more embodiments, the computing environment 101 retrieves the enrollment FXR from a registry 109. In at least one embodiment, the mobile application 104 retrieves the enrollment FXR from memory 107. In various embodiments, the computing environment 101 or mobile application 104 generates the PIN based on a pseudorandom seed value. In some embodiments, the computing environment 101 or mobile application 104 receives PII or other sensitive information to be encrypted using the PIN (e.g., or another secret).

At step 1106, the process 1100 includes quantizing the enrollment FXR to generate a quantized enrollment FXR. Step 1006 can be performed similar to step 906 of the process 900 (FIG. 9) or step 1009 of the process 1000 (FIG. 10).

At step 1109, the process 1100 includes performing one or more error analyses of the quantized enrollment FXR to generate an error correcting code. Step 1009 can be performed similar to step 909 of the process 900.

At step 1112, the process 1100 includes hashing the PIN to generate a PIN hash. Step 1012 can be performed similar to step 912 of the process 900.

At step 1115, the process 1100 includes generating a pseudonymous identifier based on the quantized enrollment FXR and the PIN. In at least one embodiment, generating the pseudonymous identifier includes performing applying an exclusive disjunction operation (e.g., XOR) to the quantized enrollment FXR and the PIN, thereby generation the pseudonymous identifier as an output of the operation.

At step 1118, the process 1100 includes generating auxiliary data. In at least one embodiment, the auxiliary data includes generating a data object that includes the error correcting code and the hashed PIN.

At step 1121, the process 1100 includes performing one or more appropriate actions. In one or more embodiments, the computing environment 101 transmits the pseudonymous identifier and the auxiliary data to the computing device 102 for storage in memory 108 (e.g., from which it may be retrieved for use as an input to biometric generation processes or biometric unbinding processes). In at least one embodiment, the computing environment 101 stores the pseudonymous identifier and/or auxiliary data in the data store 103. In some embodiments, the computing environment 101 generates scannable media (e.g., a QR code, barcode, etc.) that stores the auxiliary data and the pseudonymous identifier. In at least one embodiment, the computing environment 101 or mobile application 104 encrypts a data (e.g., PII or other sensitive information, such as medical records) using the PIN and packs the encrypted data, pseudonymous identifier, and auxiliary data into a data object, such as, for example a QR code. In various embodiments, the encrypted data can be decrypted following a biometric unbinding process 1200 (FIG. 12) that outputs the PIN and, thereby, allows for decryption at the computing environment 101 or computing device 102.

Figure 12:
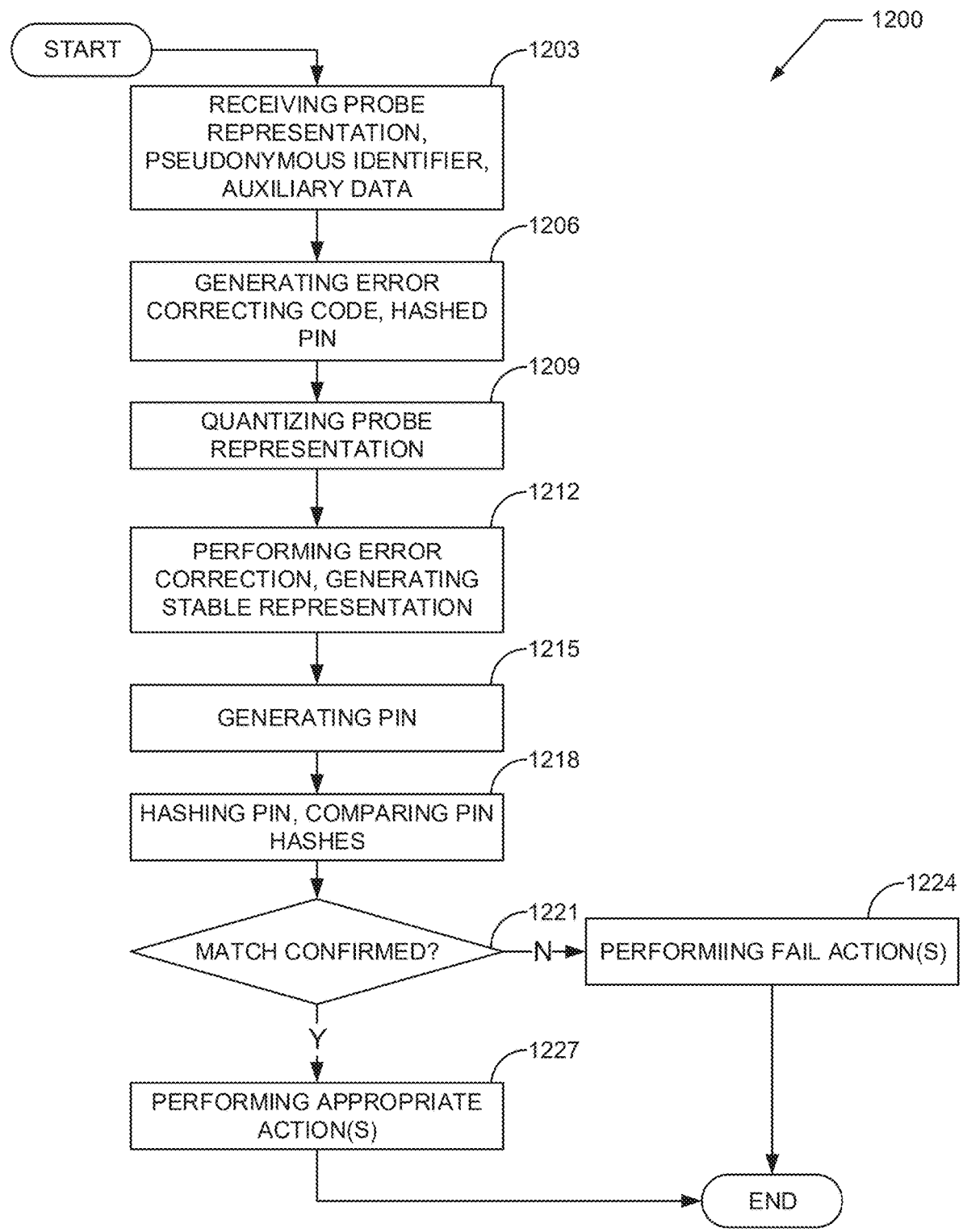
FIG. 12 shows a biometric unbinding process, according to one embodiment of the present disclosure.

FIG. 12 shows an exemplary biometric unbinding process 1200. According to one embodiment, the computing environment 101 and/or the mobile application 104 can perform the process 1100 to generate or recover a PIN for decrypting encrypted data.

At step 1203, the process 1200 includes receiving a probe FXR, a pseudonymous identifier, and auxiliary data. In one or more embodiments, the computing environment 101 or mobile application receives a capture and performs an embedding process 200 (FIG. 2) to generate the probe FXR from the capture. In at least one embodiment, receiving the pseudonymous identifier and auxiliary data includes scanning scannable media (e.g., a QR code, barcode, etc.) and extracting the pseudonymous identifier and auxiliary data therefrom. In some embodiments, the computing environment 101 or computing device 102 receives or retrieves encrypted data to be decrypted (e.g., upon the unbinding process 1100 proceeding to step 1127). In at least one embodiment, the computing environment 101 or mobile application 104 receives a query to be performed on the encrypted data (e.g., following decryption). In one example, the query includes determining whether or not the encrypted data (e.g., or a subject associated therewith) violates a policy, such as, for example, a location provenance policy.

At step 1206, the process 1200 includes generating error correcting code and a PIN hash. In one example, the computing environment 101 or mobile application 104 applies an unpack function to the auxiliary data and, thereby, extracts the error correcting code and the PIN hash.

At step 1209, the process 1200 includes quantizing the probe FXR to generate a quantized probe FXR. Step 1109 can be performed similar to step 906 of the process 900 (FIG. 9) or step 1009 of the process 1000 (FIG. 10).

At step 1212, the process 1200 includes applying an error correction to the quantized probe FXR based on the error correcting code and, thereby, generating a stable FXR. Step 1009 can be performed similar to step 912 of the process 900.

At step 1215, the process 1200 includes generating a PIN based on the stable FXR and the error correcting code. In at least one embodiment, generating the PIN includes performing applying an exclusive disjunction operation (e.g., XOR) to the stable FXR and the pseudonymous identifier, thereby generation the PIN as an output of the operation.

At step 1218, the process includes hashing the PIN of step 1215 and comparing the PIN hash to the PIN hash of step 1206. In at least one embodiment, comparing the hashed pins includes computing a similarity score, such as, for example, a squared Euclidean distance, $L^2$ norm metric, or cosine similarity score.

At step 1221, the process 1200 includes determining if the PIN hash of step 1218 matches the PIN hash of step 1206. In at least one embodiment, determining the match includes comparing a similarity score to a predetermined threshold and confirming the match based on a determination that the similarity score meets or exceeds the predetermined threshold. According to one embodiment, in response to determining the PIN hash of step of 1218 does not match the PIN hash of 1206, the process 1200 proceeds to step 1224. In various embodiments, in response to determining the PIN hash of step 1218 matches the PIN hash, the process 1200 proceeds to step 1227.

At step 1224, the process 1200 includes performing one or more failure actions, such as, for example, transmitting alerts, suspending access to services and functions of the computing environment 101 for the computing device 102 (e.g., or the subject associated therewith), and performing an embedding process 200 (FIG. 2) to enroll the subject into the biometric system 100 by storing the non-matching probe representation as an enrollment representation of the subject. In one example, the computing environment 101 transmits an alert to the computing device 102 from which the pseudonymous identifier, auxiliary data, and/or probe FXR (e.g., or capture used to create the probe FXR) were received. In this example, the alert can cause the mobile application 104 to display a message, such as "Decoding Error." In another example, the computing environment 101 transmits a command to the mobile application 104 that causes display of instructions for capturing an additional probe representation.

At step 1227, the process 1200 includes performing one or more predetermined actions. In various embodiments, the computing environment 101 or mobile application 104 uses the PIN generated at step 1215 to decrypt encrypted data. In one or more embodiments, the computing environment 101 transmits the decrypted data to the computing device 102, or generates a networking address from which the decrypted data can be accessed, edited, and/or viewed. In one or more embodiments, the computing environment 101 or mobile application 104 analyzes the decrypted data to determine if the decrypted data (e.g., or a subject associated therewith) violates one or more policies, such as, for example, a travel restriction policy or a biometric check-in policy.

The biometric system 100 can perform decrypted data querying and related functions according to one or more embodiments described in U.S. application Ser. No. 17/205, 713, filed Mar. 18, 2021, titled "SYSTEMS AND PROCESSES FOR TRACKING HUMAN LOCATION AND TRAVEL VIA BIOMETRIC HASHING," which claims priority to and the benefit of U.S. Patent Application No. 62/991,352, filed Mar. 18, 2020, titled "SYSTEMS AND PROCESSES FOR TRACKING HUMAN LOCATION AND TRAVEL VIA BIOMETRIC HASHING," the disclosures of which are incorporated herein by reference in their entireties.

FIG. 13 shows an exemplary key binding and unbinding process 1300. According to one embodiment, division line 1302 denotes a boundary between an enrollment sequence 1304 and a verification sequence 1306 of the process 1300. In various embodiments, a purpose of the enrollment sequence 1304 is to bind a key (e.g., a PIN or other secret) to a privacy-secured multimodal token (e.g., or other fixed-size representation) during biometric enrollment processes, such as the embedding process 200 (FIG. 1). In one or more embodiments, the process 1300 generates, as output, a pseudonymous identifier and auxiliary data, both of which may be considered public data they do not leak information regarding the original enrollment capture, or regarding the PIN by which the pseudonymous identifier and auxiliary data are created. In some embodiments, the biometric system 100 stores the auxiliary data and pseudonymous identifier at separated locations. For example, the biometric system 100 stores the auxiliary data within a privacy-secured token and transmits the pseudonymous identifier to the computing device 102 for storage in memory 107. In another example, the biometric system 100 stores the auxiliary data at the data store 107 (e.g., in a remote server) and transmits the pseudonymous identifier to a client device, such as, for example, a biometric-controlled information security system with which the computing device 102 is associated. In one or more embodiments, a purpose of the verification sequence 1306 is to release the key (e.g., the PIN) used to generate the pseudonymous identifier and the auxiliary data and perform one or more actions related to the same in response to successfully verifying a probe privacy-secured multimodal token against the enrollment privacy-secured multimodal token.

In various embodiment, during an enrollment sequence 1304 of the process 1300, the computing environment 101 receives an enrollment capture 1301, such as, for example, a facial image, a hand image, or other image of a subject's anatomy. The computing environment 101 can receive the enrollment capture 1301 from the subject's computing device 102. In one or more embodiments, the representation service 111 of the computing environment 101 performs an embedding process 200 (FIG. 2) to generate an enrollment token 1303 (e.g., an irreversible transformed, privacy-secured representation of the enrollment capture). In one or more embodiments, the computing environment 101 receives additional data (e.g., PII or other sensitive information) to be encrypted via the binding process 1300.

In one or more embodiments, the computing environment 101 receives or generates a secondary representation 1305. In one example, the computing environment 101 receives a second capture and the representation service 111 performs an embedding process 200 to generate the secondary representation 1305 (e.g., in the form of a privacy-secured token or other FXR). In another example, the computing environment 101 generates the secondary representation 1305 from the same capture from which the enrollment token 1303 was generated. In some embodiments, the secondary representation 1305 is an embedded vector for representing PII (e.g., a legal name, username, identifier string, etc.) or a device identifier associated with the subject's computing device 102 is associated. In at least one embodiment, the computing environment 101 stores the secondary representation 1305 in the data store 107 for subsequent use during the verification sequence 1306 of the process 1300. In one or more embodiments, the computing device 102 stores the secondary representation 1305 in memory 108. In various embodiments, the secondary representation 1305 (e.g., or the secondary representation 1405 of the process 1400 shown in FIG. 14) be derived from various sources. Non-limiting examples of the various sources include a second biometric modality (e.g., a hand biometric, iris biometric, etc.), a second unit of the same biometric modality with which the enrollment capture 1301 is associated (e.g., if the enrollment capture 1301 is derived from a finger, the secondary representation 1305 can be derived from a different finger), an identifier of another computing device 102 or other electronic device (e.g., the IMEI or MAC address of the computing device 102), and a subject-generated password.

In at least one embodiment, the representation service 111 performs a blending process 300 (FIG. 3) to blend the enrollment token 1303 and the secondary representation 1305, thereby generating a multimodal enrollment token 1307. In one or more embodiments, the computing environment 101 receives or generates a PIN 1309A. In one example, the computing device 102 receives subject inputs defining the PIN 1309A and the computing environment 101 receives the pin 1309A from the mobile application 104 installed on the computing device 102. In another example, the computing environment 101 generates the PIN 1309A based on a pseudorandom seed value.

In various embodiments, the representation service 111 performs a binding process 1100 (FIG. 11) and uses the multimodal enrollment token 1307 (e.g., as an input enrollment FXR) and the PIN 1309A to generate a pseudonymous identifier 1311 and auxiliary data 1313. In at least one embodiment, the auxiliary data 1311 includes a hash of the PIN 1309A and an error correcting code for reconstructing a stable version of the multimodal enrollment token 1307 (e.g., the enrollment representation) for purposes of authenticating future probe representations. The pseudonymous identifier can include data derived from the FXR and can be used in combination with the stable version of the multimodal enrollment token 1307 to release the PIN 1309A (e.g., during the verification sequence 1306 of the process 1300). In at least one embodiment, the computing environment 101 stores the pseudonymous identifier 1311 and the auxiliary data 1313 at separate locations. For example, the computing environment 101 stores the auxiliary data 1313 at the data store 103 and transmits the pseudonymous identifier 1311 to the computing device 102 for storage in memory 108. In at least one embodiment, the computing environment 101 generates scannable media including the pseudonymous identifier 1311, the auxiliary data 1313, and/or data that has been encrypted using the PIN 1309A.

In one or more embodiments, during a verification sequence 1306 of the process 1300, the computing environment 101 receives a probe capture 1315 (e.g., a live biometric or non-biodata probe that, if authentic, is derived from the same source as the enrollment capture 1301). In at least one embodiment, the computing environment 101 performs an embedding process 200 to generate a verification token 1317 (e.g., a privacy-secured token or other FXR). In one or more embodiments, the computing environment 101 receives, generates, or retrieves the secondary representation 1305. In one example, the computing device 102 retrieves the secondary representation 1305 from memory 108 (e.g., or as a result of extracting the secondary representation 1305 from scannable media). In another example, the computing device 102 generates the secondary representation 1305 from a capture or input of the subject. In at least one embodiment, the computing environment 101 receives encrypted data to be decrypted and, in some embodiments, queried on behalf of the subject.

In one or more embodiments, the representation service 111 performs a blending process 300 to blend the verification token 1317 and the secondary representation 1305, thereby generating a multimodal probe token 1319. In various embodiments, the representation service 111 performs an unbinding process 1200 (FIG. 12) and uses the multimodal probe token 1319 as an input probe FXR. In various embodiments, the computing environment 101 receives and/or retrieves the pseudonymous identifier 1311 and the auxiliary data 1313 for use as inputs to the unbinding process 1200. In at least one embodiment, as an output of the unbinding process 1200, the computing environment 101 generates (e.g., releases) a PIN 1309B (e.g., identical to the PIN 1309A).

In various embodiments, the computing environment 101 decrypts the encrypted data using the PIN 1309B. In at least one embodiment, the computing environment 101 transmits the PIN 1309B to the computing device 102, and the computing device 102 can use the PIN 1309B to perform one or more actions including, but not limited to, decrypting encrypted data, gaining access to a physical or digital environment, or verifying the identity of the subject. In some embodiments, the computing environment 101 decrypts the encrypted data and performs one or more analyses to determine if the decrypted data (e.g., or an element thereof) violates a policy. The computing environment 101 can query the decrypted data according to one or more embodiments described in the incorporated references, such as, for example, U.S. application Ser. No. 17/205,713, filed Mar. 18, 2021, titled "SYSTEMS AND PROCESSES FOR TRACKING HUMAN LOCATION AND TRAVEL VIA BIOMETRIC HASHING," which claims priority to and the benefit of U.S. Patent Application No. 62/991,352, filed Mar. 18, 2020, titled "SYSTEMS AND PROCESSES FOR TRACKING HUMAN LOCATION AND TRAVEL VIA BIOMETRIC HASHING."

FIG. 14 shows an exemplary key generation process 1400. According to one embodiment, division line 1402 denotes a boundary between an enrollment sequence 1404 and a verification sequence 1406 of the process 1400. In various embodiments, a purpose of the enrollment sequence 1404 is to generate an enrollment token and auxiliary data for use an input to a generation process 1000 (FIG. 10) that releases a key (e.g., a stable version of the enrollment token.) In one or more embodiments, a purpose of the verification sequence 1406 is to generate the stable version of the enrollment token (e.g., or other key) and release the stable version of the enrollment token in response to successfully verifying a probe token against the enrollment token.

In various embodiment, during an enrollment sequence 1404 of the process 1400, the computing environment 101 receives an enrollment capture 1401, such as, for example, a facial image, a hand image, or other image of a subject's anatomy. The computing environment 101 can receive the enrollment capture 1401 from the subject's computing device 102. In one or more embodiments, the representation service 111 of the computing environment 101 performs an embedding process 200 (FIG. 2) to generate an enrollment token 1403 (e.g., an irreversible transformed, privacy-secured representation of the enrollment capture).

In one or more embodiments, the computing environment 101 receives or generates a secondary representation 1405. In one example, the computing environment 101 receives a second capture and the representation service 111 performs an embedding process 200 to generate the secondary representation 1405 (e.g., in the form of a privacy-secured token or other FXR). In another example, the computing environment 101 generates the secondary representation 1405 from the same capture from which the enrollment token 1403 was generated. In some embodiments, the secondary representation 1405 is an embedded vector for representing PII (e.g., a legal name, username, identifier string, etc.) or a device identifier associated with the subject's computing device 102 is associated. In at least one embodiment, the computing environment 101 stores the secondary representation 1405 in the data store 107 for subsequent use during the verification sequence 1406 of the process 1400. In one or more embodiments, the computing device 102 stores the secondary representation 1405 in memory 108.

In at least one embodiment, the representation service 111 performs a blending process 300 (FIG. 3) to blend the enrollment token 1403 and the secondary representation 1405, thereby generating a multimodal enrollment token 1407. In one or more embodiments, the multimodal enrollment token 1407 (e.g., or a stable reconstruction thereof) is a key by which data can be encrypted or for use in gaining access to a physical or digital environment (e.g., via generation of a key pair, such as a private-public key pair).

In various embodiments, the representation service 111 performs an analysis process 900 (FIG. 9) and uses the multimodal enrollment token 1307 (e.g., as an input enrollment FXR) to generate auxiliary data 1409. In at least one embodiment, the auxiliary data 1311 includes a hash of the multimodal enrollment token 1407 and an error correcting code for reconstructing a stable version of the multimodal enrollment token 1407 (e.g., the enrollment representation) for purposes of authenticating future probe representations. In at least one embodiment, the computing environment 101 stores the auxiliary data 1409 at the data store 107. In at least one embodiment, the computing environment 101 transmits the auxiliary data 1409 to the computing device 102. In at least one embodiment, the computing environment 101 generates scannable media including the auxiliary data 1409.

In one or more embodiments, during a verification sequence 1406 of the process 1300, the computing environment 101 receives a probe capture 1415 (e.g., a live biometric or non-biodata probe that, if authentic, is derived from the same source as the enrollment capture 1401). In at least one embodiment, the computing environment 101 performs an embedding process 200 to generate a verification token 1417 (e.g., a privacy-secured token or other FXR). In one or more embodiments, the computing environment 101 receives, generates, or retrieves the secondary representation 1405. In one or more embodiments, the representation service 111 performs a blending process 300 to blend the verification token 1417 and the secondary representation 1405, thereby generating a multimodal probe token 1419. In various embodiments, the representation service 111 performs a generation process 1000 (FIG. 10) and uses the multimodal token 1317 as an input probe FXR. In various embodiments, the computing environment 101 receives and/or retrieves the auxiliary data 1409 (e.g., including the error correcting code) for use as an input to the generation process 1000. In at least one embodiment, as an output of the generation process 1000, the computing environment 101 generates a stable enrollment token 1421 (e.g., a reconstruction of the multimodal enrollment token 1407). In at least one embodiment, the process 1400 includes encrypting and decrypting data (e.g., during the sequences 1404, 1406, respectively) based on the multimodal enrollment token 1407 and the stable enrollment token 1421. The process 1400 can include performing data encryption, decryption, querying, and authentication functions similar to those performed in one or more embodiments of the process 1300 (FIG. 13). In such instances, the enrollment token 1407 and the stable enrollment token 1421 can be used as encryption keys similar to the PINs 1309A, 1309B of the process 1300.

Figure 15:
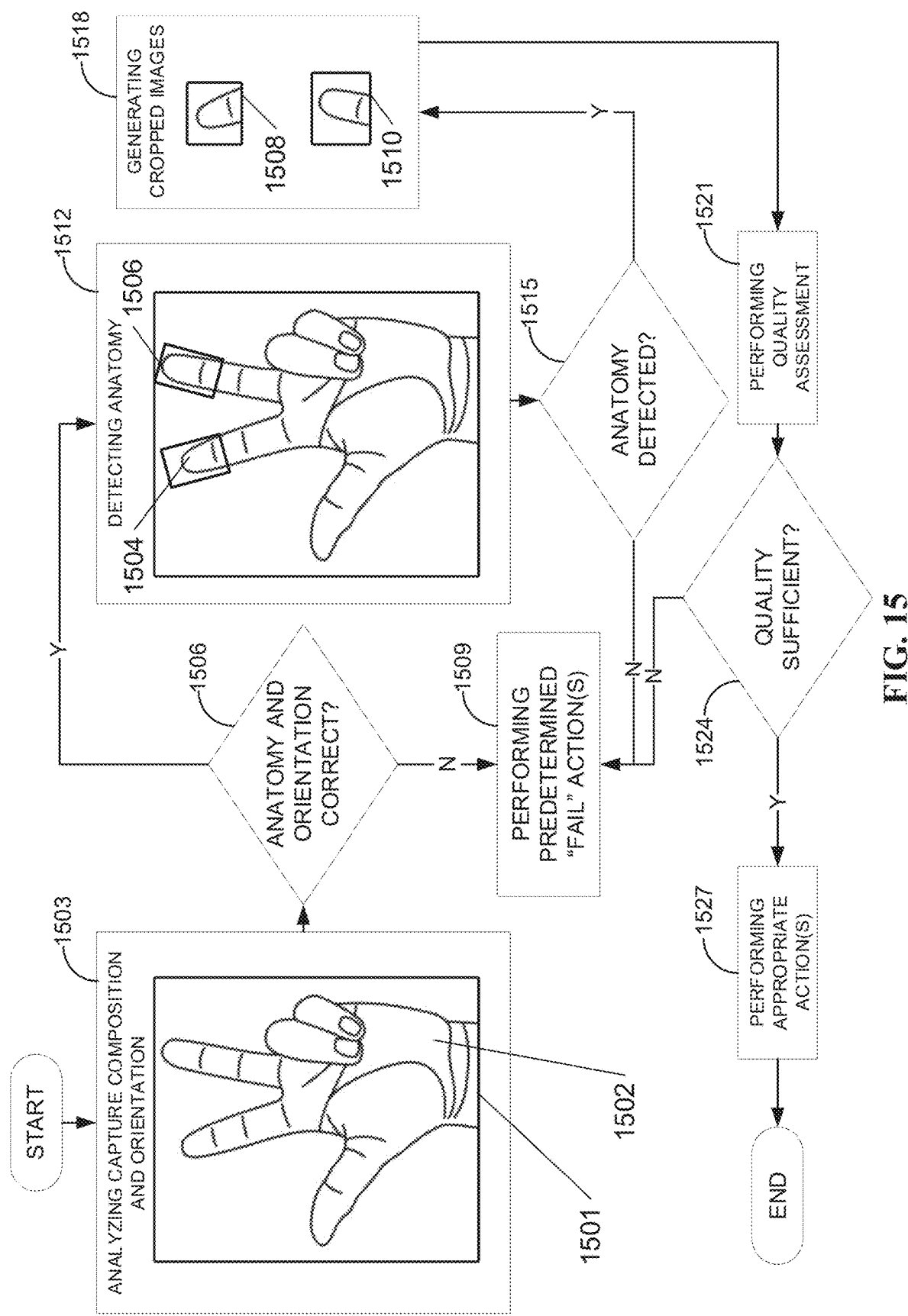
FIG. 15 shows an exemplary anatomy detection process, according to one embodiment of the present disclosure.

FIG. 15 shows an exemplary anatomy detection process 1500. In at least one embodiment, the policy service 117 (e.g., and/or other elements of the computing environment 101) performs the process 1500 during step 206 of the embedding process 200 (FIG. 2). In at least one embodiment, the anatomy detection process 1500 takes a capture (e.g., a hand image, facial image, finger image, etc.), detects particular anatomy in the capture (e.g., fingers, irises, etc.), and generates cropped images of the particular anatomy for further processing.

At step 1503, the process 1500 includes analyzing content of a capture 1501 and analyzing orientation. In various embodiments, aligning the capture 1501 includes classifying anatomy shown therein. In one example, the policy service 117 includes an anatomy classifier model that is trained on a corpus of anatomy images to determine a type and/or orientation of anatomy included in the capture 1501. In one example, a trained hand classifier model takes the capture 1501 as input and determines that the capture includes a hand 1502. In the same example, the trained hand classifier model determines that the hand 1503 is a left hand or a right hand, and further determines whether the hand 1503 is captured in a predetermined gesture (e.g., middle and index fingers extended, open hand, etc.).

At step 1506, the process 1500 includes determining that the capture 1501 includes the correct anatomy (e.g., hand, fingers, face, etc.) and that the anatomy demonstrates the correct orientation (e.g., right handed, left handed, front face view, etc.). In at least one embodiment, in response to determining the capture 1501 demonstrates a proper orientation and/or expected anatomy (e.g., the hand 1503), the process 1500 proceeds to step 1512. In one or embodiments, in response to determining the capture 1501 does not demonstrate the expected anatomy and/or orientation, the process 1500 proceeds to step 1509.

At step 1509, the process 1500 includes performing one or more predetermined failure actions. In one example, the computing environment suspends the process 1500 and transmits an alert to the computing device 102 from which the capture 1501 was received. In another example, the computing environment 101 transmits a command to the computing device 102 that causes the computing device 102 to display instructions for correctly capturing the expected anatomy in the predetermined orientation.

At step 1512, the process 1500 includes detecting particular anatomy in the capture 1503, such as, for example, an index fingertip 1504 and a middle fingertip 1506 (e.g., other examples include a nose, eyes, lips, a palm, or other fingers). In one or more embodiments, the policy service 117 includes a fingertip detection module (e.g., such as, for example, a classification model) that analyzes the capture 1501 and returns coordinates or other information denoting the location of one or more fingertips. The policy service 117 can include a detection module for identifying any suitable biometric, as can be appreciated.

At step 1515, the process 1500 includes determining that the predetermined anatomy is detectable in the capture 1501 (e.g., the predetermined anatomy including an index fingertip and a middle fingertip, for example). In at least one embodiment, in response to detecting the predetermined anatomy, the process 1500 proceeds to step 1518. In one or more embodiments, in response to failing to detect the predetermined anatomy, the process 1500 proceeds to step 1509.

At step 1518, the process 1500 includes generating cropped images of the predetermined anatomy. In one or more embodiments, the policy service 117 generates a cropped index fingerprint image 1508 and a cropped middle fingerprint image 1510 based on the determinations from step 1512 that detected the index fingertip 1504 and the middle fingertip 1506.

At step 1521, the process 1500 includes performing a quality assessment of the cropped index fingerprint image 1508 and the cropped middle fingerprint image 1510. In one or more embodiments, the policy service 117 includes a sharpness classifier that computes a sharpness score for each image 1508, 1510 and a contrast classifier that computes a contrast score for each image 1508, 1510. In at least one embodiment, the contrast classifier also outputs a factor that contributed to an unacceptable contrast score. For example, the contrast classifier can determine if the image 1508 demonstrates unacceptable contrast due to imbalanced lighting or due to insufficient brightness (e.g., or excessive darkness).

At step 1524, the process 1500 includes determining that the cropped index fingerprint image 1508 and the cropped middle fingerprint image 1510 are of sufficient quality. In at least one embodiment, for each image 1508, 1510, the policy service compares the sharpness score to a predetermined sharpness threshold (e.g., a minimum sharpness threshold) and compares the contrast score to a predetermined contrast threshold (e.g., an acceptable contrast range). In one or more embodiments, each image 1508, 1510 must satisfy all predetermined thresholds to be deemed of sufficient quality. In at least one embodiment, in response to determining the cropped index fingerprint image 1508 and the cropped middle fingerprint image 1510 are of sufficient quality, the process 1500 proceeds to step 1527. In various embodiments, in response to determining the cropped index fingerprint image 1508 and/or the cropped middle fingerprint image 1510 are not of sufficient quality, the process 1500 proceeds to step 1509 (e.g., at which the computing environment can transmit an alert defining reasons why the images 1508 and/or image 1510 are not of sufficient quality).

At step 1527, the process 1500 includes performing one or more predetermined actions. Non-limiting examples of the predetermined actions include storing the cropped index fingerprint image 1508 and the cropped middle fingerprint image 1510 and further processing the cropped index fingerprint image 1508 and the cropped middle fingerprint image 1510 via an embedding process 200 (FIG. 2) and/or other processes described herein.

Figure 16:
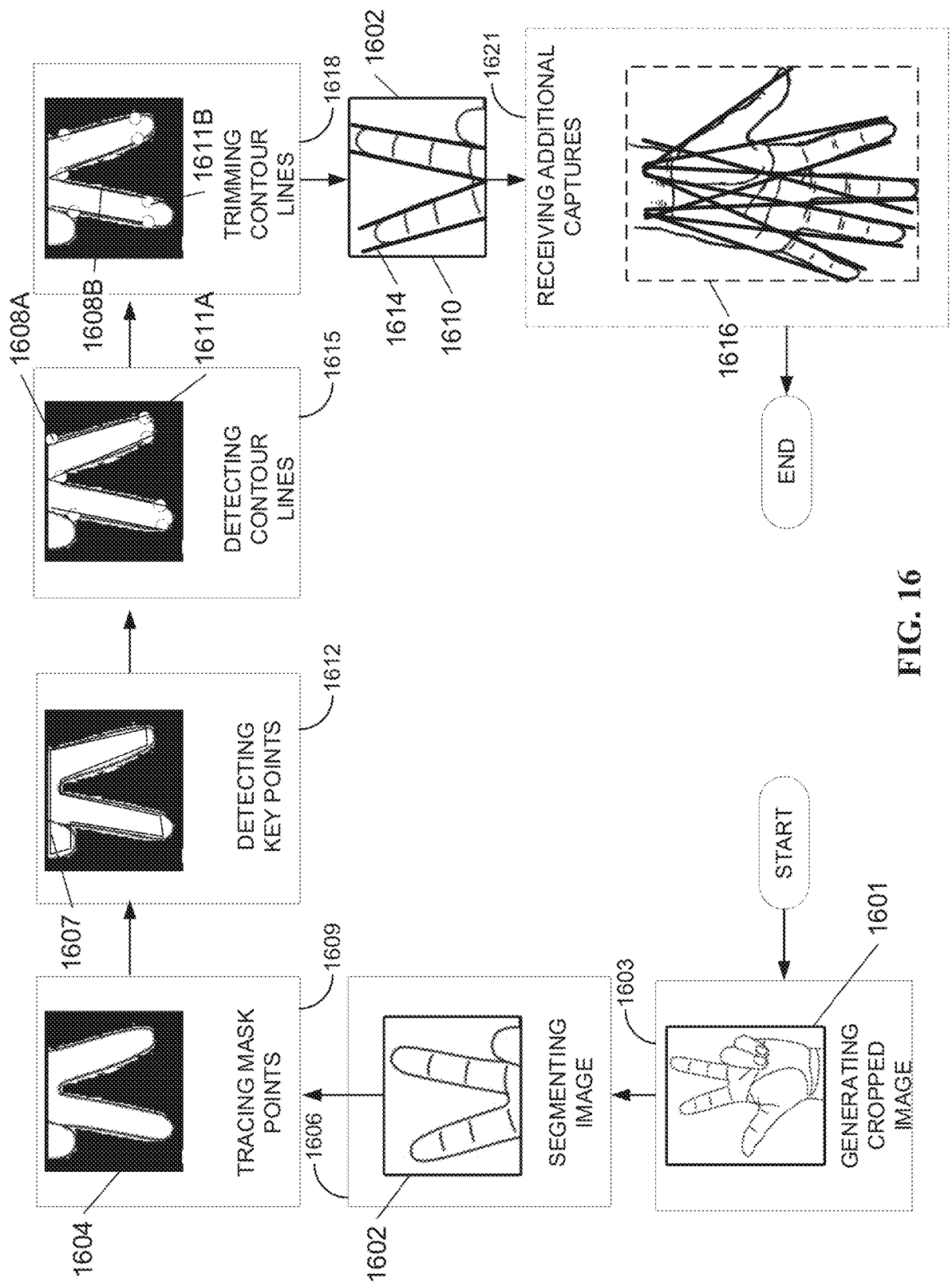
FIG. 16 shows an exemplary geometry detection process, according to one embodiment of the present disclosure.

FIG. 16 shows an exemplary geometry detection process 1600. In one or more embodiments, the policy service 117 performs the geometry detection process 1600 during step 206 of an embedding process 200 (FIG. 2).

At step 1603, the process 1600 includes generating a cropped image 1602 by cropping a capture 1601. In one example, the policy service 117 crops a hand image to generate a cropped image including an index finger and a middle finger. In one or more embodiments, the policy service 117 includes a cropping module that automatically crops the capture 1601 according to a predetermined template such that the resultant cropped image 1602 includes predetermined anatomy.

At step 1606, the process 1600 includes segmenting the cropped image 1602 to generate a mask 1604. In one example, the policy service 117 processes the cropped image 1602 through a segmentation module that removes background of the cropped image 1602 such that only predetermined anatomy (e.g., such as a middle and an index finger) are maintained in the mask 1604. In some embodiments, the segmentation module extracts a texture image and a print image of each component of predetermined anatomy in the cropped image 1602. For example, the segmentation module extracts an inner finger texture and a fingertip image for each of a middle and an index finger.

At step 1609, the process 1600 includes generating a tracing 1607 of the mask 1604. In at least one embodiment, generating the tracing 1607 includes inserting contour points or lines into the mask 1604 that bound predetermined anatomy. For example, the policy service 117 applies a tracing 1607 to the mask 1604 such that a middle finger and an index finger are bounded. In at least one embodiment, the tracing 1607 includes a plurality of contour points defining a boundary of the predetermined anatomy.

At step 1612, the process 1600 includes detecting one or more key points 1608A that define a contour of the predetermined anatomy in the mask 1604. In one example, the policy service 117 detects the one or more key points 1608A by reducing contour points that define the tracing 1607.

At step 1615, the process 1600 includes detecting initial contour lines 1608A of the predetermined anatomy. In various embodiments, the contour lines 1608A refer to pairs of substantially parallel lines that bound each predetermined anatomy element of the mask 1604. For example, the policy service 117 detects a first pair of contour lines 1608A that bound a middle finger and detects a second pair of contour lines 1608A that bound an index finger. In one or more embodiments, the policy service 117 defines multiple contour lines for bounding each element of the anatomy, and applies an averaging function to generate pairs of dominant contour lines for defining the contour lines 1608A. In at least one embodiment, defining the contour lines 1608A includes defining tail points 1611A at regions of inflection along the contours of each anatomy element.

At step 1618, the process 1600 includes trimming the contour lines 1608A to generate contour lines 1608B. In one or more embodiments, the policy service 117 trims the contour lines 1608A by reducing the tail points 1611A to the tail points 1611B such that each anatomy element (e.g., the index fingertip and the middle fingertip) are bounded by two substantially parallel lines. In one or more embodiments, the policy service 117 generates geometry data defining the contour lines 1608B and/or tail points 1611B.

At step 1621, the process 1600 includes applying geometry data the cropped image 1602, thereby generating a contoured image 1610. In one or more embodiments, the policy service 117 applies contour lines 1614 based on the geometry data, and the contour lines 1614 include two pairs of substantially parallel lines that bound each anatomy element (e.g., the index fingertip and the middle fingertip). In one or more embodiments, the policy service 117 generates cropped images of each anatomy element based on the contoured image 1610. For example, the policy service 117 generates a cropped index fingertip image and a cropped middle finger image. In the same example, the policy service 117 can perform another geometry detection process to generate additional cropped images, such as cropped images of an index fingerprint and a middle fingerprint.

At step 1621, the process 1621 includes receiving additional captures, such as, for example, a hand capture in which the hand is of a different gesture than the gesture demonstrated in the capture 1601. In one or more embodiments, the policy service 117 performs additional geometry detection processes to generate a combined contour image 1616 in which a plurality of anatomy elements are defined by contour lines (e.g., and from which a variety of cropped and other images can be extracted). In one example, the policy service 117 performs one or more iterations of the geometry detection process 1600 to generate a contoured image of an entire hand, including contour lines defining each finger.

Figure 17:
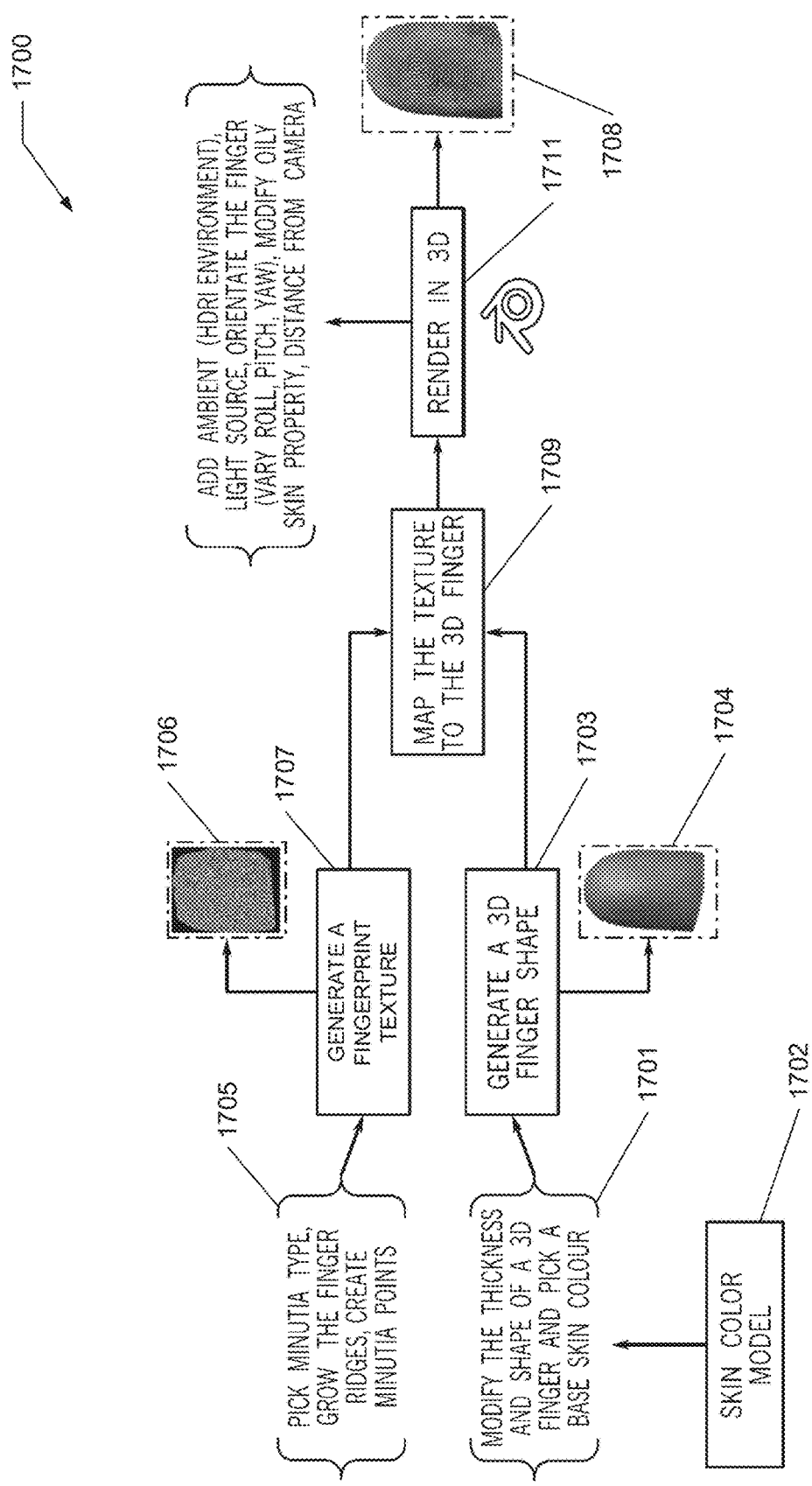
FIG. 17 shows an exemplary synthetic biometric generation process, according to one embodiment of the present disclosure.

FIG. 17 shows an exemplary synthetic biometric generation process 1700, according to one embodiment of the present disclosure. In one or more embodiments, the representation service 111 (e.g., shown in FIG. 1 and described herein) performs the process 1700 to generate synthetic biometric data, such as, for example, a synthetic fingerprint. For the purposes of showing and describing exemplary aspects of the process 1700, the following description is presented in the context of generating a synthetic finger from which a synthetic fingerprint may be extracted (e.g., as described herein). It will be understood and appreciated that the representation service 111 can perform the process 1700 to generate any suitable synthetic biometric data including, but not limited to, synthetic fingerprint, synthetic palm print, synthetic foot print, synthetic toe print, synthetic tongue print, synthetic lip print, synthetic cars, synthetic facial features or whole faces, synthetic dental features, and synthetic gaits or other biomechanical movement.

At step 1701, the process 1700 includes configuring one or more shape and appearance parameters of the target biometric feature (e.g., a synthetic finger, synthetic face, or any suitable biometric feature). Non-limiting examples of the shape and appearance parameters include finger thickness, finger length, finger height, finger volume, finger skin color, and coloration effect(s) (e.g., blemishes, scarring, clothing obfuscation, vitiligo, albinism, melasma, etc.). In one or more embodiments, the representation service 111 imports or retrieves a skin color model 1702 for configuring a skin color parameter of the synthetic finger. In at least one embodiment, the representation service 111 configures the one or more shape and appearance parameters based upon a target population within which the present biometric systems and processes are implemented. In one example, the representation service 111 can configure the skin color parameter based on a median skin tone associated with the target population.

At step 1703, the process 1700 includes generating one or more synthetic three-dimensional (3-D) shapes 1704 of the target biometric feature. According to one embodiment, the synthetic 3-D shape 1704 includes a 3-D mesh and/or a 3-D point cloud. In various embodiments, the representation service 111 generates the synthetic 3-D shape 1704 based on the one or more shape and appearance parameters of step 1701. In at least one embodiment, the synthetic 3-D shape 1704 includes a virtual shape file and metadata, such as, for example, the shape and appearance parameters of step 1701 or a target population with which the synthetic 3-D shape 1704 is associated.

At step 1705, the process 1700 includes configuring one or more texture parameters of the target biometric feature. Non-limiting examples of texture parameters include minutiae type, minutiae dimension (e.g., ridge or other minutiae shape, depth, length, etc.), minutiae points, smoothness, pore prevalence, pore size, and pore pattern. In at least one embodiment, the representation service 111 configures the one texture parameters based upon a target population within which the present biometric systems and processes are implemented.

At step 1707, the process 1700 includes generating one or more synthetic textures 1706 of the target biometric feature. In one or more embodiments, the representation service 111 generates the synthetic texture 1706 based on the one or more texture parameters of step 1705. In at least one embodiment, the synthetic texture 1706 includes a virtual texture file and metadata, such as, for example, the one or more texture parameters of step 1705 or a target population with which the synthetic texture 1706 is associated. In one or more embodiments, the synthetic texture 1706 can include, but is not limited to, one or more two-dimensional or three-dimensional image textures, one or more bump or other height deviation maps, and one or more displacement maps.

At step 1709, the process 1700 includes mapping the synthetic texture 1706 to the synthetic 3-D shape 1704. In various embodiments, the representation service 111 overlays the synthetic texture 1706 onto the synthetic 3-D shape 1704 via coordinate mapping. In one or more embodiments, in any suitable sequence, the representation service 111 applies one or more two- or three-dimensional image textures, one or more height deviation maps, and/or one or more displacement maps to the synthetic 3-D shape 1704.

At step 1711, the process 1700 includes rendering a synthetic biometric feature 1708 (e.g., a synthetic finger) based on the synthetic 3-D shape 1704 and mapped synthetic texture(s) 1706. In various embodiments, the representation service 111 renders the synthetic biometric feature 1708 via any suitable rendering program or application. In one or more embodiments, the representation service 111 modifies the synthetic biometric feature 1708 to include one or more environmental factors. Non-limiting examples of environmental factors include ambient lighting, light source (e.g., natural, incandescent, fluorescent, LED, light composition, number of sources, orientation of sources, etc.), feature orientation (e.g., roll, pitch, yaw of feature), distance from virtual camera, and synthetic skin properties (e.g., oil, moisture, cosmetics, etc.). In various embodiments, as shown and described herein, the representation service 111 can generate one or more fixed-size representations or privacy-secured tokens based on the synthetic biometric feature 1708 (e.g., or a portion thereof, such as a synthetic fingerprint, synthetic minutiae, etc.).

Figure 18A:
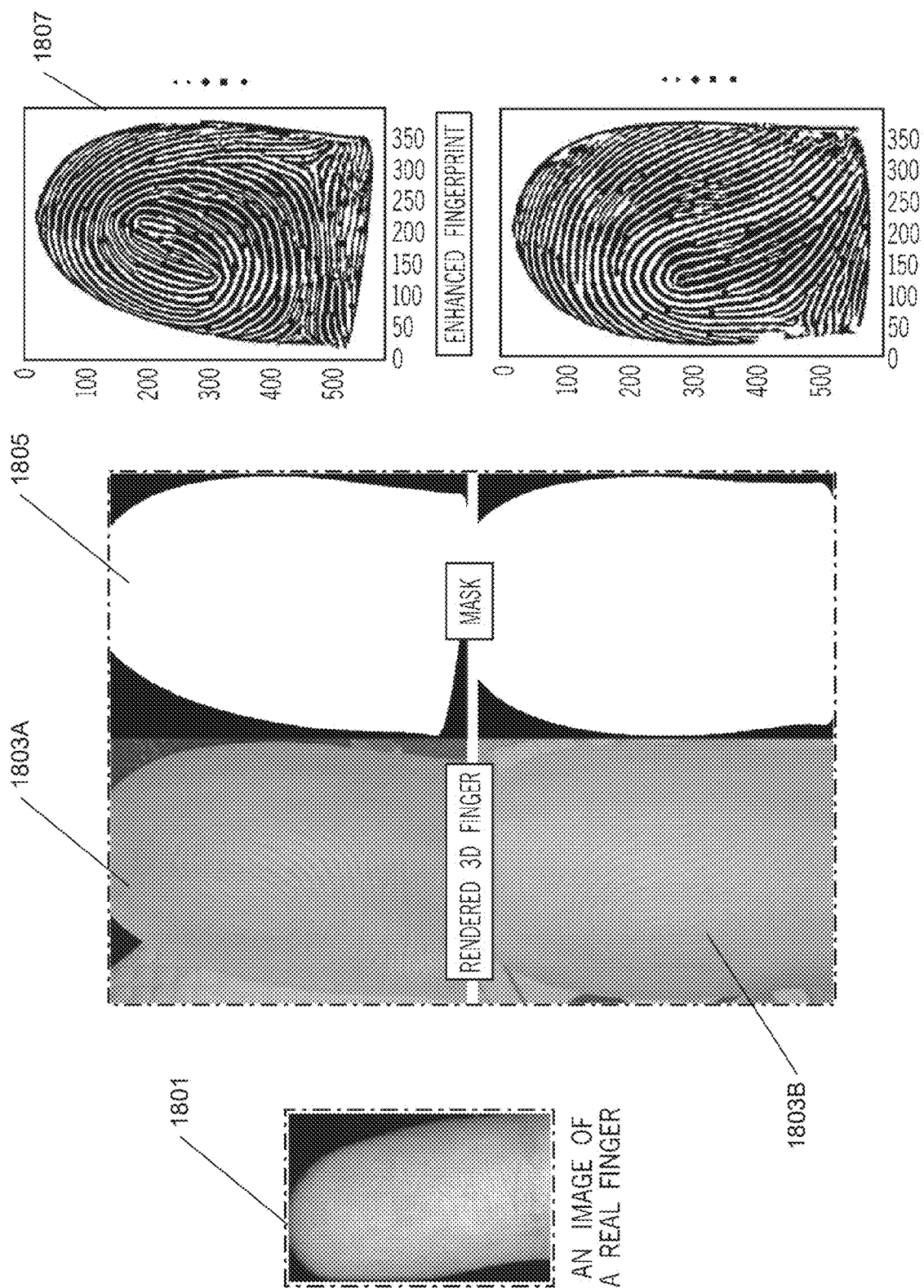
FIG. 18A shows exemplary synthetic biometrics, according to one embodiment of the present disclosure.

FIG. 18A shows exemplary synthetic biometrics 1803A, 1803B as compared to a natural biometric 1801. In at least one embodiment, the representation service 111 generates a mask 1805 of each synthetic biometrics 1803A, 1803B. In various embodiments, the mask 1805 separates foreground (e.g., skin area) from the background. In one or more embodiments, the representation service 111 extracts minutiae 1807 from the mask 1805.

Figure 18B:
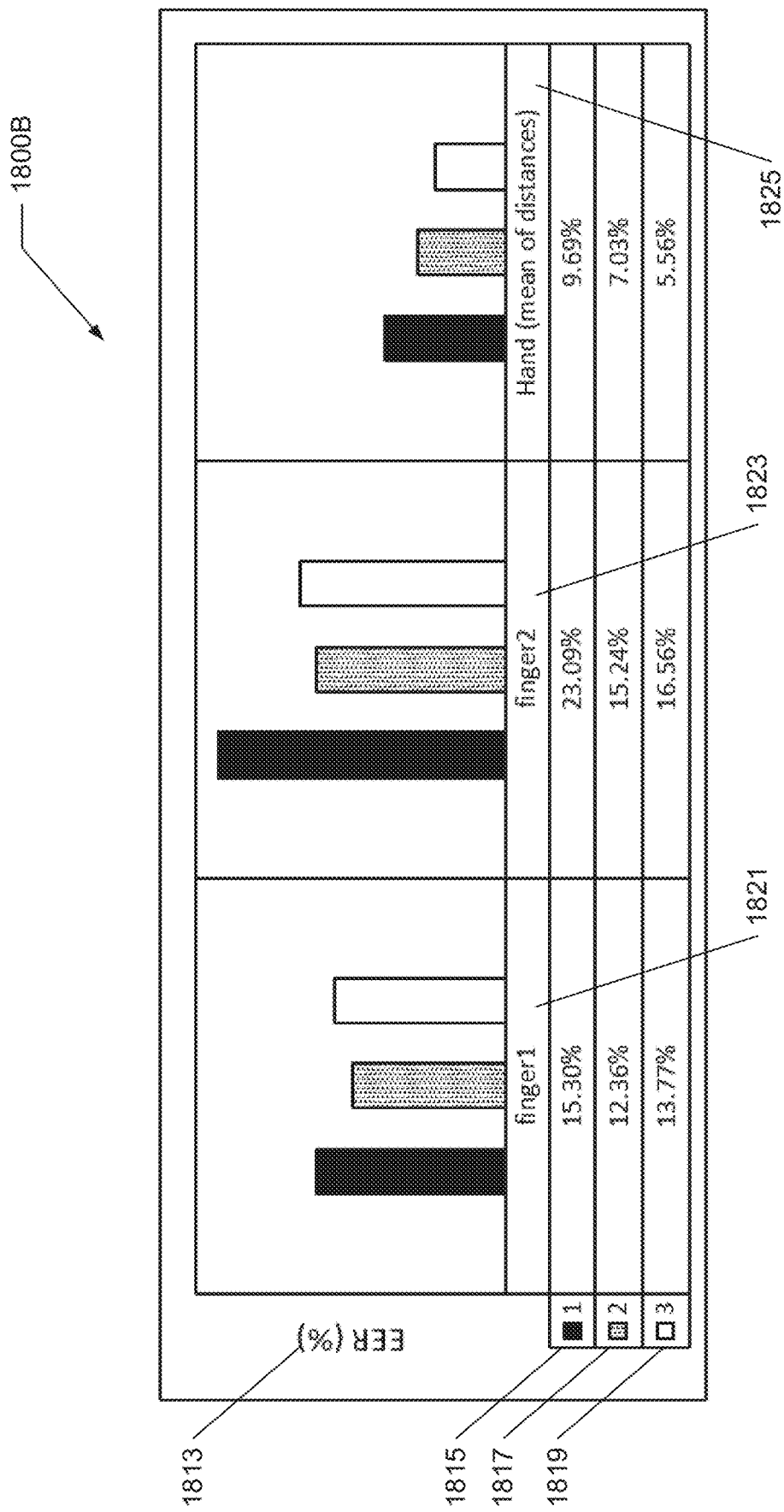
FIG. 18B shows a chart of exemplary biometric matching performance, according to one embodiment of the present disclosure.

FIG. 18B shows a chart 1800B of exemplary biometric matching performance as measured in equal error rate (EER) 1813. As used herein, the lower the EER, the more accurate the system. For example, a 0% EER indicates a perfect recognition accuracy, whereas a 50% EER suggests that demonstrated accuracy is no better than a random guess. In various embodiments, the chart 1800B demonstrates matching performances of various biometric representation schemas. In various embodiments, the schemas include multi-template fusion schemas including a single template schema 1815, a dual template schema 1817, and a triple template schema 1819. According to one embodiment, the multi-template schemas include averaging matching scores of the corresponding number of mated templates. For example, in the dual template schema 1817, the comparison service 115 can generate a matching score by computing similarity scores between each of two probe representations and an enrollment representation and averaging the similarity scores. In another example, in the triple template schema 1819, the comparison service 115 can generate a matching score by computing similarity scores between each of three probe representations and an enrollment representation and averaging the similarity scores. In one or more embodiments, the schemas include multimodal schemas including a first finger schema 1821 (e.g., an index finger), a second finger schema 1823 (e.g., a middle finger or other finger different from the finger utilized in the first finger schemas 1821), and a multimodal schema 1825.

According to one embodiment, in the multimodal schema 1825, the comparison service 115 can generate a matching score by computing similarity scores for each probe finger representation (e.g., including multiple representations of the same finger, if multi-template fusion is performed) and averaging the similarity scores (e.g., arithmetic mean or a weighted average of the similarity scores). In at least one embodiment, the chart 1800B shows EER 1813 for combinations of the multi-template and multimodal fusion schemas. In various embodiments, the chart 1800B demonstrates that, by combining the scores of two biometric features (e.g., two fingers) with three templates, an EER 1813 of 5.56% may be achieved, thereby demonstrating the effectiveness of using multiple biometric features and multiple templates in fusion.

Figure 18C:
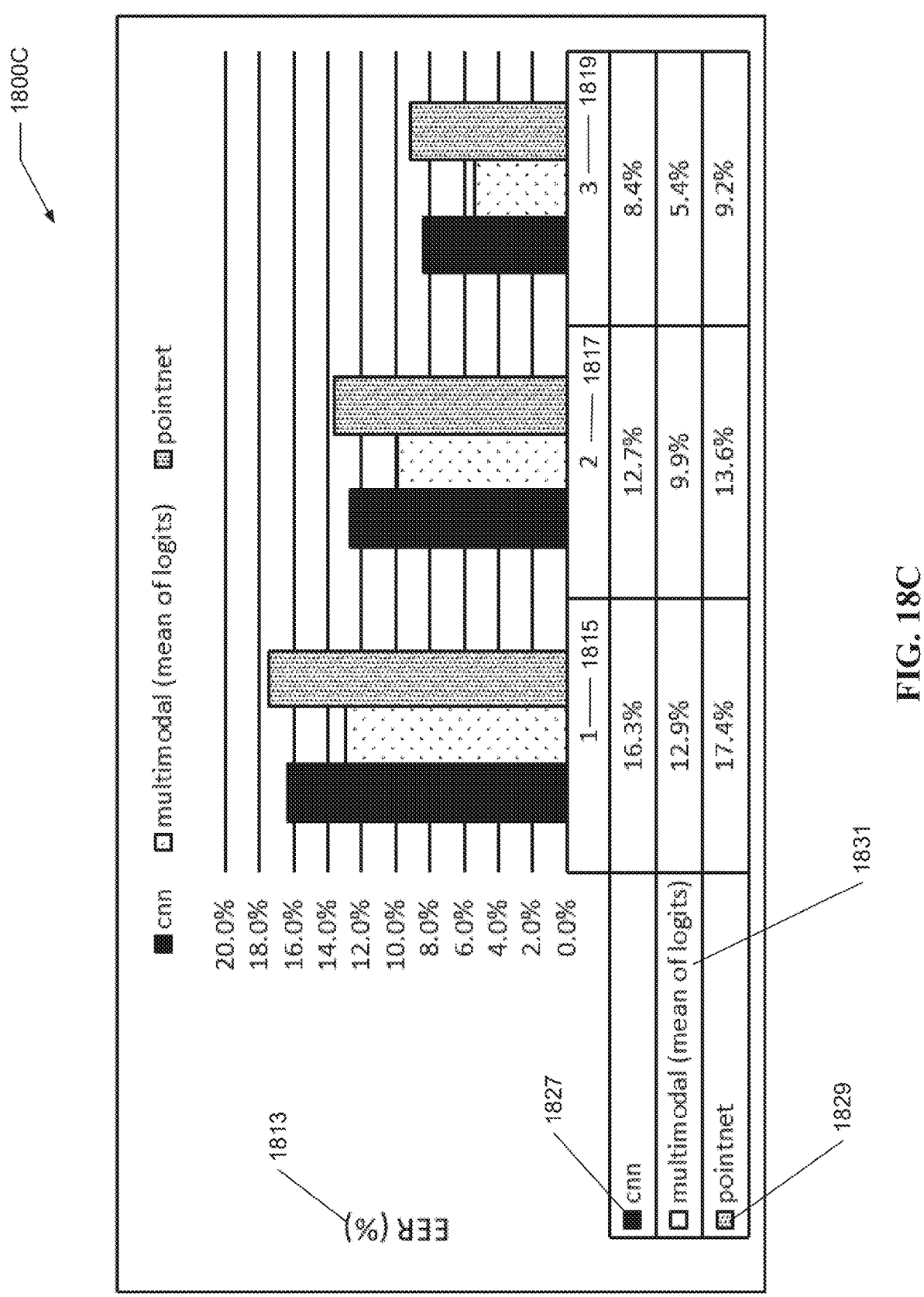
FIG. 18C shows a chart of exemplary biometric matching performance, according to one embodiment of the present disclosure.

FIG. 18C shows a chart 1800C exemplary biometric matching performance as measured in equal error rate (EER) 1813. In various embodiments, the chart 1800C shows EER 1813 obtained in a plurality of biometric schemas including the single template schema 1815, dual template schema 1817, and triple template schema 1819. In one or more embodiments, the chart 1800C shows EER 1813 obtained from unimodal representation schemas 127, 129 and a multimodal representation schema 131. In at least one embodiment, in the representation schema 127, the representation service 111 generates biometric representations via a two-dimensional convolution neural network (CNN). In various embodiments, the representation service 111 can use a multilayer, two-dimensional CNN to implement a fingertip image encoder. In at least one embodiment, the representation service 111 trains the multilayer, two-dimensional CNN on synthetically generated fingerprint images (e.g., generated as shown and described herein). In one or more embodiments, the representation service 111 trains the multilayer, two-dimensional CNN based on additive margin softmax loss. In some embodiments, the representation service 111 retrieves a trained CNN from the data store 103 or an external service.

In various embodiments, in the representation schema 129, the representation service 111 generates biometric representations via a fingerprint minutiae encoder based on a point cloud-based neural network architecture (e.g., which may be or have been trained using additive margin softmax loss). For example, the representation service 111 can implement and train a point cloud-based neural network that novel deep net architecture that consumes raw point cloud (e.g., set of points) without voxelization or rendering and learns both global and local point features thereof. In at least one embodiment, the representation service 111 trains a point cloud-based neural network on touch-based fingerprint minutiae image files (e.g., associated with real human subjects). In various embodiments, to perform the matching of which the results are shown in FIG. 18C, the representation service 111 generates a plurality of mated and non-mated biometric representations via the representation schemas 127, 129 (e.g., based on a set of subject-derived biometric data or synthetically generated biometric data).

In one or more embodiments, in the multimodal representation schema 1831, the representation service 111 combines representations from the representation schemas 127, 129 (e.g., via multimodal representation processes shown and described herein). In various embodiments, the multimodal representation schema 1831 includes performing score-level fusion according to one or more techniques, algorithms, models, or combinations thereof. In at least one embodiment, the comparison service 115 can generate multimodal matching scores via fusion by computing an average of logit scores from each schema 127, 129. For example, the comparison service 115 can generate similarity scores within each schema 127, 129 via one-to-one or one-to-many comparisons (e.g., in some embodiments, the similarity score representing a probability that two biometric representations being compared are indeed mated). In various embodiments, the comparison service 115 can generate similarity scores in the multimodal representation schema 115 by computing an arithmetic mean or other unweighted or weighted average of corresponding similarity scores of the schemas 127, 129. In one or more embodiments, the chart 1800C demonstrates that, by combining the scores of two biometric representation schemas (e.g., CNN and point cloud-based neural network) with three templates, an EER 1813 of 5.4% may be achieved, thereby demonstrating the effectiveness of using multiple biometric features and multiple templates in fusion.

Figure 19:
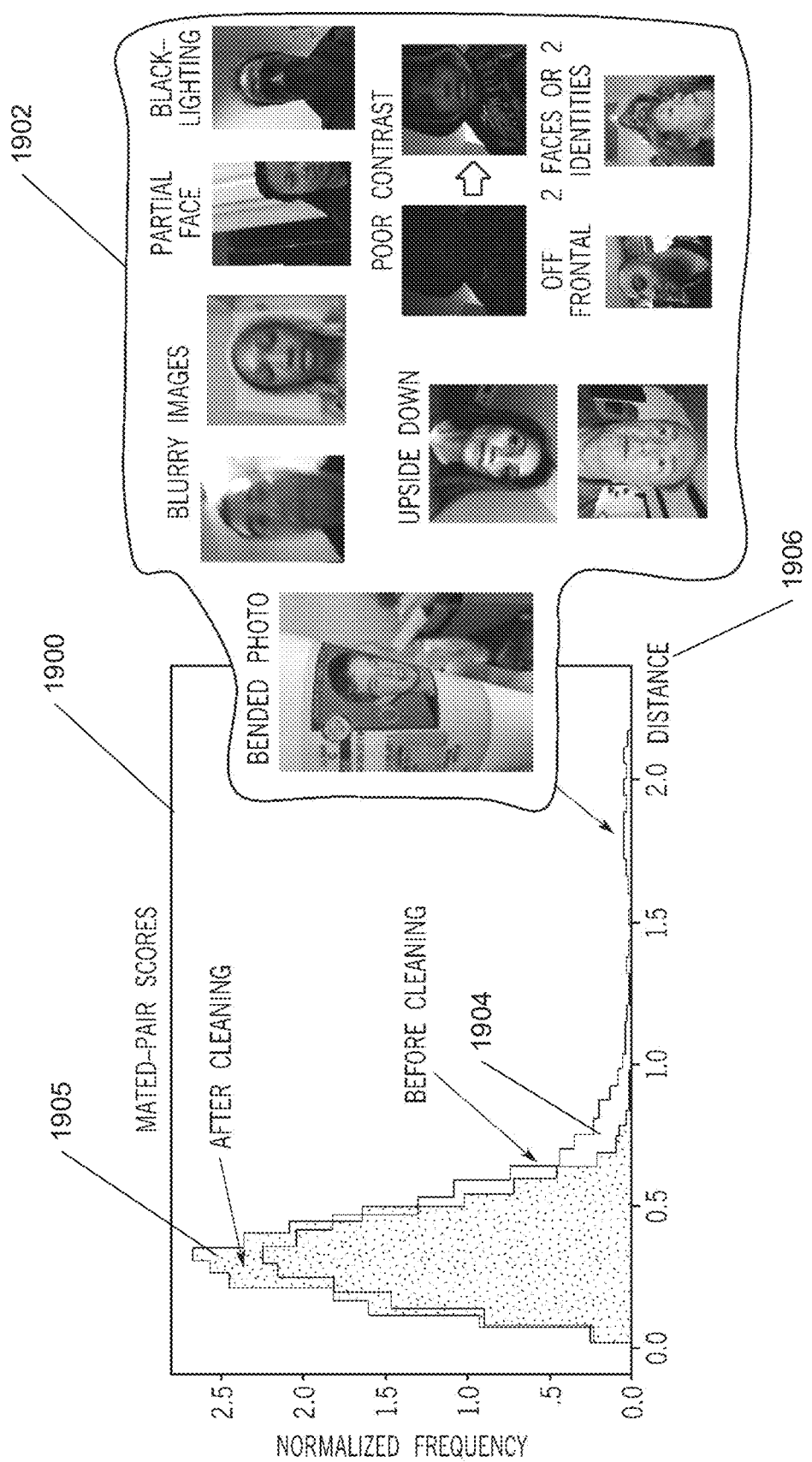
FIG. 19 shows a chart of exemplary biometric matching performance, according to one embodiment of the present disclosure.

FIG. 19 shows a chart 1900 of exemplary biometric matching performance in database deduplication (e.g., on a database of biometric images). In one or more embodiments, the comparison service 115 performs database deduplication by identifying images that are of poor or other problematic quality and identifying duplicate identities (e.g., images associated with the same subject). In various embodiments, the present systems and processes are advantageous for database deduplication because they may be implemented with any existing database and data modality (e.g., biometrics, device data, etc.). In at least one embodiment, the present systems and processes improve upon existing database deduplication approaches by performing one or more cleaning operations to improve matching accuracy. In one or more embodiments, the present systems may perform database deduplication and/or data cleaning as a pre-processing step for generating representations of biometric data, device data, or combinations thereof.

According to one embodiment, the present systems perform database cleaning and deduplication by identifying duplicate database entries (e.g., multiple entries associated with the same subject or device) and database entries of poor quality or other deficiency. In various embodiments, the computing environment 101 (see FIG. 1) obtains an original database and performs one or more operations to clean and/or deduplicate the original database. The original database can include biometric data, device identification data, or combinations thereof. For the purposes of showing and describing the cleaning and deduplication operations, FIG. 19 and the accompanying discussion are provided in the context of cleaning and deduplicating a database of facial images (e.g., including mated pairs of facial images). In at least one embodiment, the comparison service 115 performs a mated-pair (e.g., causal) score analysis and a non-mated-pair (e.g., non-causal analysis, non-mated-pair referring to facial images incorrectly matched or mismatched).

In one or more embodiments, the representation service 111 identifies, in the original database, one or more facial images that are of poor quality or other deficiency. As shown in image grid 1902, non-limiting examples of deficiencies include image warping or bending, blurriness, partial biometric capture (e.g., a portion of a requisite biometric feature is captured, such as a section of a face), black-lighting, inverted image, poor contrast, off-frontal, and multiple subject (e.g., biometrics of multiple subjects are in the same image). In at least one embodiment, the representation service 111 identifies the deficiencies via any suitable image analysis technique, algorithm, model, or combinations thereof. In some embodiments, the comparison service 115 identifies database entries of poor quality or other deficiencies (e.g., as shown in the chart 1900 and described below). In various embodiments, the representation service 111 corrects one or more deficiencies, for example, by re-orienting a biometric image to a particular orientation, adjusting image properties (e.g., contrast, sharpness, hue, brightness, etc.), or prompting capture and collection of a replacement sample (e.g., a replacement facial image or other suitable data object). In one or more embodiments, the representation service 111 flags poor quality or other deficient database entries for review (e.g., by an owner of the database, by another image cleaning service, etc.).

In various embodiments, the comparison service 115 performs one or more data cleaning operations prior to and during biometric matching processes shown and described herein. For example, the comparison service 115 can generate an initial set of similarity scores and perform a cleaning operation on the initial set to generate a cleaned set of similarity scores by which matching determinations may be generated. In one or more embodiments, as shown in the chart 1900, the comparison service 115 cleans biometric data by identifying a bimodal distribution 1904 in intrasubject-mated scores. In various embodiments, the comparison service 115 flags database entries that, based on the bimodal distribution 1904, are associated with a greater measure of dissimilarity (e.g., distance 1906). In some embodiments, the comparison service 115 uses agglomerative clustering to identify the bimodal distribution 1904. In at least one embodiment, intrasubject-mated scores refer to measures of similarity between vector representations of the same data (e.g., the same subject biometrics, same device data, etc.).

In one or more embodiments, the chart 1900 includes a cleaned distribution 1905 that corresponds to matching processes performed on the original database following cleaning operations described herein (e.g., detecting and subsequently excluding, replacing or improving images of poor quality or other deficiency). In various embodiments, in comparison to the bimodal distribution 1904, the cleaned distribution 1905 demonstrates improved matching performance based on the narrowed band of mated-pair score distance 1906. In one or more embodiments, the database entries of the cleaned distribution 1905 were subjected to the cleaning schema 2000 shown in FIG. 20.

Figure 20:
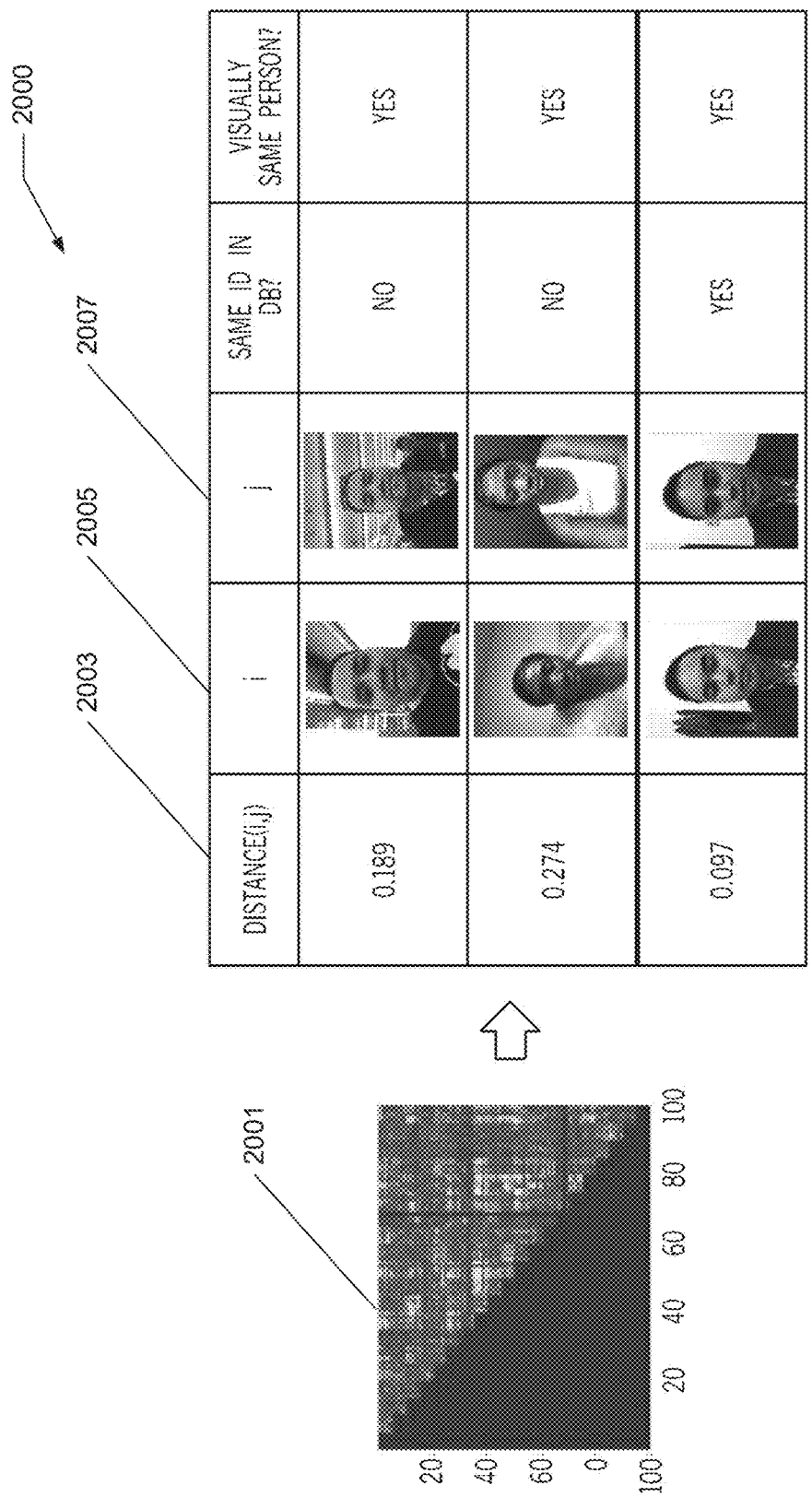
FIG. 20 shows an exemplary cleaning schema, according to one embodiment of the present disclosure.

FIG. 20 shows an exemplary cleaning schema 2000. In various embodiments, to clean entries of the original database, the comparison service 115 performs a non-mated-pair score analysis 2001. In one or more embodiments, in the non-mated-pair score analysis 2001, the comparison service 115 identifies database entries that are visually mated but are not mated within the original database. In at least one embodiment, based on the non-mated-pair score analysis 2001, the comparison service 115 identifies visually mated database samples 2005, 2007. In various embodiments, the comparison service 115 flags the identified database samples 2005, 2007 for additional cleaning, exclusion, or replacement.

Figure 21:
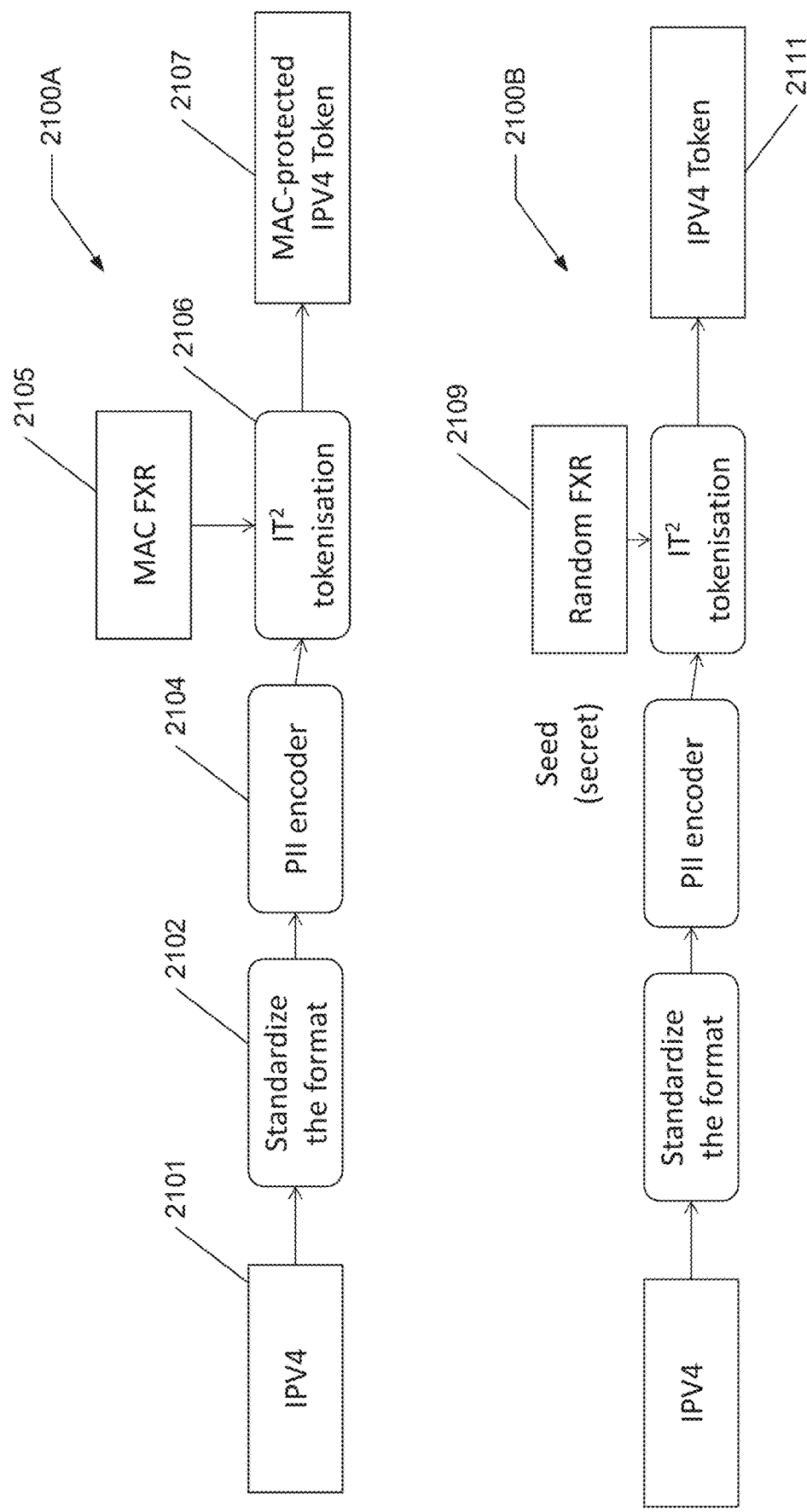
FIG. 21 shows an exemplary multifactor representation process, according to one embodiment of the present disclosure.

FIG. 21 shows exemplary multifactor representation processes 2100A,B. In various embodiments, the computing environment 101 (see FIG. 1) performs the processes 2100A,B to generate a multifactor representation of an electronic device (e.g., that may be used for subsequent identification or verification of the electronic device, or a user thereof). In one or more embodiments, the computing environment 101, by multifactor representation processes 2100A,B (e.g., and other representation generation processes described herein), can encode any suitable device-related information, including, but not limited to the device information shown in Table 2. For the purposes of showing and describing exemplary aspects of the processes 2100A,B, the proceeding description is placed in the context of generating a multifactor representation of a device based on an internet protocol (IP) address and media access control (MAC) address (e.g., or secret seed value in the process 2100B).

TABLE 2

Exemplary Device Information

| Authentication Level | Function | Example |
| --- | --- | --- |
| First | Hardware-based, immutable device information. Even if an attacker reset the device to factory default, the first-level authentication information persists. | Physical device signatures, physically unclonable functions (PUFs), physically unclonable functions, camera fingerprintings |
| Second | Operating system-level privileged device information. The device information cannot be changed without accessing the root privilege of the device (e.g., typically requiring user permission to permit an application to access the information). | Device attestation information, serial number, International Mobile Equipment Identity (IMEI) number |
| Third | Application-controlled information. The device information is initialized at installation of the application. If the application is deleted and re-installed, the information is lost. The device information can be reset (e.g., by user command), which is considered pseudonymous. | Universally unique identifier (UUID), digital wallet, advertising identifier, Jetpack Security |

At step 2101, the process 2100A includes receiving an IP address of an electronic device. In various embodiments, the computing environment 101 receives the IP address of an electronic device via inputs or by automated collection from the device to-be-represented or a transmission therefrom. In one example, the computing environment 101 can receive the IP address from a server in response to the server detecting a request from the device.

At step 2102, the process 2100A includes standardizing the format of the IP address to a predetermined format. In one example, the representation service 111 can remove non-numerical characters and spaces from the IP address.

At step 2104, the process 2100A includes encoding the IP address into a fixed-size representation (e.g., a vector) by processing the IP address via a personal identifiable information (PII) encoder (e.g., an encoder 114 shown in FIG. 1 and described herein). The representation service 111 can perform encoding according to one or more systems and processes described in U.S. patent application Ser. No. 17/719,975, filed Apr. 13, 2022, entitled "PERSONAL IDENTIFIABLE INFORMATION ENCODER," which claims the benefit of and priority to U.S. application Ser. No. 63/174,405, filed Apr. 13, 2021, entitled "PERSONALLY IDENTIFIABLE INFORMATION ENCODER," the disclosures of which are incorporated by reference in their entireties.

At step 2105, the process 2100A includes obtaining a fixed-size representation of the MAC address of the device (e.g., or a different device, in instances of multi-device representation generation). In some embodiments, the computing environment 101 obtains the fixed-size representation similar to steps 2102-2104. For example, the computing environment 101 can collect the MAC address of the device and the encoder 114 can encode the MAC address into a fixed-size representation.

At step 2106, the process 2100A includes generating a privacy-secured token 2107 based on the fixed-size representations of the IP address and the MAC address. Step 2106 can be performed similar to other tokenization steps and operations shown and described herein, such as, for example, step 224 of the process 200 shown in FIG. 2 or the blending process 300 shown in FIG. 3. In one or more embodiments, the representation service 111 stores the privacy-secured token 2107 in one or more registries 105. In some embodiments, the representation service 111 generates scannable media including the privacy-secured token and metadata (e.g., auxiliary data, error-correcting codes, etc.) and transmits the scannable media to the device of step 2101.

According to one embodiment, the operations of the process 2100B are performed similar to the steps of the process 2100A. In various embodiments, in the process 2100B, the computing environment 101 generates a privacy-secured token 2711 based on a device's IP address and a random fixed-size representation generated based on a pseudorandomly generated seed or other secret data (e.g., a key phrase, code, etc.). In one or more embodiments, the computing environment 101 can receive the secret data from the computing device 102 or generate the secret data (e.g., a seed value or phrase) via a pseudorandom seed generator.

Figure 22A:
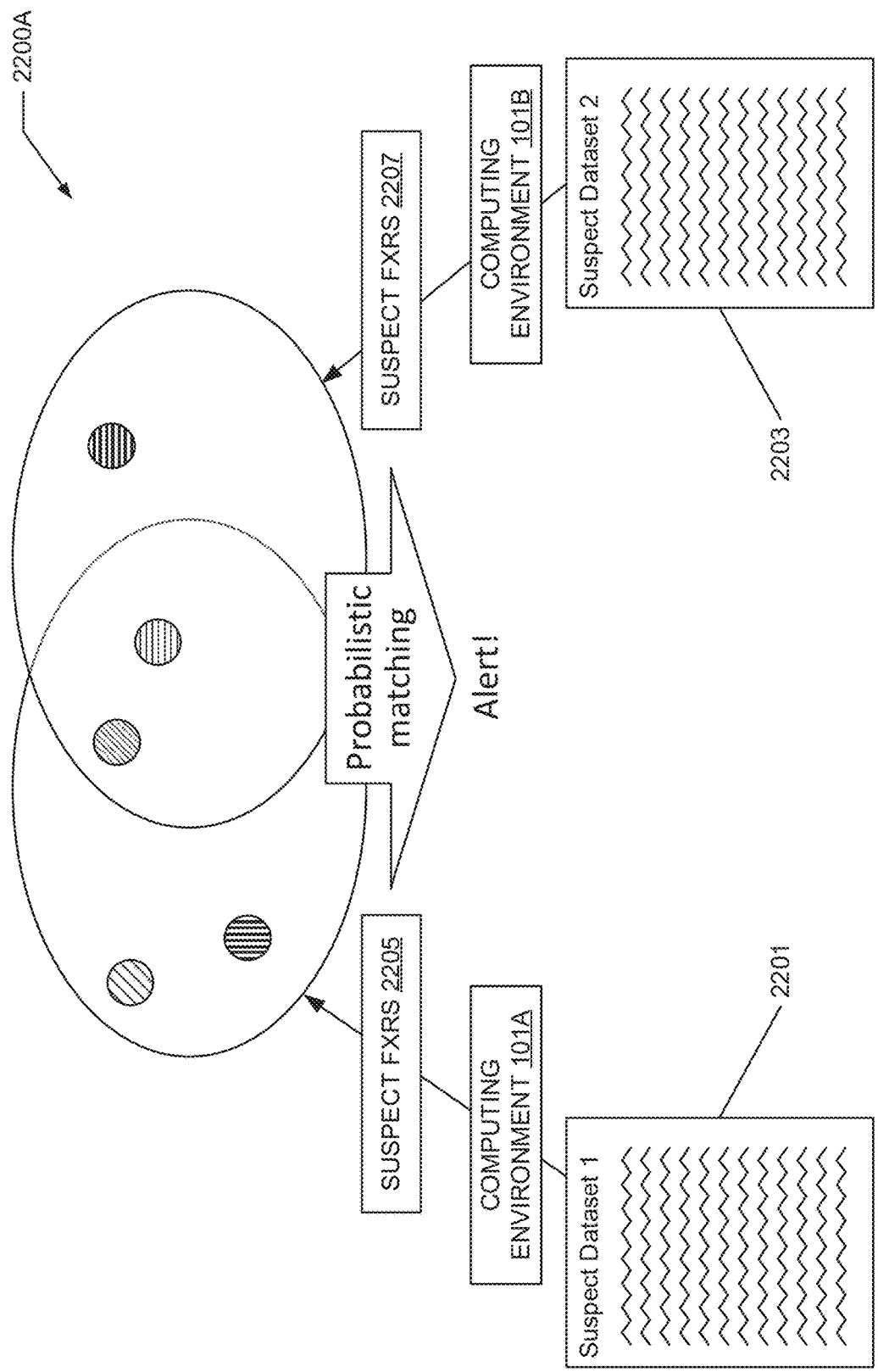
FIG. 22A shows an exemplary multifactor threat detection workflow, according to one embodiment of the present disclosure.

FIG. 22A shows an exemplary multifactor threat detection workflow 2200A that can be performed by one or more embodiments of the present system, such as the computing environment 101 (see also FIG. 1). In various embodiments, the system may utilize fixed-size representations and/or privacy-secured tokens to identify potentially malicious actors, including potentially malicious electronic devices. In at least one embodiment, the system can generate fixed-size representations of particular data associated with known or potential attacker devices. In one or more embodiments, an attacker device may include a computing device that has been, or is suspected to have been, used in perpetration of a digital attack (e.g., also referenced herein as a data attack). In at least one embodiment, an attacker device may be represented as a device profile that includes any device-identifying or other device-associated information (e.g., see below examples of particular data). A digital attack may include any attack against an electronic device, system, network, process, service, user account, or combinations thereof. A digital attack can include any intentional or unintentional attempt to gain unauthorized access to a computer, computing system, computer network, or storage media. Non-limiting examples of digital attacks include digital impersonation, replay attack, reconstruction attack, reversal attack, zero-valued attack, denial-of-service (DOS), man-in-the-middle (MITM), phishing, whale-phishing, spear-phishing, ransomware, password attack, structured query language (SQL) injection, uniform resource locator (URL) interpretation, domain name system (DNS) spoofing, session hijacking, brute force attack, and cross-site scripting (XSS).

Non-limiting examples of the particular data include device class (e.g., tablet, smartphone, laptop, media player, Internet of Things (IoT) endpoint, IoT enabler, IoT controller, set top box, television, etc.), network identifier(s), device identifier(s), model number, device serial number, Subscriber Identity Module (SIM) number, build serial number, USB serial number, telephone number, International Mobile Equipment Identity (IMEI) number, Mobile Equipment identifier (MEID) number, electronic serial number (ESN), and international mobile subscriber identity (IMSI) number. Other non-limiting examples of the particular data include media access control (MAC) address, Bluetooth address, internet protocol (IP) address, subnet, subnet mask, device language, device display dimensions, device display resolution, and display color depth. Further non-limiting examples of the particular data include device location, geolocation hardware and/or software, chipset information (e.g., vendor, chipset name, model), central processing unit (CPU) information (e.g., CPU name, number of cores, etc.), graphical processing unit (GPU) information (e.g., name, vendor, etc.), number of SIM slots, number of reprogrammable SIMs supported, supportable SIM card size, internal storage capacity, and supported architecture (e.g., 32-bit, 64-bit, etc.). Additional non-limiting examples of the particular data include near field communication (NFC) hardware data, camera type and settings (e.g., resolution, brightness, image mode, etc.), firmware version, location, network, time of authentication action attempt(s), username, email, password, domain name system (DNS) request data (e.g., header data, question data, flags, and metadata), operating system (OS) type, OS version, OS family, OS name, OS distribution, application version, cookies and other cached data, referring site data, flash version, Javascript support, screen color processing ability, scroll depth, document and/or other file downloads, and input data and patterns (e.g., keystroke, cursor movement, audio inputs, accelerometer data, biometric data, etc.). Still further non-limiting examples of the particular data include developer platform name, developer platform version, web browser data (e.g., vendor, name, version, rendering engine, usable display dimensions, cookie data, cookie settings, memory limitations, supported Java functions, supported HTML functions, etc.).

The particular data can include, but is not limited to, network connection capabilities of a computing device, such as, for example, high-speed circuit switched data (HSCSD) capability, general packet radio service (GPRS) capability, enhanced data rates for GSM evolution (EDGE) capability, high-speed down downlink packet access (HSDPA) capability, universal mobile telecommunications system (UMTS) capability, long-term evolution (LTE) capability, chipset maximum uplink and downlink speeds, WiFi capability, rich communication service (RCS) capability, voice over cellular capability, 2-5G network capabilities, and video streaming capabilities and settings. The particular data can include, but is not limited to, audio-related properties of the computing device, such as, for example, MIDI monophonic and/or polyphonic capabilities, MP3 support, adaptive multi-rate (AMR) file support, and .wav file support.

In various embodiments, the computing environment 101A, 101B (e.g., see also computing environment 101 shown in FIG. 1 and described herein) can receive a first suspect dataset 2201 and a second suspect dataset 2203. In one or more embodiments, the first and second suspect datasets 2201, 2203 include particular data associated with historical attacker devices and attempts. In some embodiments, the computing environment 101A receives the first and/or second suspect datasets 2201, 2203 from one or more external services, such as, for example, one or more third-party security services. In at least one embodiment, the computing environment 101A receives particular data associated with one or more suspected attacker devices and events and processes the particular data to generate the first suspect dataset 2201 or second suspect dataset 2203. In various embodiments, in response to a failure to authenticate a probe subject or probe device, the computing environment 101 automatically records the particular data associated with the failed authentication and updates the first or second suspect datasets 2201, 2203 to include the particular data. In some embodiments, the first suspect dataset 2201 includes particular data associated with a probe attacker device (e.g., a device associated with a potential attacker or an unrecognized attacker) and the second suspect dataset 2203 includes particular data associated with one or more template attacker devices (e.g., a device associated with a known attacker).

In one or more embodiments, the computing environment 101A, 101B generates one or more suspect fixed-size representations (FXRs) 2205 and one or more suspect FXRs 2207 based on the first suspect dataset 2201 and the second suspect dataset 2203, respectively. The computing environment 101A, 101B can generates the suspect FXRs 2201, 2203 according to processes shown and described herein. The computing environment 101A can generate the suspect FXRs 2201, 2203 as multimodal and/or multifactor FXRs according to processes shown and described herein. For example, the computing environment 101A can generate a multifactor suspect FXR 2205 based on an entry of the suspect dataset 2201 including an IP address and a MAC address. In another example, the computing environment 101B can generate a multifactor suspect FXR 2207 based on an entry of the suspect dataset 2203 including a device's operating system type and version, a location of the device, and an IP address. In some embodiments, the computing environment 101A, 101B further transforms the suspect FXRs 2205, 2207 into privacy-secured tokens as shown and described herein. In various embodiments, the computing environment 101A, 101B processes a plurality of historical attack data-derived FXRs (e.g., or privacy secured tokens) via one or more clustering algorithms to generate one or more historical attack clusters.

In various embodiments, the computing environment 101A, 101B performs one-to-many comparisons between suspect FXRs 2205 and suspect FXRs 2207 to generate one or more similarity scores. In at least one embodiment, the computing environment 101A, 101B compares the similarity score to a predetermined threshold. In one or more embodiments, in response to the similarity score satisfying the predetermined threshold, the computing environment 101A, 101B positively identifies the corresponding suspect FXR 2205 being associated with a potential attacker device. In some embodiments, the computing environment 101A, 101B compares suspect FXRs to one or more historical attack clusters (e.g., by computing a similarity metric between the FXR and a centroid of the historical attack cluster).

According to one embodiment, in response to positively identifying a potential attacker device, the computing environment 101A, 101B performs one or more appropriate actions, such as transmitting an alert to one or more user accounts or external systems. In at least one embodiment, the computing environment 101A, 101B identifies a user account or system that the potential attacker device attempted to access. In various embodiments, the computing environment 101A, 101B transmits an alert to the user account, enforces a re-enrollment of the subject and/or device associated with the user account, or initiates additional security settings for the user account (e.g., multifactor authentication, one-time password authentication, etc.). In some embodiments, in response to matching a suspect FXR 2205 to a subject FXR 2207, the computing environment 101A, 101B updates the suspect dataset 2203 to include the entry of the suspect dataset 2201 associated with the matched suspect FXR 2205. In at least one embodiment, the computing environment 101A, 101B stores the matched suspect FXR 2205 as an additional suspect FXR 2207 (e.g., as a mated sample of the matched suspect FXR 2207). In one or more embodiments, the computing environment 101A, 101B performs the workflow 2200 on one or more databases of historical attacker and/or potential attacker data (e.g., for purposes of deduplication and improved attacker recognition).

Figure 22B:
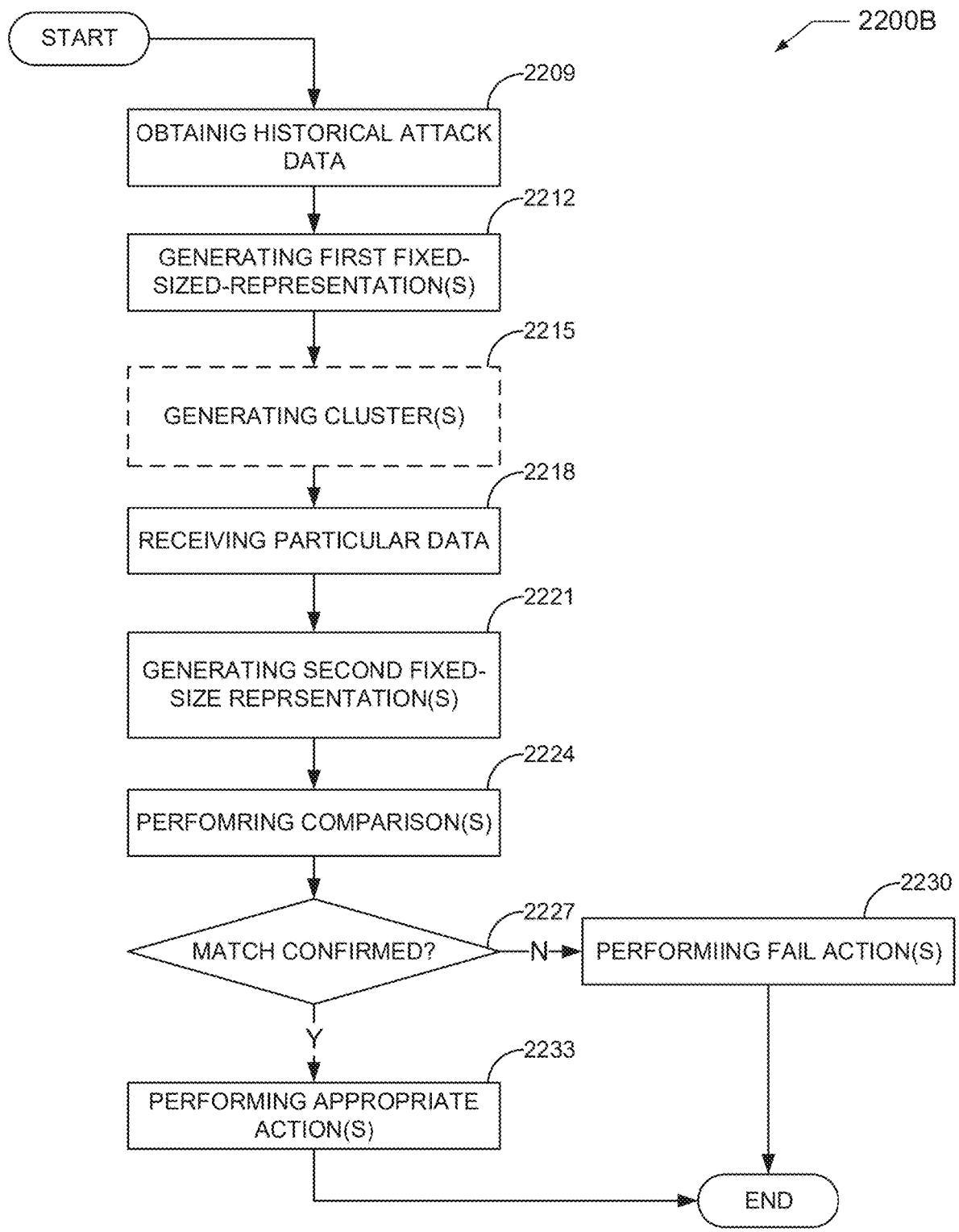
FIG. 22B shows an exemplary attack identification process, according to one embodiment of the present disclosure.

FIG. 22B shows an exemplary attack identification process 2200B. The process 2200B may be performed by one or more embodiments of the present systems, such as the computing environment 101 shown in FIG. 1 and described herein. In various embodiments, the computing environment 101 may perform the process 2200B to process and compare anomalous digital activity to historical attack-related digital activity and, thereby, positively identify the anomalous digital activity as being associated with an attack. In one or more embodiments, the computing environment 101 may perform the process 2200B may perform the process 2200B to positively identify digital activity as being associated with an attack and generate one or more device profiles by which an attack and/or attacker may be recognized and expelled.

In an exemplary scenario, an external platform receives a request from a computing device and request includes particular data, such as a MAC address, an IPV4 address, and an indication of a requested action and/or requested data. The external platform transmits the request to the computing environment 101. The computing environment 101 encodes the particular data into a first fixed-size representation. The computing environment 101 retrieves one or more second fixed-size representations associated with historical digital activities associated with one or more digital attacks. The computing environment 101 compares the first fixed-size representation to the one or more second fixed-size representations. Based on the comparison, the computing environment 101 determines that the first fixed-size representation demonstrates a threshold-satisfying similarity to at least one of the one or more second fixed-size representations. In response, the computing environment 101 positively identifies the request as being associated with a suspected digital attack and transmits an alert to the external service (e.g., the alert causing the external service to perform one or more actions, such as denying the request, disabling a user account associated with the request, alerting additional security services, etc.).

At step 2209, the process 2200B includes obtaining data associated with historical digital attacks. In one or more embodiments, the computing environment 101 retrieves the historical attack data from one or more data stores, such as the data store 103. In at least one embodiment, the computing environment 101 retrieves the historical attack data from memory 108 of one or more computing devices 102. The historical attack data may include any data or metadata associated with a digital attack (e.g., including examples of digital attacks and particular data shown and described herein). In some embodiments, the historical attack data may be referred to as "first data." In one or more embodiments, the historical attack data includes one or more entries associated with historical digital attacks. In at least one embodiment, the historical attack data includes a plurality of entries individually associated with a different historical attack event. In various embodiments the historical attack data includes entries associated with different data types. For example, the historical attack data includes a first entry associated with a first data type and a second entry associated with a second data type. In this example, the first data type may be MAC address and the second data type may be IP address. In another example, the first data type may be operating system and the second data type may be Bluetooth address. In another example, the first data type is device class (e.g., mainframe computer, mobile computing device, personal computer, etc.) and the second data type is domain name system (DNS) request data. In various embodiments, the number of data types may include any suitable number of data types (e.g., 2, 3, 6, or any suitable number of data types), including combinations of data types.

In various embodiments, the data store 103 includes one or more databases of historical attack data. In at least one embodiment, the one or more databases of historical attack data may be segregated based on one or more categories, such as attack type, attack target (e.g., particular entity, particular class or type of entity, particular touchpoint, particular endpoint, etc.), attack vector (e.g., account spoofing, malware, ransomware, third-party vendors, weak encryption, etc.), attack date, attack request, target location, or attacker location. In one or more embodiments, the computing environment 101 retrieves the historical attack data based on an entity for which the process 2200B is performed. As one example, for an entity associated with healthcare information technology, the computing environment 101 retrieves attack data associated with historical digital attacks and healthcare information systems and services. As another example, for an entity associated with education, the computing environment 101 retrieves attack data associated with historical digital attacks against educational institutions (e.g., universities, school districts, etc.). As another example, for an entity associated with energy or other utilities, the computing environment 101 retrieves attack data associated with historical digital attacks against energy and utility companies.

In various embodiments, the computing environment 101 receives historical attack data from one or more external services, libraries, or systems. For example, the computing environment 101 receives historical attack data from a client database. In this example, the client database includes data related to previous digital attacks against the client, such as, for example, an IP address and a MAC address of an attacker device. In another example, the computing environment 101 retrieves historical attack data from one or more public databases, such as the Center for International and Security Studies at Maryland (CISSM) Cyber Events Database or the Council on Foreign Relations Cyber Operations Tracker.

At step 2212, the process 2200B includes generating one or more first fixed-size representations (FXRs) based on the data obtained at step 2209. The representation service 111 and/or the encoding service 113 can generate the first FXR according to one or more embodiments shown and described herein and/or as shown and described in one or more disclosures incorporated by reference herein. In various embodiments, the encoding service 113 encodes the historical attack data into one or more FXRs via an encoder 114. In one example, the historical attack data includes a plurality of entries that are each associated with a different historical attack. In this example, the encoding service 113 encodes each of the plurality of entries into a respective FXR. In another example, the historical attack data includes a first entry of a first data type and a second entry of a second data type. Continuing this example, the encoding service 113 encodes each of the first entry and the second entry into a respective first FXR. In one or more embodiments, the representation service 111 generates a multimodal or multifactor FXR by blending one or more first FXRs. The blending can be performed according to one or more embodiments described herein. For example, the representation service 111 performs a multifactor representation process 2100A (see FIG. 21) to generate a multifactor FXR based on a MAC address-derived FXR and an IP address-derived FXR.

In some embodiments, the data store 103 includes one or more registries 105 that include FXRs associated with historical attacker data. The computing environment 101 may retrieve the historical attack data-derived FXRs from the registry 105 for comparison purposes at step 2224. In at least one embodiment, the process 2200B includes generating one or more FXRs from historical attack data and retrieving one or more additional FXRs previously generated from historical attack data (e.g., and having been stored in one or more data bases). In some embodiments, the process 2200B omits step 2217 and, instead, the first FXR(s) are retrieved from one or more data stores.

In at least one embodiment, the representation service 111 transforms the first FXR(s) into one or more anonymized vector representations, such as a privacy-secured token. It will be understood and appreciated that the proceeding steps of the process 2200B may be performed using anonymized vector representations, such as privacy-secured tokens shown and described herein.

At step 2215, the process 2200B may include generating one or more clusters based on the one or more first FXRs of step 2212. In various embodiments, the representation service 111 applies one or more clustering algorithms or techniques to a plurality of first FXRs to generate a historical attack data-derived cluster. Non-limiting examples of clustering algorithms and techniques include centroid-based clustering, density-based clustering, distribution-based clustering, hierarchical clustering, fuzzy clustering, and constraint-based clustering. In some embodiments, the computing environment 101 retrieves one or more historical attack data-derived clusters from the data store 103.

In an exemplary scenario, the historical attack data includes a plurality of entries individually associated with a different historical attack. The encoding service 113 encodes the plurality of entries into a respective plurality of FXRs. The representation service 111 generates a respective plurality of anonymized vector representations based on the plurality of FXRs. The representation service 111 applies a clustering algorithm to generate at least one cluster based on the plurality of anonymized vector representations.

At step 2218, the process 2200B includes receiving particular data (e.g., as described herein). The particular data may be related to suspected attacker activities, events, and/or computing devices. The particular data may include network activity occurring across one or more networks, within a computing device, or between one or more computing devices (e.g., the process 2200B may be implemented to monitor all digital activities across one or more systems and alert as to attack activities occurring therein). In at least one embodiment, the computing environment 101 receives the particular data from a computing device 203. In one or more embodiments, the computing environment 101 receives the particular data from an external service, system, or platform. For example, the computing environment 101 may receive the particular data from a healthcare information management service. As another example, the computing environment 101 may receive the particular data from a university server. In another example, the computing environment 101 may receive the particular data from a social media platform.

In various embodiments, the computing environment 101 receives a request originating from a computing device. In at least one embodiment, the computing environment 101 processes the request to obtain the particular data. For example, a server of an electric utility receives an access request from a computing device (e.g., a computing device potentially associated with an attacker or attack event).

Continuing the example, the computing environment 101 receives the access request from the server and processes the access request to extract the particular data therefrom (e.g., including, for example, an IP address of the computing device, a location of the computing device, and an indication of the level of access, information, and/or or actions being requested). In at least one embodiment, the request is associated with a user account (e.g., a target of an attacker or means by which an attack may be conducted). For example, the request may include an identifier such that, upon processing the request, the computing environment 101 may extract the identifier and identify a corresponding user account.

At step 2221, the process 2200B includes generating one or more second FXRs based on the particular data. The representation service 111 and/or the encoding service 113 can perform step 2221 similar to step 2212, including generating one or more multifactor and/or multimodal second FXRs. In one example, the particular data includes a first entry of a first data type and a second entry of a second data type. Continuing this example, the encoding service 113 encodes each of the first entry and the second entry into a respective second FXR. In one or more embodiments, the representation service 111 generates a multimodal or multifactor FXR by blending one or more second FXRs.

At step 2224, the process 2200B includes performing one or more comparisons of the second FXR(s) to one or more first FXRs or clusters. In various embodiments, performing the comparison includes the comparison service 115 comparing the second FXR(s) of step 2221 to the first FXR(s) of step 2212 and/or the cluster(s) of step 2215. In one embodiments, the comparison service 115 performs one or more comparison processes between the first FXR (e.g., derived from historical attacker data) and the second FXR (e.g., derived from particular data that may or may not be associated with a digital attack or attacker). The comparison service 115 can perform the comparison process according to one embodiments described herein. In at least one embodiment, the comparison service 115 generates a similarity score based on the comparison, such as, for example, a Euclidean distance, squared Euclidean distance, $L^2$ norm, or cosine similarity. Other examples of the similarity score include, but are not limited to, Hamming distance, Minkowski distance, Jaccard distance, edit distance, Mahalanobis distance, Kullback-Leibler divergence, mutual information and entropy score, Pearson correlation distance, Spearman correlation distance, and Kendall correlation distance. In at least one embodiment, the similarity score may be a fusion-based similarity score as shown and described herein.

At step 2227, the process 2200B includes determining if the second FXR matches the first FXR and/or a historical attack data-derived cluster. In various embodiments, the comparison service 115 determines a match based on whether the second FXR demonstrates a threshold-satisfying similarity to the first FXR. In one or more embodiments, the comparison service 115 compares a similarity score to one or more predetermined similarity thresholds. For example, the comparison service 115 determines whether a Euclidean distance or cosine similarity metric between the first FXR and the second FXR meets a predetermined threshold.

In response to a failure to match the second FXR to the first FXR (e.g., or a cluster), the process 2200B may proceed to step 2230. In response to matching the second FXR to the first FXR (e.g., or a cluster), the process 2200B may proceed to step 2233.

At step 2227, the process 2200B includes performing one or more appropriate "fail" actions in response to the failure to match the fixed-size representation of the particular data to the one or more fixed-size representations associated with historical attack activity. Non-limiting examples of fail actions include transmitting signals to computing devices 203, external systems, services, or platforms, approving a request associated with the particular data, generating a privacy-secured token of the particular data, and further analyzing the particular data or request associated therewith. In one or more embodiments, the computing environment 101 transmits, to a source from which the particular data was received or generated, an indication that the particular data did not match historical attack data. In one example, the computing environment 101 receives the particular data from a social media platform. In this example, in response to determining the FXR of the particular data fails to match the FXR of historical attack data, the computing environment 101 transmits a notification to the social media platform. Continuing the example, the notification may cause the social media platform to approve a request with which the particular data is associated.

In at least one embodiment, the computing environment 101 generates a device profile based on the particular data. The device profile may be representative of a computing device 203 with which the particular data is associated. For example, the device profile may be representative of a computing device 203 from which a request was received (e.g., the particular data having been derived from the request). In various embodiments, the computing environment 101 updates a whitelist to include the device profile or a privacy-secured token that is representative of the device profile. In one or more embodiments, the computing environment 101 provides a computing device 203 access to one or more physical or digital environments (e.g., or causes an external system, service, or platform to grant said access). As one example, the computing environment 101 may cause an external platform to permit, on behalf of a computing device 203 and/or user account, a login action.

At step 2233, the process 2200B includes performing one or more appropriate actions in response to matching the fixed-size representation of the particular data to the one or more fixed-size representations associated with historical attack activity. Non-limiting examples of appropriate actions include positively identifying the particular data as being associated with an attacker, positively identifying a computing device and/or user account associated with the particular data as an attacker, transmitting an alert, updating the historical attack data to include the particular data, identifying a target associated with the particular data, preventing or denying a request associated with the particular data, locking a physical and/or digital environment, locking a user account, and generating a device profile of a computing device with which the particular data is associated.

In one or more embodiments, in response to the comparison service 115 determining a match between the second FXR and the first FXR (or cluster), the computing environment 101 positively identifies the particular data as being associated with an attack. In at least one embodiment, the computing environment 101 positively identifies a computing device associated with the particular data as an attacker device. In various embodiments, the computing environment 101 transmits an alert to an entity from which the particular data was received and/or with which a request is associated. For example, the particular data may have been received from a university server. In this example, in response to positively identifying the particular data as being associated with an attack, the computing environment 101 transmits an alert to the university server (e.g., which may cause the university server to deny a request associated with the particular data, update a blacklist to include an associated computing device, lock a user account or network, etc.). In one or more embodiments, the computing environment 101 identifies an attack target based on the particular data and/or a request associated therewith. In various embodiments, the computing environment 101 transmits an alert to a computing device 203 with which the user account is associated. In at least one embodiment, the computing environment 101 causes the user account to transition to a locked state, initiate a credential change, or enter an enhanced security state (e.g., which may include dual-authentication or other access measures providing additional security).

In various embodiments, the computing environment 101 generates a device profile of the attacker device based on the particular data. In one or more embodiments, the computing environment 101 transmits the device profile to an entity from which the particular data was received. For example, the computing environment 101 receives the particular data from a health insurance company and positively identifies the particular data as being associated with an attack. Continuing the example, the computing environment 101 generates a device profile based on the particular data and transmit the device profile to the health insurance company. In one or more embodiments, the computing environment 101 stores the particular data, one or more associated FXR(s), one or more associated anonymized vector representation(s), and/or an associated device profile at the data store 103.

In at least one embodiment, the computing environment 101 stores the first FXR(s) and the matched second FXR(s) in one or more registries 105. In various embodiments, the computing environment 101 generates a new cluster based on the first FXR(s) and the matched second FXR(s). In some embodiments, the computing environment 101 determines that a first subset of the particular data is associated with an attack and a second subset of the particular data is unassociated with the attack. In one or more embodiments, the computing environment 101 transmits, to an entity associated with the particular data, an indication of the delineation in attack association within the subsets of the particular data.

In one example, the computing environment 101 receives, from an entity, particular data including a plurality of IP address, MAC address pairs. Continuing the example, the computing environment positively identifies a subset of the IP address, MAC address pairs as being associated with historical attack data. In the same example, the computing environment 101 transmits, to the entity, an indication of the attack-associated subset of the pairs and/or an indication of a non-attack associated subset of the pairs.

Figure 23:
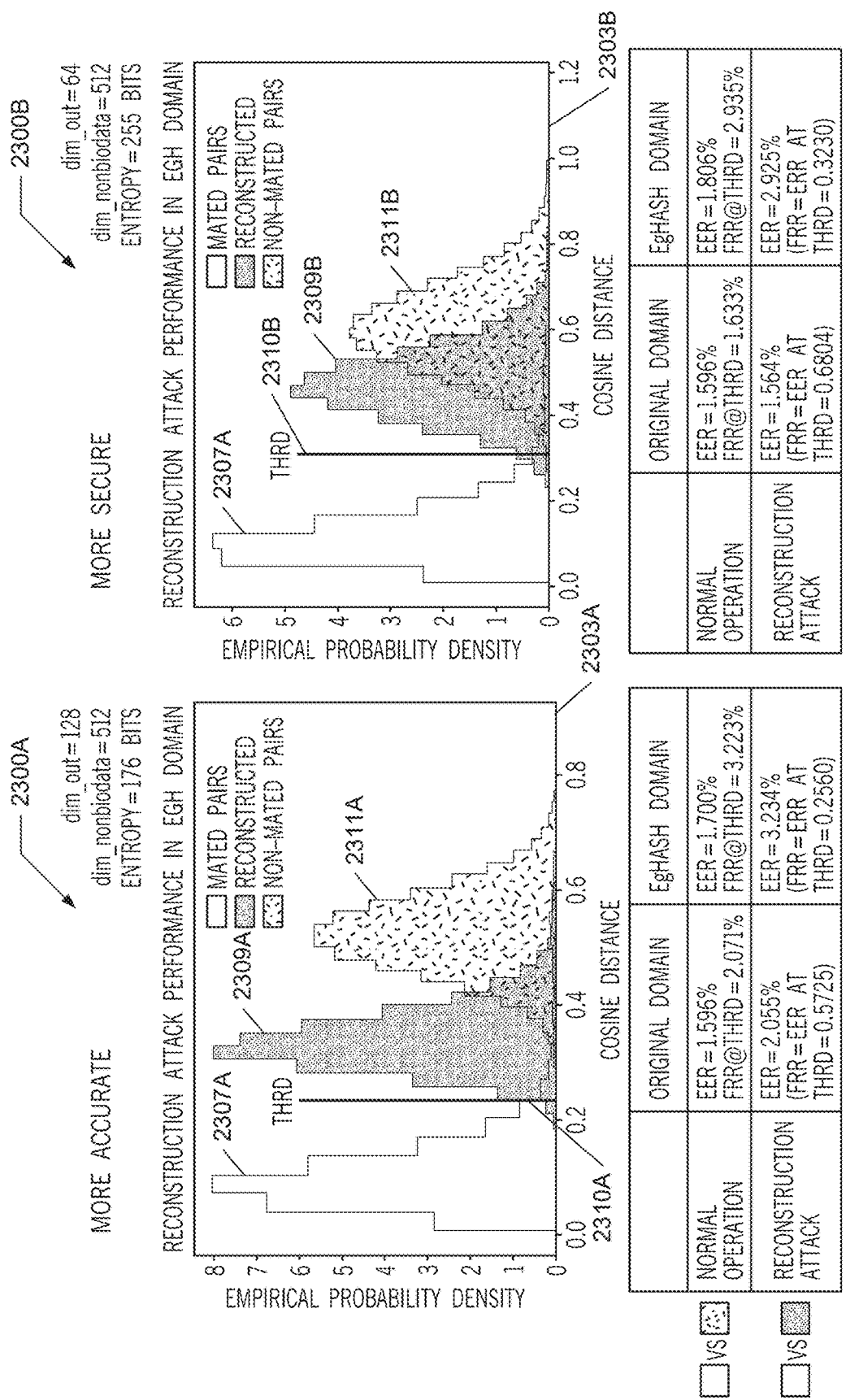
FIG. 23 shows charts of exemplary matching performance and attack mitigation schemas, according to one embodiment of the present disclosure.

FIG. 23 shows charts 2300A, 2300B of exemplary matching performance and attack mitigation schemas. In various embodiments, the charts 2300A, 2300B demonstrate the ability of the present multifactor, multimodal representation processes to a) adequately support one-to-one verification and one-to-many identification, and b) defend against reconstruction attacks. In one or more embodiments, the FXRs represented in the charts 2300A, 2300B are 128 dimensions and 64 dimensions in length, respectively, and were generated from a pool of 512 subjects whose biometric features were encoded into 512-dimension length FXRs and further blended with non-biodata of 512-dimensions (e.g., the blending producing a final FXR of length 128-dimensions and 64 dimensions, respectively). In at least one embodiment, the charts 2300A, 2300B demonstrate an inverse relationship between output dimension of the FXR and entropy (e.g., the smaller the output dimension of the FXR, the larger the entropy increase in reconstruction entropy, and, thus, the greater the difficulty to reconstruct the input biodata and/or non-bio data). For example, the 128-dimension output FXRs of the chart 2300A are associated with a first level of entropy, 176 bits, and the 64-dimension output FXRs of the chart 2300B are associated with a second, greater level of entropy, 255 bits.

In various embodiments, a magnitude of entropy (measured in bits) in the output FXR is based on the output dimension of the FXR (e.g., or token derived therefrom). In one or more embodiments, entropy measures how much compute effort an attacker is required to guess or reconstruct an original sample from which the FXR was derived. In at least one embodiment, the smaller the output dimension of the token, the greater the loss of information from the original sample. In various embodiments, the greater the loss of information from the original sample, the greater the compute time an attacker must spend to recover the information that has been lost due to the token generation process. In one or more embodiments, the blending of non-biodata with input biodata increases security by further increasing entropy. In at least one embodiment, the blending of non-biodata increases an attacker's compute time by requiring to spend compute time separating the non-biodata from the biodata when trying to reconstruct the original data. In other words, in various embodiment, the introduction of non-biodata increases the difficulty for an attacker to reconstruct the original biometric sample; therefore, the non-biodata can increase security of FXRs and tokens derived therefrom.

In various embodiments, the biometric features from which the experimental FXRs were generated include facial features of the subjects. In at least one embodiment, the facial features were encoded into fixed-size representations via one or more techniques based in additive angular margin loss. According to one embodiment, the charts 2300A, 2300B and charts 2400A, 2400B (see FIG. 24) are based on 3,232 facial samples encoded from the 512 subjects. In various embodiments, the charts 2300A, 2300B represent 9,639 mated similarity scores and 5,211,928 non-mated similarity scores. In one or more embodiments, as shown in FIGS. 23-24, lower values of equal error rate (EER), false acceptance rate (FAR), and false rejection rate (FRR) indicate improved matching performance.

In one or more embodiments, the charts 2300A, 2300B include mated distributions 2307A, 2307B, reconstruction distributions 2309A, 2309B, and non-mated distributions 2311A, 2311B. In various embodiments, the charts 2300A, 2300B include similarity metrics 2303A, 2303B (e.g., cosine similarity) that indicate a level of similarity determined via one-to-many comparisons of mated, non-mated, and reconstructed samples. According to one embodiment, to simulate reconstruction attacks, the reconstruction distributions 2309A, 2309B are derived from comparisons of enrollment samples to simulated reconstructions of the enrollment samples (e.g., or of fixed-size representations of the enrollment samples).

In various embodiments, the charts 2300A, 2300B demonstrates that similarity thresholds 2310A, 2310B may be established to differentiate mated pairings from both non-mated pairings and reconstruction-based pairings, thereby providing an effective matching solution that is robust to reconstruction attacks. For example, based on the chart 2300A, the present system can establish an effective similarity threshold for FXRs of output size 128 dimensions and whose generation included injection of 512-dimension non-biodata (e.g., salt data or other non-bio secret data) into the original biometric data. In this example, the effective similarity threshold may be established at a cosine distance of 0.256. As another example, based on the chart 2300B, the present system can establish an effective similarity threshold for FXRs of output size 64 dimensions and whose generation included injection of 512-dimension non-biodata into the original biometric data. In this example, the effective similarity threshold for FXRs of 64 dimensions may be established at a cosine distance of 0.323. In various embodiments, the charts 2300A, 2300B and charts 2400A, 2400B (FIG. 24) demonstrate that the present systems can tune a similarity threshold to optimally detect reconstruction attack and reject non-mated pairs simultaneously.

Figure 24:
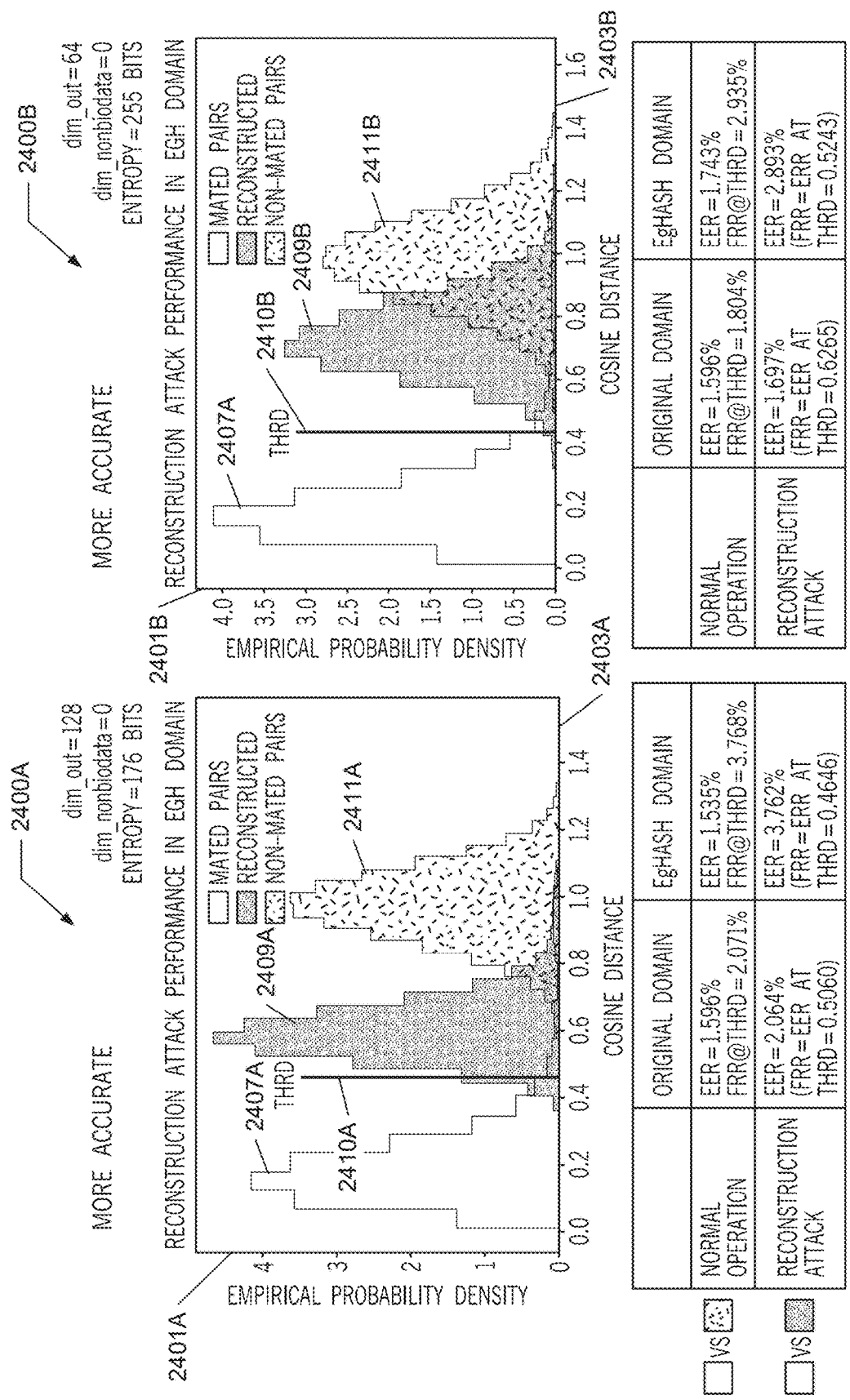
FIG. 24 shows charts of exemplary matching performance and attack mitigation schemas, according to one embodiment of the present disclosure.

FIG. 24 shows charts 2400A, 2400B of exemplary matching performance and attack mitigation schemas. In various embodiments, the charts 2400A, 2400B further demonstrate the ability of the present multifactor, multimodal representation processes to support accurate one-to-one verification and one-to-many identification while securing against reconstruction attacks. In at least one embodiment, the FXRs represented in the chart 2400A were generated from a pool of 512 subjects whose biometric features were encoded into a first set of 512-dimension length FXRs and further transformed, as describe herein, into a second set of 128-dimension length FXRs (e.g., without blending the biometric data with non-biodata). According to one embodiment, the FXRs represented in the chart 2400B were generated from the same pool of 512 subjects whose biometric features were encoded into a first set of 512-dimension length FXRs and further transformed, as describe herein, into a second set of 64-dimension length FXRs. In various embodiments, the charts 2300A, 2300B shown in FIG. 23 and the charts 2400A, 2400B shown in FIG. 24 demonstrate that blending of non-biodata and biodata does not adversely impact matching performance (e.g., the present systems can implement non-biodata a second factor for generating biometric representations to increase security without affecting performance).

In one or more embodiments, the charts 2400A, 2400B include mated distributions 2407A, 2407B, reconstruction distributions 2409A, 2409B, and non-mated distributions 2411A. 2411B. In various embodiments, the charts 2400A, 2400B include similarity metrics 2403A, 2403B (e.g., cosine similarity) that indicate a level of similarity determined via one-to-many comparisons of mated, non-mated, and reconstructed samples.

In various embodiments, the charts 2400A, 2400B demonstrates that similarity thresholds 2410A, 2410B may be established to differentiate mated pairings from both non-mated pairings and reconstruction-based pairings, thereby providing an effective matching solution that is robust to reconstruction attacks. For example, based on the chart 2400A, the system can establish an effective similarity threshold for FXRs of output size 128 dimensions at a cosine distance of 0.4646. As another example, based on the chart 2400B, the present system can establish an effective similarity threshold for FXRs of output size 64 dimensions at a cosine distance of 0.5243.

Figure 25:
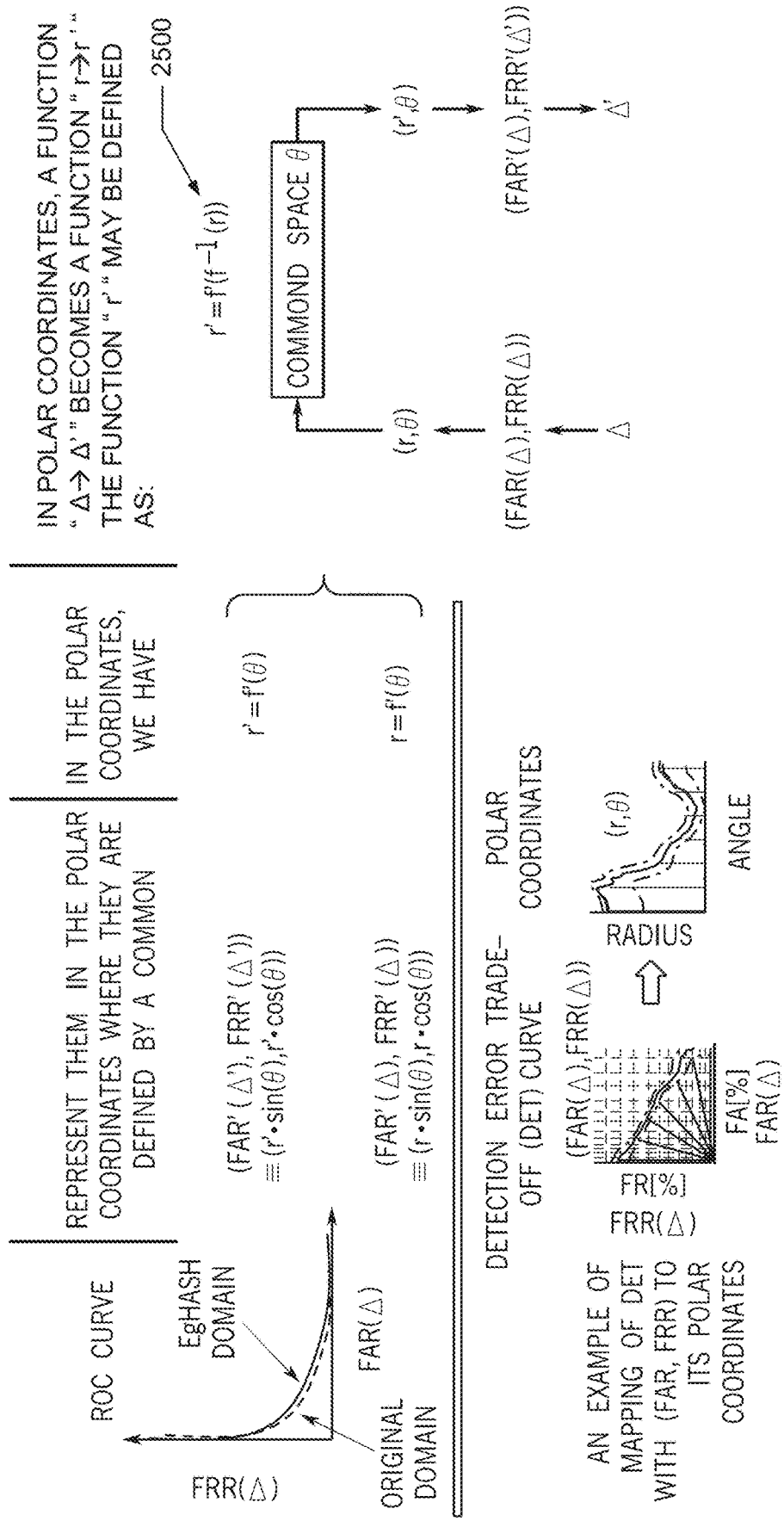
FIG. 25 shows an exemplary threshold mapping function, according to one embodiment of the present disclosure.

FIG. 25 shows an exemplary threshold mapping function 2500. In some embodiments, entropy of simulated reconstructions is computed in the original domain (e.g., the original format in which a representation was encoded, prior to translation to a FXR or privacy-secured token as shown and described herein). The present systems may include an EgHash domain (e.g., a FXR domain) or an (IT) 2 domain (e.g., privacy-secured token domain). To analyze entropy and related metrics (e.g., FRR, FAR, and/or EER) in the EgHash domain and to enable comparisons of performance between the EgHash and original domain, the mapping function 2500 maps operating thresholds (e.g., squared Euclidean distances) from the original domain to the EgHash domain.

Figure 26:
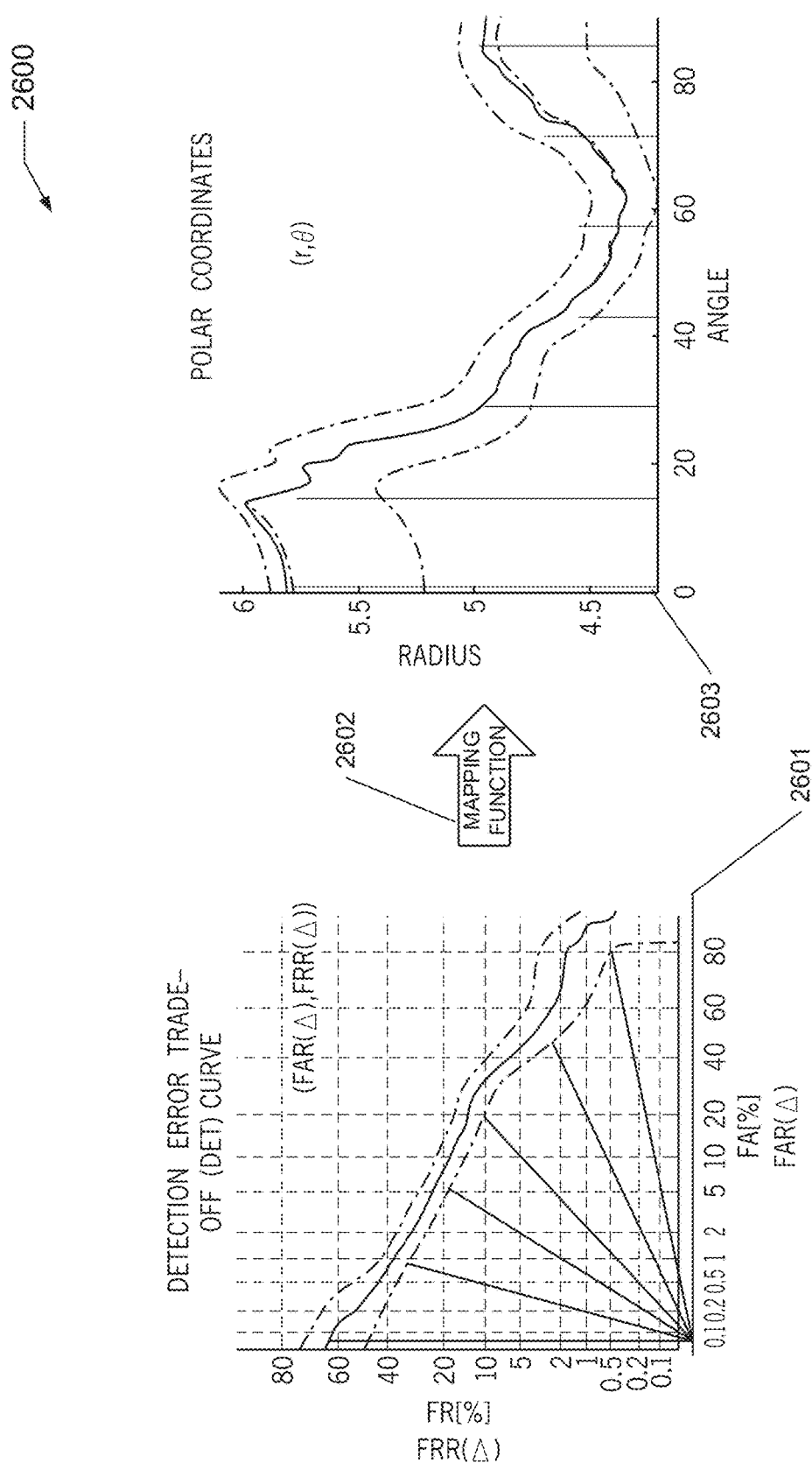
FIG. 26 shows an exemplary threshold mapping sequence, according to one embodiment of the present disclosure.

FIG. 26 shows an exemplary threshold mapping sequence 2600. In one or more embodiments, the system transforms the rectangular-formatted DET-off curve 2601 to a polar-formatted DET-off curve 2603. In various embodiments, via application of a mapping function 2602 (e.g., similar or identical to the mapping function 2650 of FIG. 25), the present system maps rectangular values of a detection error trade-off (DET-off) curve 2601 in the original domain to polar values (e.g., in the FXR domain).

Figure 27:
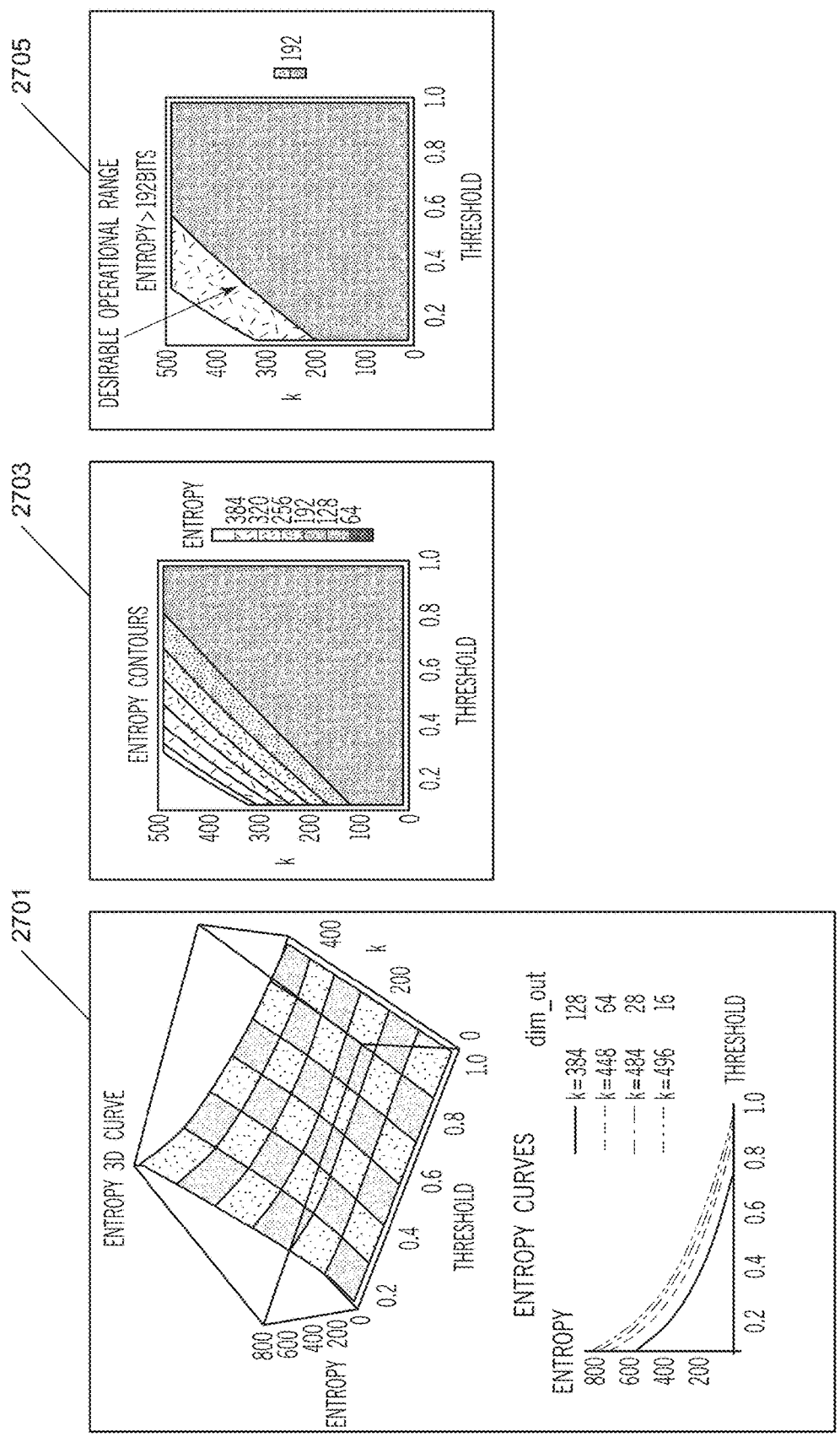
FIG. 27 shows an exemplary threshold optimization schema, according to one embodiment of the present disclosure.

FIG. 27 shows an exemplary threshold optimization schema 2700. In various embodiments, the schema 2700 shows entropy curves 2701 achieved under various FXR dimensional conditions shown and described herein. In one or more embodiments, a chart 2703 shows entropy contours of various dimensional conditions under varying operational thresholds. In at least one embodiment, a chart 2705 demonstrates a potential operating range for configuring similarity thresholds of matching processes shown and described herein.

Figure 28:
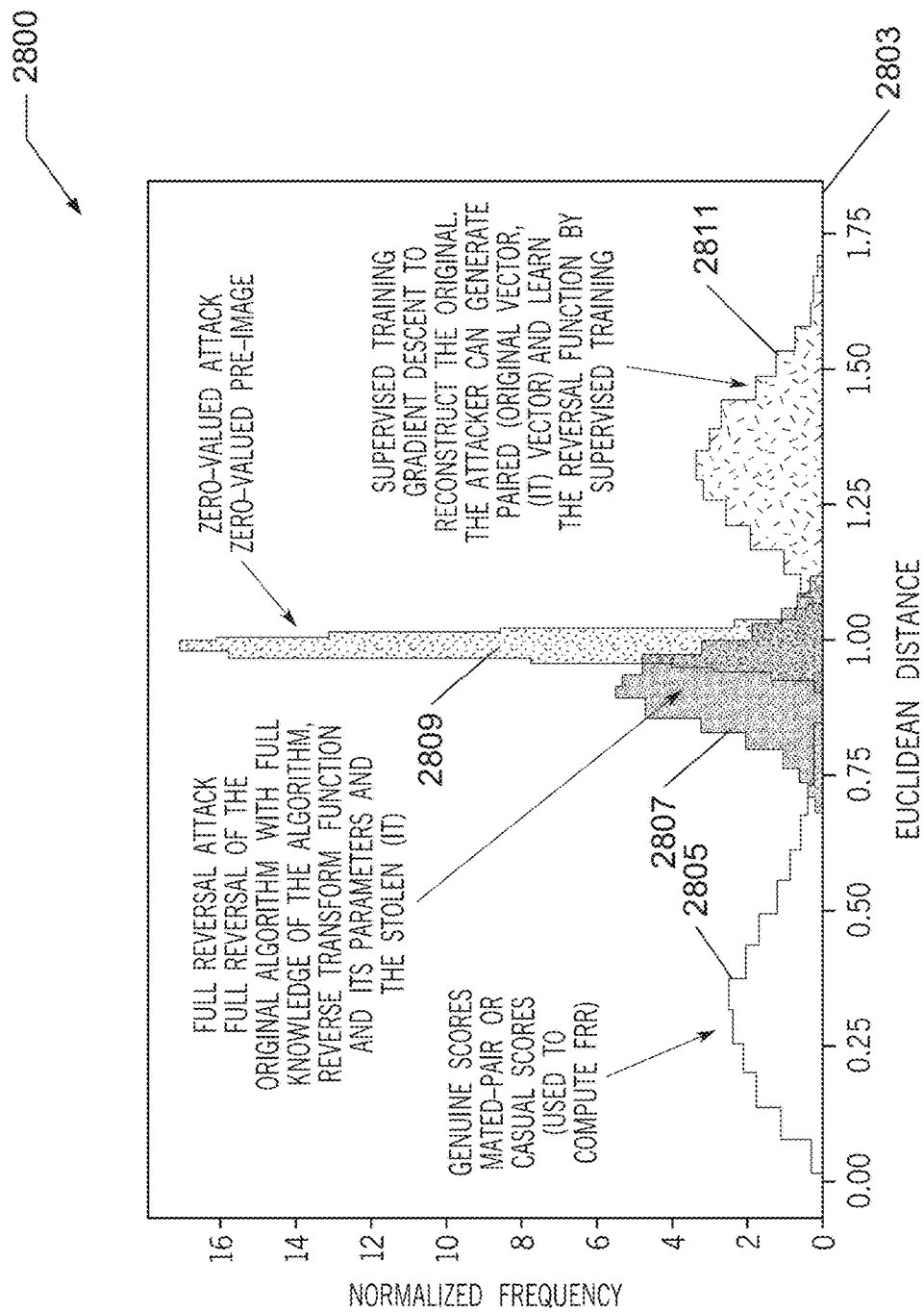
FIG. 28 shows a chart of exemplary matching performance and attack mitigation, according to one embodiment of the present disclosure.

FIG. 28 shows a chart 2800 of exemplary matching performance and attack mitigation. In various embodiments, the chart 2800 includes a genuine distribution 2805 associated with mated-pair similarity scores generated by comparing genuine privacy-secured tokens that were generated as shown and described herein. In one or more embodiments, the chart 2800 includes attack distributions 2807, 2809, 2811 that are each associated with a different attack technique. In at least one embodiment, the attack distribution 2807 is associated with a full reversal attack in which an attacker possesses full knowledge of the algorithm for generating the privacy-secured token, reverse transformation function, and associated parameters. In various embodiments, the attack distribution 2809 is associated with a zero-valued attack including zero-valued pre-images. In one or more embodiments, the attack distribution 2811 is associated with a machine learning-based attack in which an attacker uses a supervised training gradient descent to reconstruct an original sample (e.g., the attacker may generate a sample's vector in the original domain vector and a paired token in the privacy-secured domain and attempt to learn a reversal function by supervised training).

In various embodiments, based on the genuine distribution 2805 and the attack distributions 2807, 2809, 2811, the present systems may implement an effective operating threshold for identifying mated samples and detecting the described attacks simultaneously. In at least one embodiment, an effective threshold may be established at a Euclidean distance value between 0.6-0.7 (e.g., a value of Euclidean distance that excludes the attack distributions and includes a portion of the genuine distribution that is sufficient for enabling accurate and precise matching).

Figure 29:
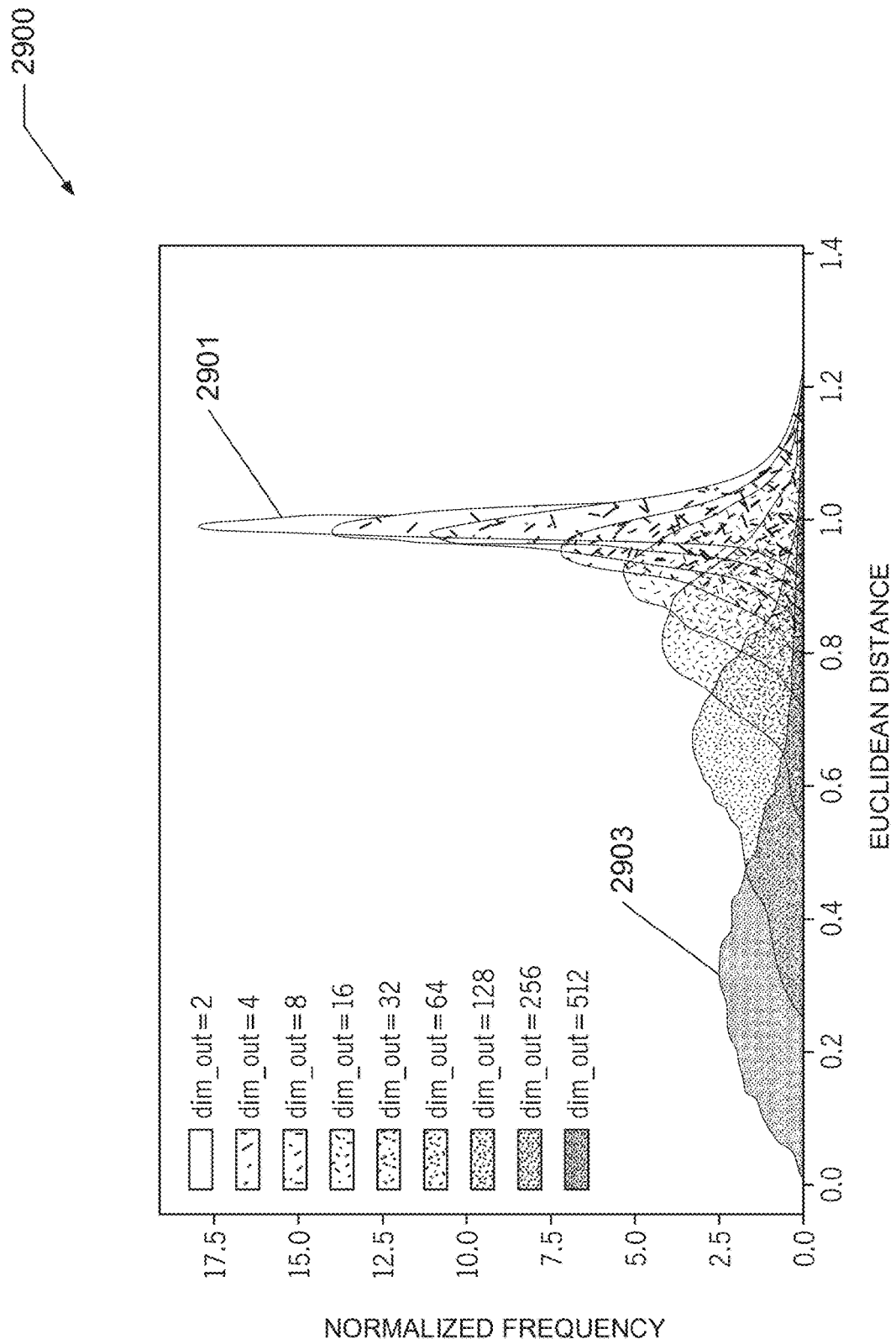
FIG. 29 shows a chart of exemplary matching performance under various dimension parameters, according to one embodiment of the present disclosure.

FIG. 29 shows a chart 2900 of exemplary matching performance under FXR dimension parameters of 2 dimensions, 4 dimensions, 8 dimensions, 16 dimensions, 32 dimensions, 64 dimensions, 128 dimensions, 256 dimensions, and 512 dimensions. In various embodiments, the chart 3000 demonstrates that mated samples remain close, or become even closer, in distance as FXR dimension increases. For example, mated, 512-dimension FXRs represented in distribution 2903 demonstrate a closer distance as compared to mated, 2-dimension FXRs represented in distribution 2901.

Figure 30:
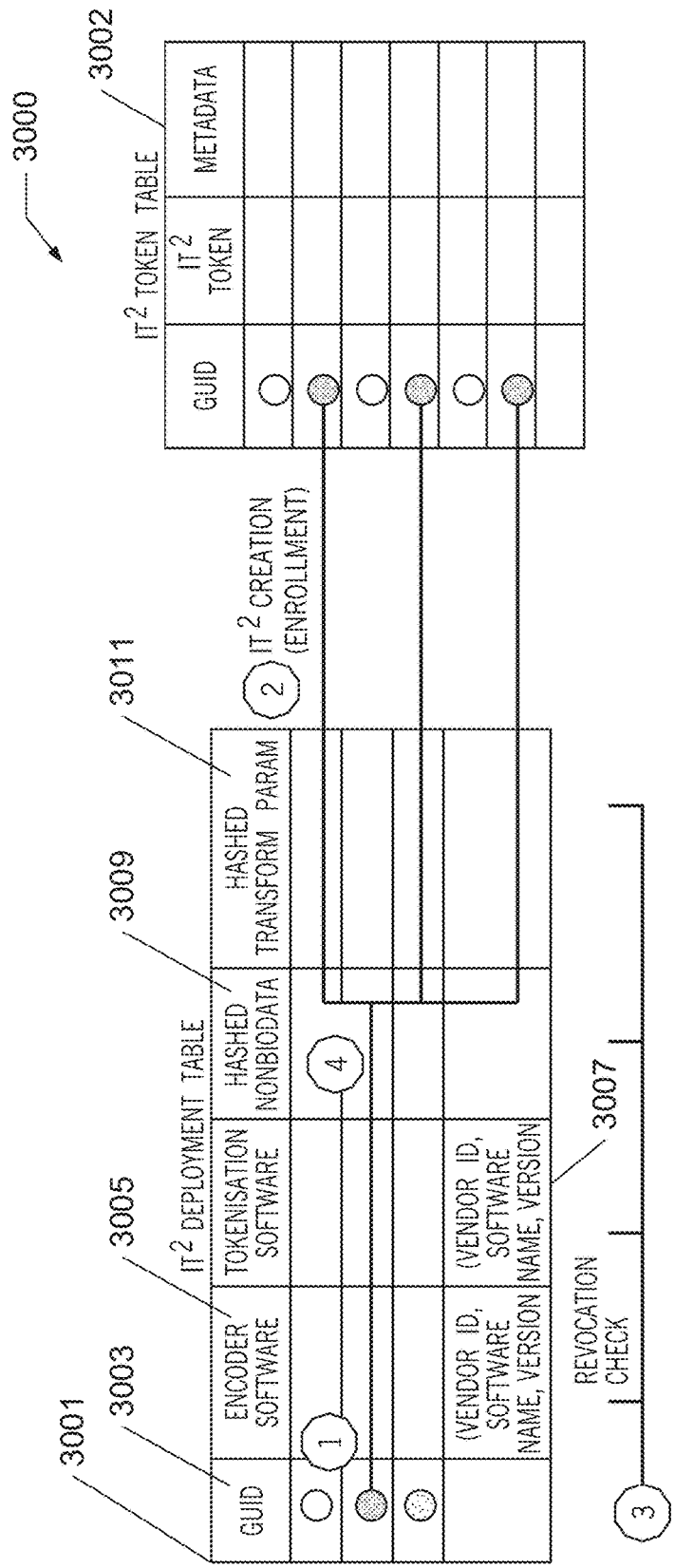
FIG. 30 shows an exemplary token control schema, according to one embodiment of the present disclosure.

FIG. 30 shows an exemplary token control schema 3000, according to one embodiment of the present disclosure. In various embodiments, the token control schema 3000 includes one or more deployment tables 3001 for tracking and controlling deployments of tokens and token solutions shown and described herein. In one or more embodiments, the data store 103 (e.g., shown in FIG. 1 and described herein) stores the deployment table 3001. In at least one embodiment, the computing environment 101 (FIG. 1) maintains a deployment table for each entity for which tokenization services and processes are provided. In some embodiments, the computing environment 101 maintains a deployment table on behalf of multiple entities (e.g., the entities being provided identification and/or verification matching services for tokens associated with the deployment table).

In various embodiments, the computing environment 101 controls tokenization services via the deployment table 3001. In one or more embodiments, via the deployment table 3001, the computing environment 101 may revoke the tokens described herein (e.g., preventing the revoked token from being used in subject and/or device authentication and other actions). In at least one embodiment, the computing environment 101 associates each token deployment with a globally unique identifier (GUID) 3003 (e.g., the GUID being generated by the computing environment 101 or an external service). In one or more embodiments, the computing environment 101 specifies each token deployment by one or more criteria including, but not limited to, encoder software 3005, tokenization software 3007, hashed non-biodata 3009, and hashed transformation parameter(s) 3011. In various embodiments, the encoder software 3005 may refer to software used to generate an original representation of a sample (e.g., subject features, device features, etc.). For example, the encoder software 3005 may refer to a vendor's native software development kit. In some embodiments, the encoder software 3005 may refer to an encoding software used by the computing environment 101 to generate a fixed-size representation. In at least one embodiment, the encoder software 3005 includes one or more of a software identifier, vendor identifier, version identifier, software requirements, software permissions, and other software settings. For example, the encoder software 3005 may include a triplet of vendor identifier, software name, and software version. In some embodiments, the computing environment 101 receives data corresponding to the encoder software 3005 from a user's computing device or from a third-party associated with the computing device (e.g., or with programs running thereon).

In one or more embodiments, the tokenization software 3007 includes a software development kit associated with generating tokens described herein. In at least one embodiment, the tokenization software 3007 includes one or more of a software identifier, vendor identifier, version identifier, software requirements, software permissions, and other software settings. In various embodiments, hashed non-biodata 3009 includes hashes of any non-biodata shown or described herein. In one or more embodiments, the hash transformation parameters 3011 includes hashes of any transformation, tokenization, or encoding parameters shown or described herein.

In one or more embodiments, when the representation service 111 generates a new token (e.g., a privacy-secured token as described herein), the computing environment 101 stores its associated GUID deployment instance. In at least one embodiment, the computing environment 101 stores the associated GUID deployment instance by storing the deployment table 3001 (e.g., which may be updated to include any new data associated with contents of the table).

In various embodiments, the computing environment 101 generates and associates the deployment table 3001 with one or more token tables 3002. In one or more embodiments, the token table 3002 includes one or more privacy-secured tokens and metadata associated with the deployment represented in the deployment table 3001. In at least one embodiment, the metadata includes any token metadata show or described herein (e.g., auxiliary data, error correcting codes, etc.). In various embodiments, in response to generating a new privacy-secured token, the computing environment 101 records the privacy-secured token in a token table with which the token deployment instance is associated.

In at least one embodiment, the computing environment 101 perform a revocation check to determine if any aspects of the deployment table 3001 are or have been compromised. In one or more embodiments, the computing environment 101 performs the revocation check in response to a request from a client and/or administrator user account (e.g., client including a third-party entity with which a token deployment instance is associated). In various embodiments, the computing environment 101 performs a revocation check by determining one or more aspects of the deployment table 3001 have been comprised and identifying token deployments associated with the aspects. Non-limiting examples of deployment table aspects include encoder software 3005, tokenization software 3007, hashed non-biodata 3009, and hashed transformation parameters 3011.

In at least one embodiment, the computing environment 101 determines that one or more deployment table aspects are compromised. In some embodiments, the computing environment 101 receives, from a computing device 102 or from external system or service, an indication that one or more deployment table aspects are compromised. According to one embodiment, deployment aspects may become compromised via their potential exposure to attackers (e.g., whether proven or suspected). In some embodiments, the computing environment 101 receives indications of comprised deployment aspects from computing devices 102, user accounts, or third-party security services.

In various embodiments, in response to identifying a compromised deployment aspect, the computing environment 101 identifies any deployment instances associated with the compromised deployment aspect. In at least one embodiment, the computing environment 101 retrieves GUIDs associated with the compromised deployment instance(s). In one or more embodiments, the computing environment 101 retrieves one or more token tables based on the GUIDs. In various embodiments, the computing environment 101, revokes the tokens defined in the one or more token tables and initiates a replacement of the revoked tokens. In one or more embodiments, the computing environment 101 performs replacement via reenrollment of subjects and/or computing devices associated with the revoked tokens. In one example, the computing environment 101 transmits a re-enrollment notification to a computing device of each subject that is associated with a revoked token. In another example, the computing environment 101 automatically transmits a signal to the mobile application 104 of computing devices 102 that are associated with a revoked token. In this example, the signal causes the mobile application 104 to initiate an enrollment process by which a new fixed-size representation of the computing device, or subject associated therewith, is generated (e.g., as shown and described herein). In one or more embodiments, the computing environment 101 updates the deployment table 3001 and corresponding token table 3002 based on the replacement token(s). In some embodiments, the computing environment 101 generates a new deployment table and/or token table and records the replaced token(s) therein.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A process comprising:
obtaining first data associated with at least one historical data attack;
encoding the first data into at least one fixed-size representation;
generating at least one anonymized vector representation based on the at least one fixed-size representation;
obtaining second data associated with a potential attacker;
encoding the second data into at least one additional fixed-size representation;
generating a second anonymized vector representation based on the at least one additional fixed-size representation; and
generating a confidence measure of the potential attacker as an attacker based on a comparison between the at least one anonymized vector representation and the second anonymized vector representation.

2. The process of claim 1, wherein:
the first data comprises a plurality of entries individually associated with a different historical data attack; and
the process further comprises:
generating a plurality of fixed-size representations based on each of the plurality of entries;
generating the at least one anonymized vector representation and a plurality of additional anonymized vector representations based on the plurality of fixed-size representations;
generating, via a clustering algorithm, at least one cluster based on the at least one anonymized vector representation and the plurality of additional anonymized vector representations; and
generating a confidence measure of the potential attacker as the attacker based on a comparison between the second anonymized vector representation and the at least one cluster.

3. The process of claim 1, wherein:
the first data comprises:
a first entry associated with a first data type; and
a second entry associated with a second data type;
the second data comprises at least one entry of the first data type and at least one entry of the second data type.

4. The process of claim 3, wherein:
generating the at least one anonymized vector representation comprises:
encoding the first entry into the at least one fixed-size representation;
encoding the second entry into a second fixed-size representation;
generating a second fixed-size representation based on the second entry; and
generating the anonymized vector representation based on the at least one fixed-size representation and the second additional fixed-size representation; and
generating the second anonymized vector representation comprises:
encoding the at least one entry of the first data type into the at least one additional fixed-size representation;
encoding the at least one entry of the second data type into a third fixed-size representation; and
generating the second anonymized vector representation based on the at least one additional fixed-size representation and the third fixed-size representation.

5. The process of claim 3, wherein the first data type comprises a media access control (MAC) address and the second data type comprises an internet protocol (IP) address.

6. The process of claim 3, wherein the first data type comprises a Subscriber Identity Module (SIM) number and the second data type comprises a device location.

7. The process of claim 3, wherein the first data type comprises a device operating system (OS) and the second data type comprises at least one of a MAC address, IP address, and Bluetooth address.

8. The process of claim 3, wherein the first data type comprises a device class and the second data type comprises a domain name system (DNS) request.

9. The process of claim 3, wherein:
the first data further comprises a third entry associated with a third data type; and
the second data further comprises at least one entry associated with the third data type.

10. A system, comprising:
a server having a processor configured to:
receive, from a first computing device, first data associated with at least one historical data attack;
encode the first data into at least one fixed-size representation;
generate at least one anonymized vector representation based on the at least one fixed-size representation;
receive, from a second computing device, second data associated with a potential attacker;
encode the second data into at least one additional fixed-size representation;
generate a second anonymized vector representation based on the at least one additional fixed-size representation; and
generate a confidence measure of the potential attacker as an attacker based on a comparison between the at least one anonymized vector representation and the second anonymized vector representation.

11. The system of claim 10, wherein the processor is configured to:
receive a request associated with the potential attacker;
process the request to identify a target user account; and
transmit an alert to a service associated with the target user account.

12. The system of claim 11, wherein the alert causes the service to deny the request.

13. The system of claim 11, wherein the processor is configured to transmit an alert to a computing device associated with the target user account.

14. The system of claim 11, wherein the processor is configured to transition the target user account to a locked state.

15. The system of claim 11, wherein the processor is configured to enable a dual-authentication setting associated with the target user account.

16. The system of claim 10, further comprising at least one data store configured to store the first data, wherein the processor is configured to:
store the at least one anonymized vector representation at the at least one data store; and
based on the confidence measure of the potential attacker as the attacker:
store the second anonymized vector representation at the at least one data store; and
record, at the at least one data store, an association between the first data and the second data.

17. The system of claim 16, wherein, the at least one processor is configured to, based on the confidence measure of the potential attacker as the attacker:
generate a cluster based on the at least one anonymized vector representation and the second anonymized vector representation; and
store the cluster at the at least one data store.

* * * * *